US009946390B2

(12) United States Patent
Lee et al.

(10) Patent No.: US 9,946,390 B2
(45) Date of Patent: Apr. 17, 2018

(54) MOBILE TERMINAL AND METHOD FOR CONTROLLING THE SAME

(71) Applicant: LG ELECTRONICS INC., Seoul (KR)

(72) Inventors: Chulhee Lee, Seoul (KR); Kyungah Lim, Seoul (KR); Sehee Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 132 days.

(21) Appl. No.: 14/699,951

(22) Filed: Apr. 29, 2015

(65) Prior Publication Data
US 2015/0338988 A1    Nov. 26, 2015

(30) Foreign Application Priority Data

May 26, 2014  (KR) .................. 10-2014-0063140
May 26, 2014  (KR) .................. 10-2014-0063141

(51) Int. Cl.
*G06F 3/041* (2006.01)
*G06F 1/16* (2006.01)
*G06F 3/0488* (2013.01)
*G06F 9/06* (2006.01)
*G06F 3/00* (2006.01)
*H04M 1/02* (2006.01)

(52) U.S. Cl.
CPC .......... *G06F 3/0416* (2013.01); *G06F 1/1613* (2013.01); *G06F 3/00* (2013.01); *G06F 3/0488* (2013.01); *G06F 3/04886* (2013.01); *G06F 9/06* (2013.01); *H04M 1/02* (2013.01); *H04M 1/0268* (2013.01); *G06F 2200/1614* (2013.01); *H04M 2250/16* (2013.01); *H04M 2250/22* (2013.01)

(58) Field of Classification Search
CPC . G06F 3/02; G06F 3/041; G06F 3/045; G06F 3/042; G09G 5/00; G01R 27/26; G06K 11/06; G08C 21/00
See application file for complete search history.

(56) References Cited

U.S. PATENT DOCUMENTS

| 2007/0192749 | A1* | 8/2007 | Baudisch | G06F 3/0486 715/863 |
| 2011/0006971 | A1* | 1/2011 | Ebey | G06F 1/1616 345/1.3 |
| 2012/0169609 | A1* | 7/2012 | Britton | G06F 3/0488 345/173 |
| 2013/0002133 | A1* | 1/2013 | Jin | G09F 9/33 313/511 |
| 2013/0145311 | A1* | 6/2013 | Joo | G06F 3/04886 715/788 |

(Continued)

*Primary Examiner* — Pegeman Karimi
(74) *Attorney, Agent, or Firm* — Birch, Stewart, Kolasch & Birch, LLP

(57) ABSTRACT

A mobile terminal including a touch screen with a first display area disposed at a front of a terminal body and a second display area disposed at a side of the terminal body; and a controller configured to display an operation screen on the first display area, display, on the second display area, information related to the operation screen displayed on the first display area in response to the terminal body being rotated from a first position to a second position, and control the information displayed on the second display area in response to an input received through the first display area.

20 Claims, 54 Drawing Sheets

(56) References Cited

U.S. PATENT DOCUMENTS

| | | | |
|---|---|---|---|
| 2013/0178248 A1* | 7/2013 | Kim | H04M 1/0268 455/566 |
| 2013/0300697 A1* | 11/2013 | Kim | G06F 1/1626 345/173 |
| 2014/0168118 A1* | 6/2014 | Wang | G06F 3/044 345/173 |
| 2015/0015513 A1* | 1/2015 | Kwak | G06F 3/0416 345/173 |

* cited by examiner

FIG. 45
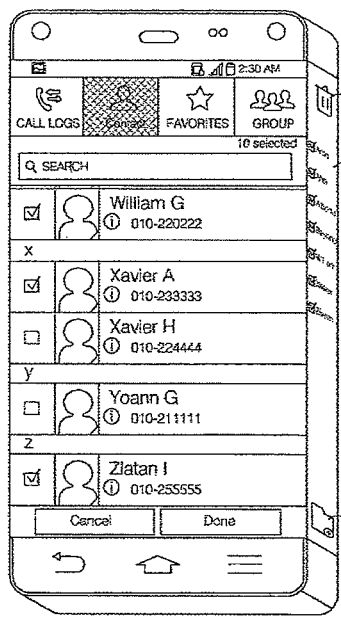
(a)
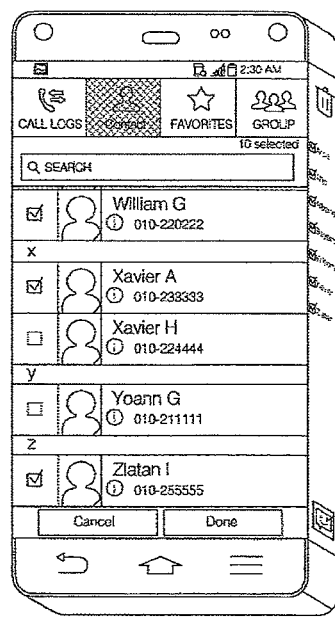
(b)

MOBILE TERMINAL AND METHOD FOR CONTROLLING THE SAME

CROSS-REFERENCE TO RELATED APPLICATION

This application claims priority to Korean Patent Application No. 10-2014-0063140, 10-2014-0063141 filed on May 26, 2014 in Korea, the entire contents of which is hereby incorporated by reference in its entirety.

BACKGROUND OF THE DISCLOSURE

1. Field of the Disclosure

The present invention relates to a mobile terminal and a method for controlling the same, and more particularly to a mobile terminal that is capable of performing various operations using an extended side display area and a method for controlling the same.

2. Background of the Disclosure

Terminals may be generally classified as mobile/portable terminals or stationary terminals. Mobile terminals may also be classified as handheld terminals or vehicle mounted terminals. Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

A user interface environment for allowing users to easily and conveniently search for or select functions is also provided. In addition, as the mobile terminals are regarded as personal belongings for expressing individualities of users, mobile terminals having various designs are produced, such as a double-sided liquid crystal display (LCD), a front touch screen, and a flexible display.

However, the user interface space is limited, such as a display, since it is necessary to consider mobility or portability of the mobile terminals. Thus, the user interface is often cumbersome and difficult to user making it inconvenient for the user.

SUMMARY OF THE DISCLOSURE

Another object of the present invention is to provide a mobile terminal that is capable of displaying on a side display unit an auxiliary screen related to an operation screen displayed on a front display unit in a horizontal mode and a method for controlling the same.

Another object of the present invention is to provide a mobile terminal that is capable of controlling an auxiliary screen displayed on a side display unit according to a user input received through a front display unit in a horizontal mode and a method for controlling the same.

Another object of the present invention is to provide a mobile terminal that is capable of automatically displaying information related to an auxiliary screen on an area other than a user's grip area when the mode of the mobile terminal is switched from a horizontal mode to a vertical mode and a method for controlling the same.

Another object of the present invention is to provide a mobile terminal that is capable of easily sorting a plurality of items arranged on a list screen using a side display area and a method for controlling the same.

Another object of the present invention is to provide a mobile terminal that is capable of easily sorting a plurality of images stored in a gallery using a single side display area and a method for controlling the same.

A further object of the present invention is to provide a mobile terminal that is capable of easily sorting a plurality of images stored in a gallery using opposite side display areas and a method for controlling the same.

To achieve these and other advantages and in accordance with the purpose of the present invention, as embodied and broadly described herein, the present invention provides in one aspect a mobile terminal including a touch screen including a first display area disposed at a front of a terminal body and a second display area disposed at one side of the terminal body, and a controller for displaying an operation screen on the first display area, displaying on the second display area information related to the operation screen displayed on the first display area when the terminal body is rotated from a first position to a second position, and controlling the information displayed on the second display area in response to a user input received through the first display area.

In another aspect, the present invention provides a method for controlling a mobile terminal including displaying an operation screen on a first display area of a touch screen disposed at a front of a terminal body, displaying information related to the operation screen on a second display area of the touch screen disposed at one side of the terminal body when the terminal body is rotated from a first position to a second position, and controlling the information displayed on the second display area in response to a user input received through the first display area.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIGS. 43 to 47 are reference views illustrating the operation of a mobile terminal according to a fifth embodiment of the present invention;

DETAILED DESCRIPTION OF THE PREFERRED EMBODIMENTS

Description will now be given in detail according to embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
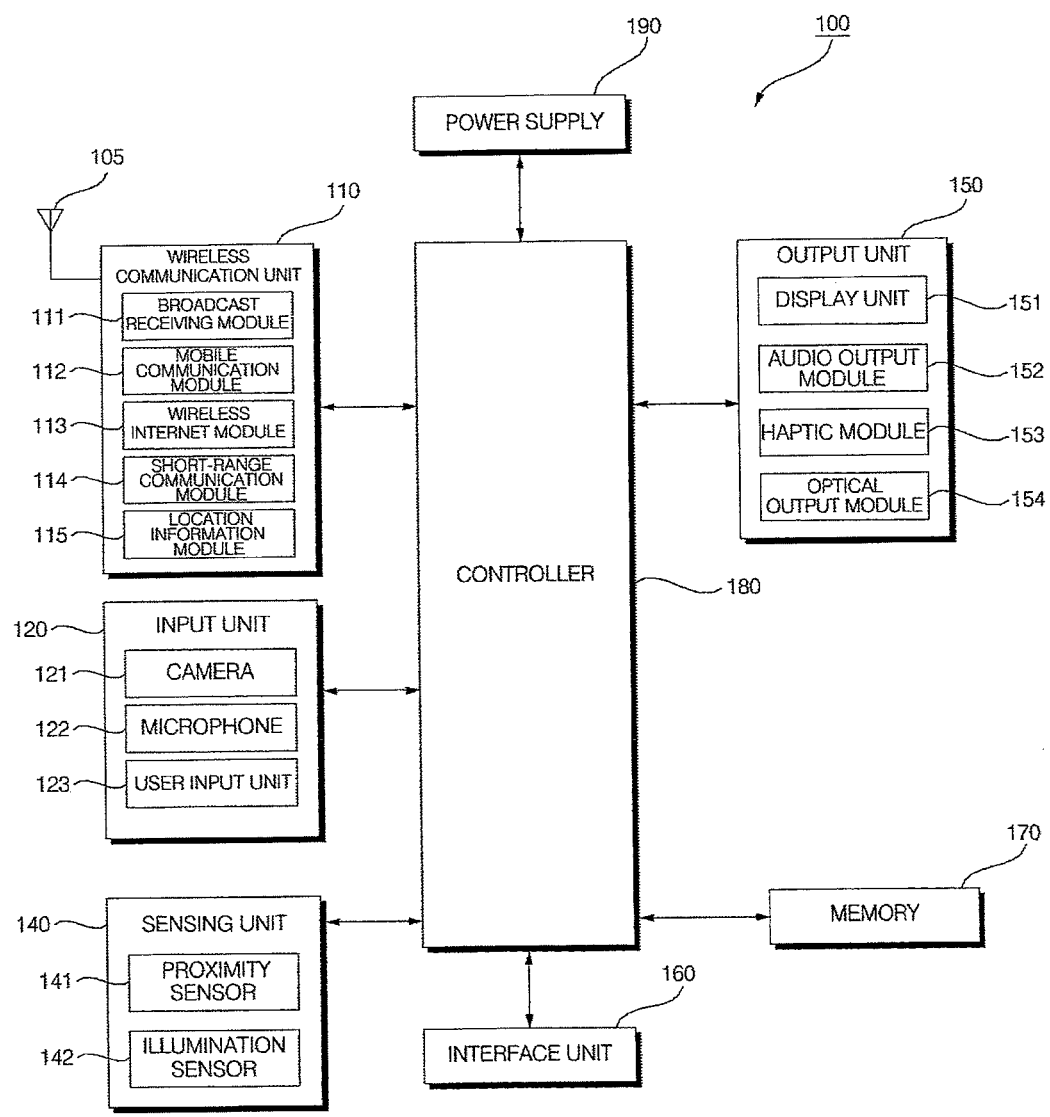
FIG. 1a is a block diagram of a mobile terminal according to an embodiment of the present disclosure.
Figure 1B:
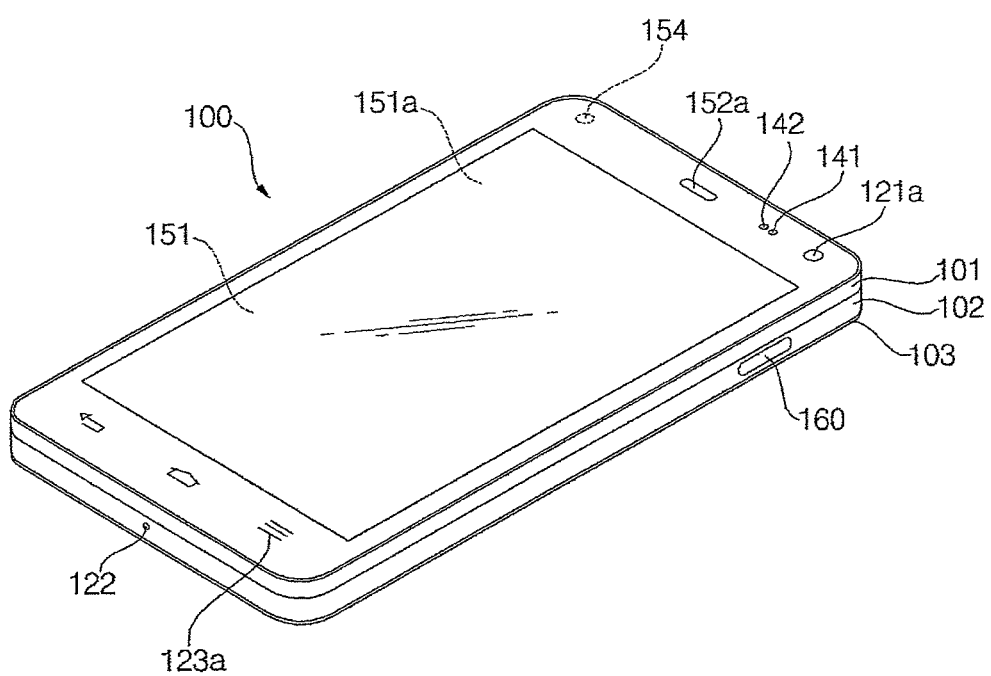
FIGS. 1b and 1c are conceptual views of one example of the mobile terminal, viewed from different directions.
Figure 1C:
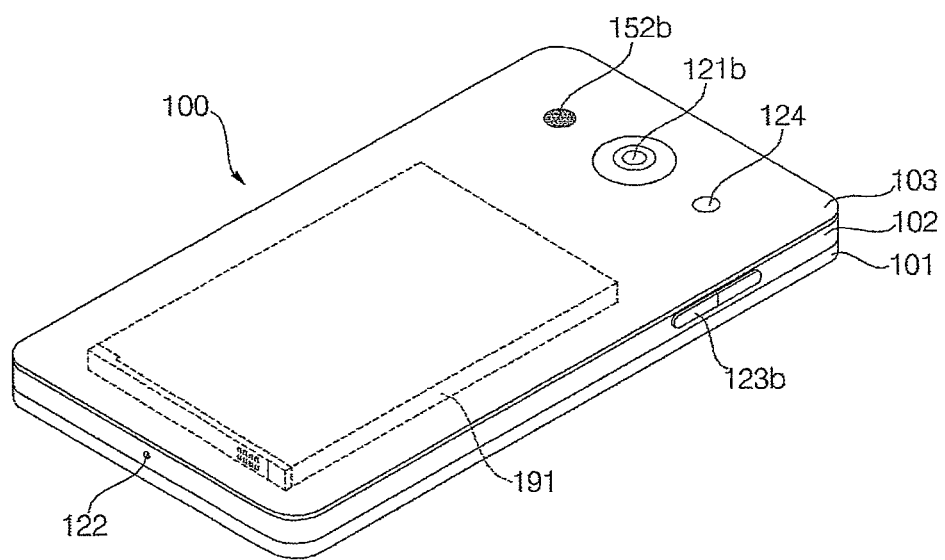

Reference is now made to FIGS. 1a-1c, where FIG. 1a is a block diagram of a mobile terminal in accordance with the present disclosure, and FIGS. 1b and 1c are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

Referring now to FIG. 1a, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile tenainal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1a, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1a, or activating application programs stored in the memory 170. As one example, the controller 180 controls some or all of the components illustrated in FIGS. 1a-1c according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1a, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch. A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information. In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen. The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition. The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging. The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1*b* and 1*c*, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101. In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1b and 1c depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof. The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1a). Therefore, the touch screen may replace at least some of the functions of the first manipulation unit 123a.

The first audio output module 152a may be implemented in the form of a speaker to output voice audio, alarm sounds, multimedia audio reproduction, and the like. The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170. The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1b illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1c, a flash 124 is shown adjacent to the second camera 121b. When an image of a subject is captured with the camera 121b, the flash 124 may illuminate the subject. As shown in FIG. 1c, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2A:
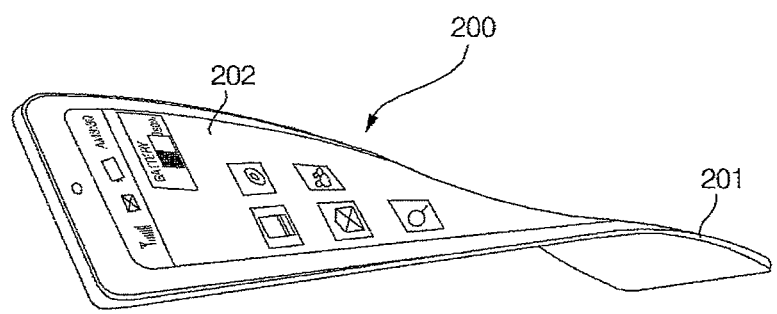
FIGS. 2a, 2b and 2c are a conceptual view of a deformable mobile terminal according to an alternative embodiment of the present disclosure.

FIG. 2a is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1a-1c.

The flexible display of mobile terminal 200 is generally formed as a lightweight, non-fragile display, which still exhibits characteristics of a conventional flat panel display, but is instead fabricated on a flexible substrate which can be deformed as noted previously. The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When the flexible display unit 251 is not deformed (for example, in a state with an infinite radius of curvature and referred to as a first state), a display region of the flexible display unit 251 includes a generally flat surface. When the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized so a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states. One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251. A battery located in the mobile terminal 200 may also be deformable in cooperation with the flexible display unit 261, taking into account the characteristic of the flexible display unit 251. One technique to implement such a battery is to use a stack and folding method of stacking battery cells. The deformation of the flexible display unit 251 not limited to perform by an external force. For example, the flexible display unit 251 can be deformed into the second state from the first state by a user command, application command, or the like.

Figure 2B:
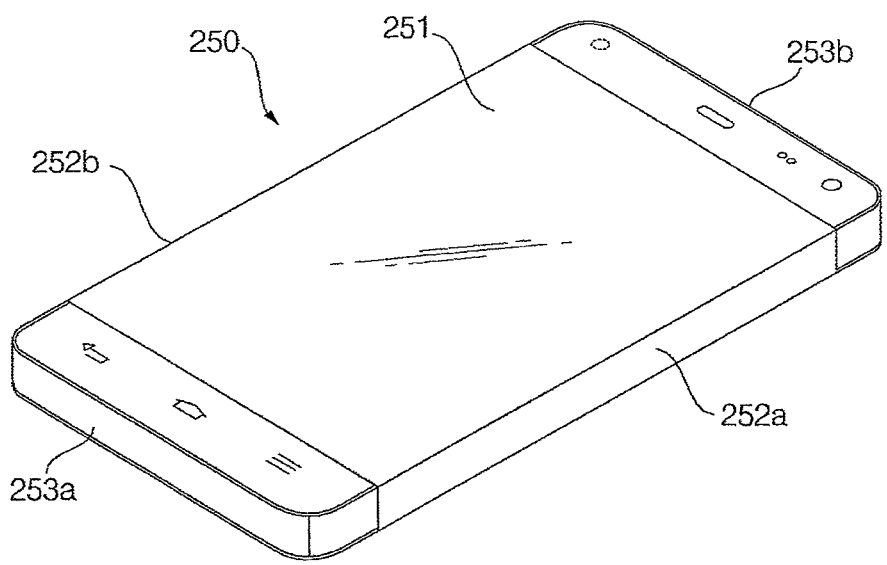
Figure 2C:
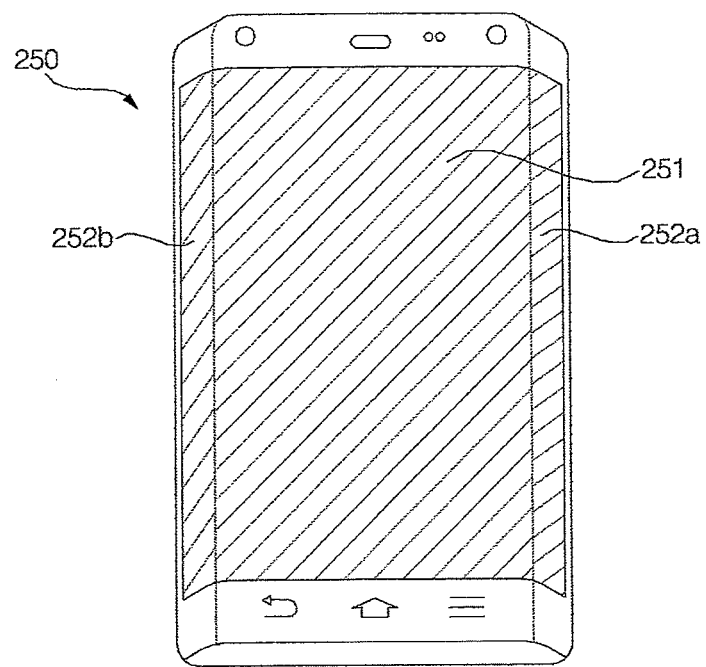

FIGS. 2b and 2c are conceptual views illustrating other examples of the deformable mobile terminal 250 according to an embodiment of the present invention. That is, FIG. 2b is a view showing a mobile terminal having a terminal body formed in a rectangular shape in section, and FIG. 2c is a view showing a mobile terminal having a terminal body formed in a trapezoidal shape in section.

Referring to FIGS. 2b and 2c, display units 251 and 252 may be disposed on the front of the terminal body and, in addition, extend to at least one of the left and right sides of the terminal body. In the following description, the display unit 251 disposed on the front of the terminal body will be referred to as a front display unit (or a main display unit), and display units 252a and 252b disposed on at least one of the left and right sides of the terminal body will each be referred to as a side display unit (or a sub display unit), for the convenience of description. In addition, the display unit 252a disposed on the left side of the terminal body will be referred to as a first side display unit (or a first sub display unit), and the display unit 252b disposed on the right side of the terminal body will be referred to as a second side display unit (or a second sub display unit).

The front display unit 251 and the side display unit 252 may be separately disposed on the front and the side of the terminal body, respectively. Alternatively, the front display unit 251 and the side display unit 252 may be integrally disposed on the front and the side of the terminal body through a flexible display. For example, when the front display unit 251 and the side display unit 252 are integrally disposed on the front and the side of the terminal body through the flexible display, the front display unit 251 and the side display unit 252 may be continuously formed with no physical or spatial boundary between the front display unit 251 and the side display unit 252.

The front display unit 251 and the side display unit 252 may each include a touch sensor for sensing touch on a corresponding one of the front and side display units 251 and 252 such that a control command can be input by touch. When one of the front and side display units 251 and 252 is touched, therefore, the touch sensor senses the touch, and the controller 180 can generate a control command corresponding to the sensed touch. Text or numbers may be input by touch. In addition, menu items that can be indicated or designated in various modes may be input by touch.

The front display unit 251 and the side display unit 252 may separately display information processed by the mobile terminal 250. For example, the front display unit 251 may display information related to an execution screen of a first application program driven by the mobile terminal 250 or information related to a user interface (UI) or a graphical user interface (GUI) based on the execution screen information, and the side display unit 252 may display information related to an execution screen of a second application program driven by the mobile terminal 250 or information related to a UI or a GUI based on the execution screen information. In another embodiment, the front and side display units 251 and 252 may integrally display information processed by the mobile terminal 250.

In a further embodiment, display units 253a and 253b may be further disposed on at least one of the upper and lower sides of the terminal body in addition to the left and right sides of the terminal body. In this instance, in the same manner, the display units 253a and 253b disposed on at least one of the upper and lower sides of the terminal body may each include a touch sensor for sensing touch on a corresponding one of the display units 253a and 253b such that a control command can be input by touch. In addition, the display units 253a and 253b may display information processed by the mobile terminal 250 separately from the front and side display units 251 and 252.

In the above description, the configuration of the mobile terminal according to an embodiment of the present invention was discussed with reference to FIGS. 1 and 2. Hereinafter, a detailed description will be given of a mobile terminal that is capable of displaying on the side display unit an auxiliary screen related to an operation screen displayed on the front display unit in a horizontal mode in accordance with a first embodiment of the present invention and a method for controlling the mobile terminal.

Figure 3:
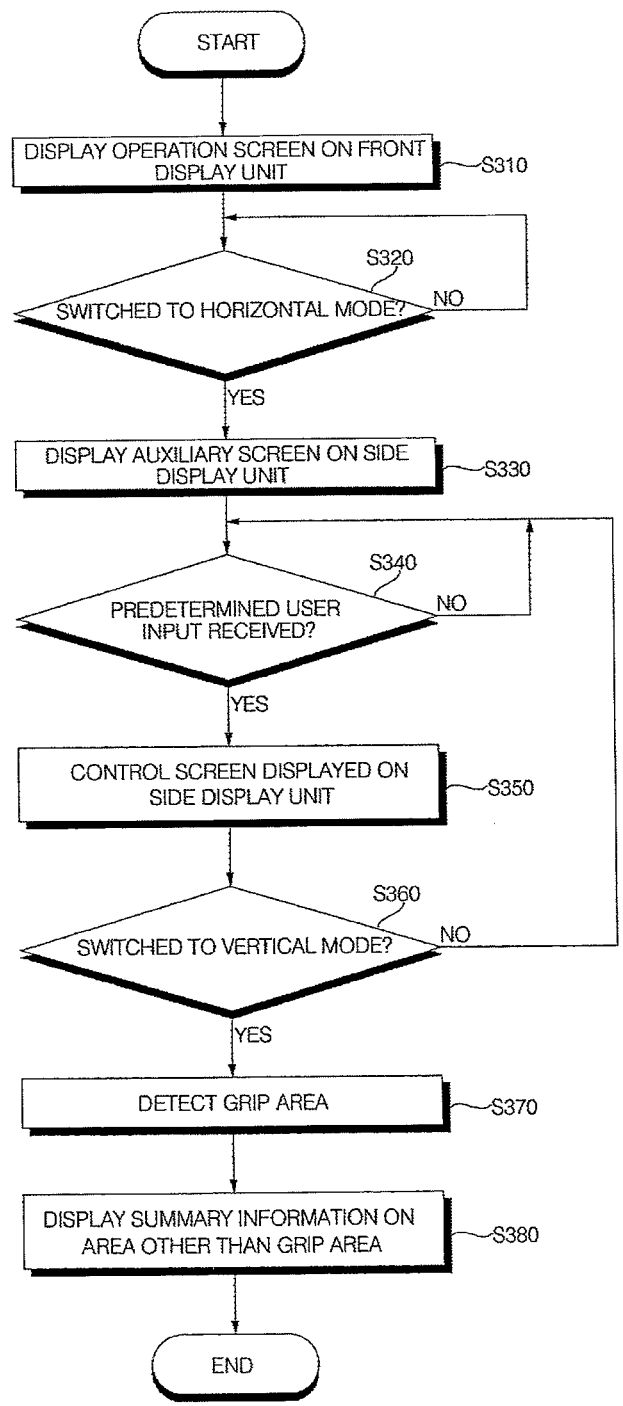
FIG. 3 is a flowchart illustrating a method for controlling a mobile terminal according to a first embodiment of the present invention.

FIG. 3 is a flowchart illustrating the operation of a mobile terminal according to a first embodiment of the present invention. Hereinafter, this embodiment will be described with reference to the mobile terminal 250 shown in FIG. 2*b* or 2*c*. In addition, this embodiment will be described on the assumption that an automatic rotation mode, in which a screen automatically rotates according to the rotation of the display unit, is preset.

Referring to FIG. 3, the controller 180 displays an operation screen corresponding to a menu, an operation, etc. selected according to a user command, etc. on the front display unit 251 (S310). Examples of the operation screen on the front display unit 251 may include a home screen, an application screen, a message screen, a call screen, a photographing or video recording screen, an image or video viewer screen, a broadcasting screen, a map screen, a webpage screen, and an application execution screen.

When the terminal body is rotated from a first position to a second position in which the operation screen is displayed on the front display unit 251 (i.e., the display mode of the display unit is switched from a vertical mode to a horizontal mode (S320)), the controller 180 rotates the operation screen in a direction opposite to the rotational direction of the terminal body, fits the rotated operation screen to a horizontal mode screen, and displays the fitted operation screen on the front display unit 251. The first position is a vertical position at which the terminal body is located in a vertical direction such that a longitudinal direction of the terminal body is perpendicular to the ground in a state in which the terminal body stands right, and the second position is a horizontal position at which the terminal body is located in a horizontal direction such that the longitudinal direction of the terminal body is parallel to the ground in a state in which the terminal body stands right.

In addition, the controller 180 can display on the side display unit 252*a* an auxiliary screen including information related to the operation screen displayed on the front display unit 251 (S330). The auxiliary screen displayed on the side display unit 252*a* may include option menus (e.g., an operation control menu, a setting menu, and a sub menu) related to the operation screen, various kinds of information related to the operation screen, and content (e.g., text, images, and videos) related to the operation screen. However, the present invention is not limited thereto.

Consequently, a user of the mobile terminal 250 can perform a related operation while viewing both the operation screen displayed on the front display unit 251 and the auxiliary screen displayed on the side display unit 252*a* taking into account the characteristics of the horizontal mode. In addition, a touch input is not received through the side display unit 252*a* taking into account the characteristics of a user's grip, and therefore an incorrect touch operation due to the user's grip does not occur.

When a predetermined user input is received through the front display unit 251 (S340), the controller 180 scrolls the auxiliary screen displayed on the side display unit 252*a* in upward and downward directions or in left and right directions, or performs various control operations related to the auxiliary screen (S350). The predetermined user input may be a user input of touching and dragging the front display unit 251 in the left and right directions or a user input of touching and dragging the front display unit 251 in the upward and downward directions. However, the present invention is not limited thereto.

In another embodiment, when the predetermined user input is received through the side display unit 252*a*, the controller 180 can scroll the auxiliary screen displayed on the side display unit 252*a* in the upward and downward directions or in the left and right directions, or perform control operations related to the auxiliary screen. In a further embodiment, when the predetermined user input is received through the front display unit 251 and the side display unit 252*a*, the controller 180 can scroll the auxiliary screen displayed on the side display unit 252*a* in the upward and downward directions or in the left and right directions, or perform control operations related to the auxiliary screen.

Subsequently, when the terminal body is rotated from the second position to the first position (i.e., the display mode of the display unit is switched from the horizontal mode to the vertical mode (S360)), the controller 180 rotates the operation screen in a direction opposite to the rotational direction of the terminal body, fits the rotated operation screen to a vertical mode screen, and displays the fitted operation screen on the front display unit 251. In addition, the controller 180 detects a user's grip area from the side display unit 252*a* (S370). Subsequently, the controller 180 can automatically display information related to the auxiliary screen displayed in the horizontal mode on an area other than the detected user's grip area (S380). In the vertical mode, therefore, the mobile terminal 250 can provide corresponding information to the user through the area other than the user's grip area.

Information displayed on the side display unit 252*a* in the vertical mode may include one selected by the user from among information displayed on the auxiliary screen, one representing the information displayed on the auxiliary screen, or one summarizing the information displayed on the auxiliary screen. However, the present invention is not limited thereto. In addition, the controller 180 can control a touch signal input through the side display unit 252*a* not to be received in the vertical mode. In the vertical mode, therefore, it is possible to prevent the occurrence of an incorrect touch operation due to the user's grip.

In the mobile terminal according to the first embodiment of the present invention as described in detail above, no touch input is received through the side display unit in the horizontal mode taking into account the characteristics of the user's grip, thereby increasing readability on the side display unit. In addition, information related to the operation screen displayed on the front display unit is displayed on the side display unit, thereby improving spatial utilization.

Hereinafter, a detailed description will be given of the operation of the mobile terminal that is capable of providing on the side display unit various kinds of information related to the operation screen displayed on the front display unit in the horizontal mode when the operation screen is a photographing screen, a video recording screen, an image viewer screen, a video viewer screen, a home screen, an application screen, or a specific application execution screen.

Figure 4:
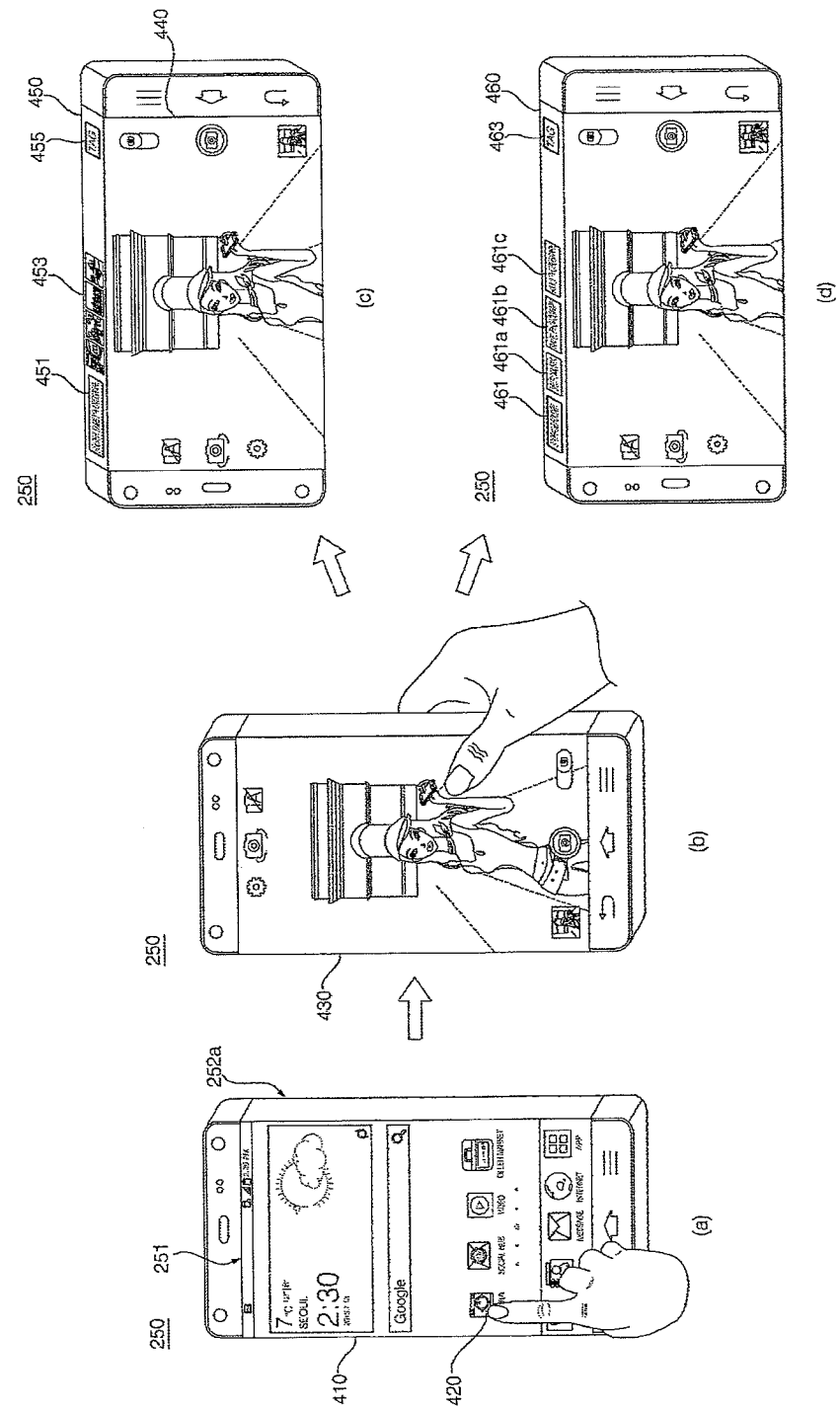
FIGS. 4 to 7 are views illustrating the operation of the mobile terminal for displaying on a side display unit information related to a photographing screen displayed on a front display unit in a horizontal mode.

FIGS. 4 to 7 are views illustrating the operation of the mobile terminal for displaying on the side display unit information related to a photographing screen displayed on the front display unit in the horizontal mode. Referring to FIG. 4(*a*), the mobile terminal 250 displays a home screen 410 on the front display unit 251 according to a user command, etc. Further, the mobile terminal 250 can turn off screens on the side display units 252*a* and 252*b* or display predetermined information on the screens.

When a camera icon 420 is selected in which the home screen 410 is displayed on the front display unit 251 as shown in FIG. 4(*a*), the mobile terminal 250 executes a camera application corresponding to the selected camera icon 420. When the camera application is executed, the mobile terminal 250 displays on the front display unit 251a photographing screen 430 including a preview image for previewing an image to be photographed by a camera 121 and a photography-related icon as shown in FIG. 4(b).

When the terminal body is rotated from the vertical direction to the horizontal direction, the mobile terminal 250 rotates the photographing screen 430 in a direction opposite to the rotational direction of the terminal body, fits the rotated photographing screen to the horizontal mode screen, and displays the fitted photographing screen on the front display unit 251. In addition, the mobile terminal 250 displays on the side display unit 252a auxiliary screens 450 and 460 including information related to a photographing screen 440 displayed on the front display unit 251. The auxiliary screens 450 and 460 displayed on the side display unit 252a may include a storage folder setting menu, which is one of the setting option menus related to a photographing function.

For example, as shown in FIG. 4(c), the auxiliary screen 450 displayed on the side display unit 252a may include a family photograph folder 451 preset as a folder for storing an image which is being photographed, a representative image 453 stored in the family photograph folder 451, and an indicator 455 indicating a menu (i.e., a tag setting menu) next to the storage folder setting menu. In another embodiment, as shown in FIG. 4(d), the auxiliary screen 460 displayed on the side display unit 252a may include a storage folder menu 461 for selecting a folder for storing an image which is being photographed, a self-photographing folder 461a, a travel photograph folder 461b, and a family photograph folder 461c, which are detailed items of the storage folder menu 461, and an indicator 463 indicating a menu (i.e., a tag setting menu) next to the storage folder setting menu.

Consequently, the user of the mobile terminal 250 can perform a photography-related operation while viewing both the photographing screen 440 displayed on the front display unit 251 and the auxiliary screens 450 and 460 displayed on the side display unit 252a taking into account the characteristics of the horizontal mode.

Figure 5:
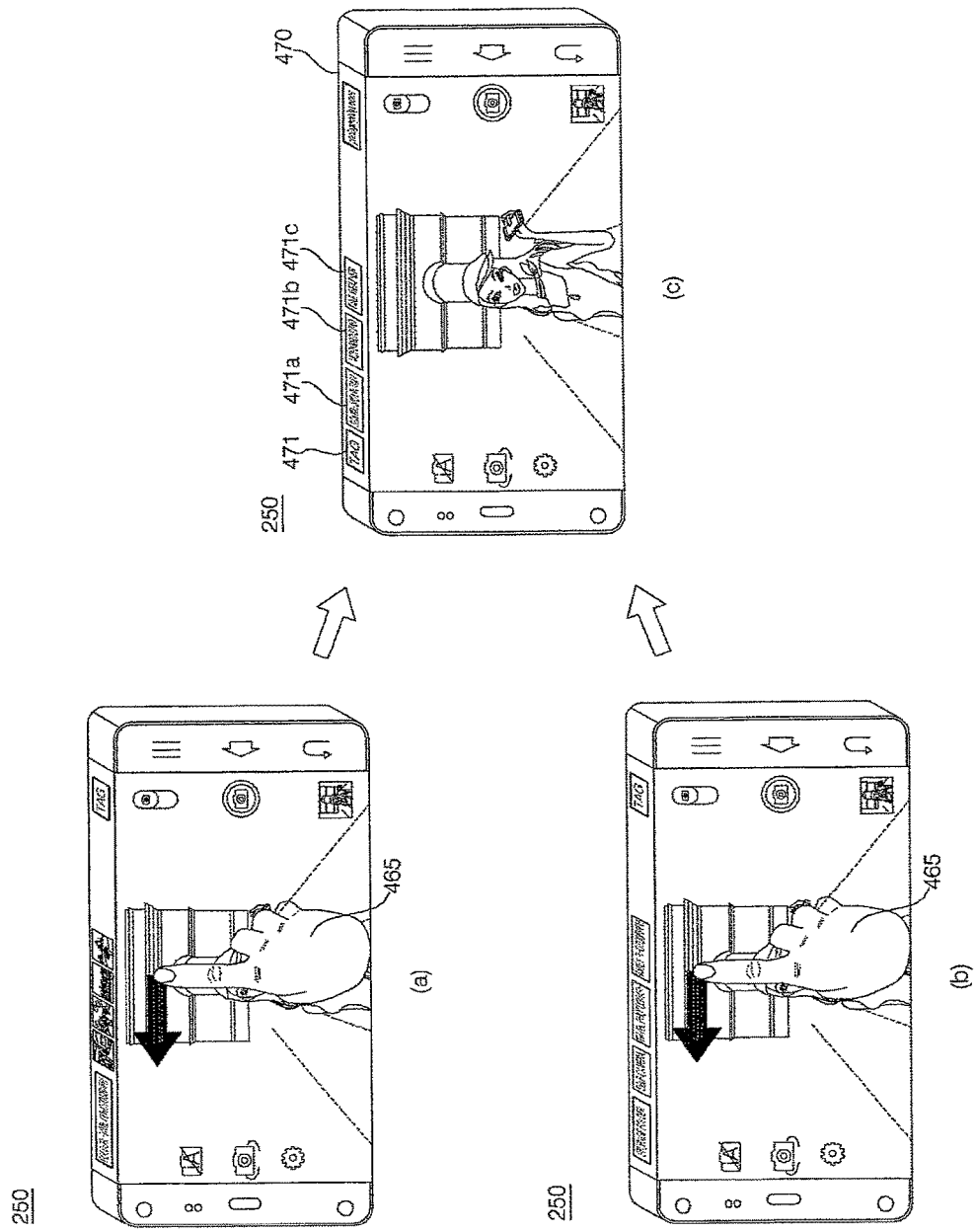

Referring to FIG. 5, when a user input of touching a portion of the front display unit 251 and then dragging the touched portion of the front display unit 251 in a left direction is received, the mobile terminal 250 sequentially displays a menu list next to the current menu on the side display unit 252a. When a desired menu appears on the side display unit 252a, the user can stop the drag input and then immediately release the touch input, or may stop the drag input and then continues the touch input for a predetermined time, to select the desired menu.

In addition, when a user input of touching a portion of the front display unit 251 and then dragging the touched portion of the front display unit 251 in a right direction is received, the mobile terminal 250 sequentially displays a menu list previous to the current menu on the side display unit 252a. In the same manner, when a desired menu appears on the side display unit 252a, the user can stop the drag input and then immediately release the touch input, or may stop the drag input and then continues the touch input for a predetermined time, to select the desired menu.

In the horizontal mode, as described above, the mobile terminal 250 can control movement between the menus displayed on the side display unit 252a according to a user input of dragging a portion of the front display unit 251 in the left or right direction. For example, when a user input 465 of touching a point of the front display unit 251 and then dragging the touched point of the front display unit 251 in the left direction is received, as shown in FIG. 5(c), the mobile terminal 250 can display on the side display unit 252a an auxiliary screen 470 including a menu, i.e., a tag setting menu 471, next to the storage folder setting menu. The auxiliary screen 470 displayed on the side display unit 252a may include a tag setting menu 471, a mountain tag 471a, a star tag 471b, and a fine weather tag 471c, which are detailed items of the tag setting menu 471, and an indicator 473 indicating a menu (i.e., a photographing mode setting menu) next to the tag setting menu 471.

Figure 6:
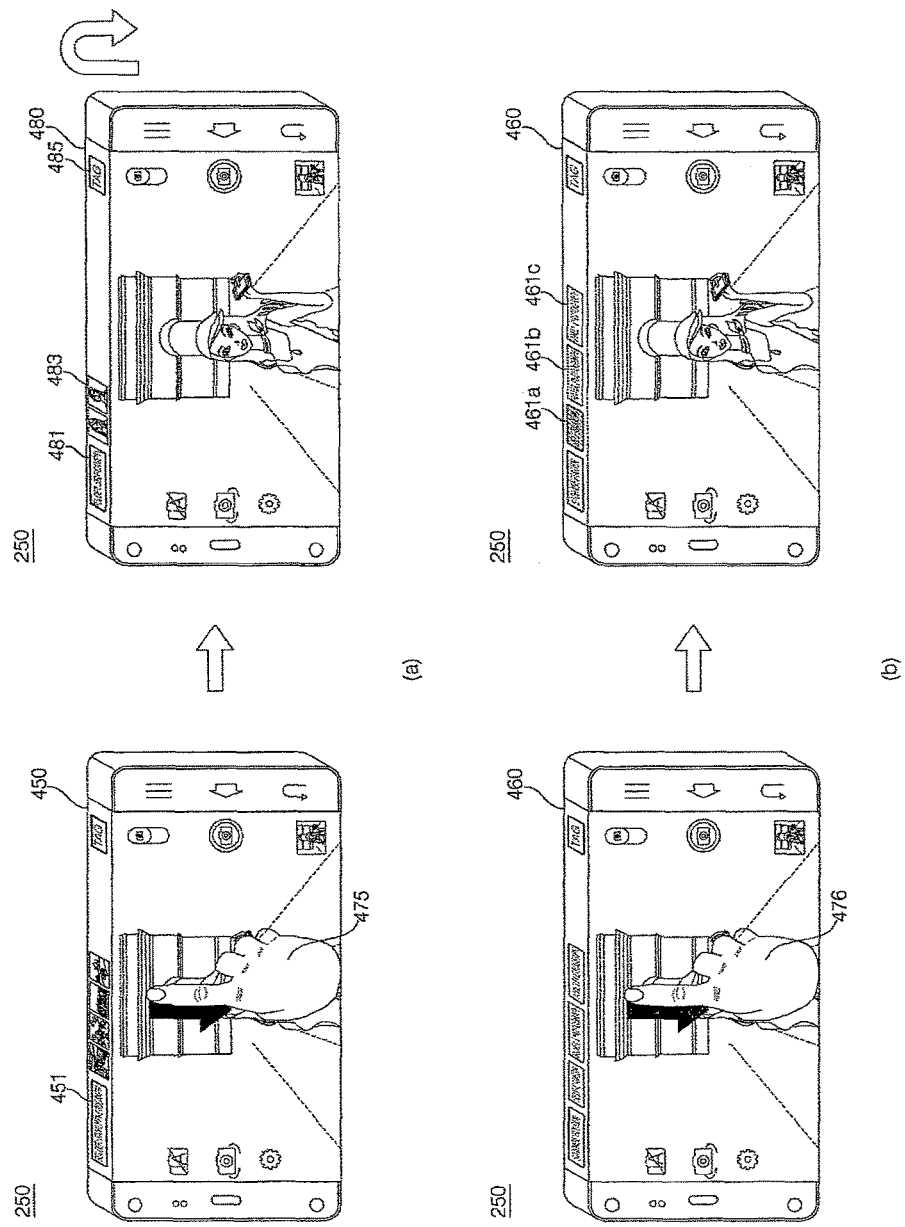

Referring to FIG. 6, when a user input of touching a portion of the front display unit 251 and then dragging the touched portion of the front display unit 251 in a downward direction is received, the mobile terminal 250 sequentially displays next items of the same menu on the side display unit 252a. When a desired item appears on the side display unit 252a, the user can stop the drag input and then immediately release the touch input, or may stop the drag input and then continues the touch input for a predetermined time, to select the desired item.

In addition, when a user input of touching a portion of the front display unit 251 and then dragging the touched portion of the front display unit 251 in an upward direction is received, the mobile terminal 250 sequentially displays previous items of the same menu on the side display unit 252a. In the same manner, when a desired item appears on the side display unit 252a, the user can stop the drag input and then immediately release the touch input, or may stop the drag input and then continues the touch input for a predetermined time, to select the desired item.

In the horizontal mode, as described above, the mobile terminal 250 can control movement between sub items of the same menu displayed on the side display unit 252a according to a user input of dragging a portion of the front display unit 251 in the upward or downward direction. For example, when a user input 475 of touching a point of the front display unit 251 and then dragging the touched point of the front display unit 251 in the downward direction is received, as shown in FIG. 6(a), the mobile terminal 250 can display on the side display unit 252a an auxiliary screen 480 including a folder item next to the current folder item in the storage folder menu.

The auxiliary screen 480 displayed on the side display unit 252a may include a self-photographing folder item 481, which is an item next to the family photograph folder item 451, a representative image 483 stored in the self-photographing folder 481, and an indicator 485 indicating a menu (i.e., a tag setting menu) next to the storage folder menu. In addition, the mobile terminal 250 can provide a screen effect in which the previous auxiliary screen 450 disappears while moving slowly in the downward direction and the next auxiliary screen 480 appears while moving slowly downward from above according to the user drag input 475.

In another embodiment, when a user input 476 of touching a point of the front display unit 251 and then dragging the touched point of the front display unit 251 in the downward direction is received, as shown in FIG. 6(b), the mobile terminal 250 can sequentially display the sub folder items 461a, 461b, and 461c belonging to the storage folder menu displayed on the side display unit 252a such that the sub folder items 461a, 461b, and 461c can be varied according to the user drag input 476. When a desired storage folder item, e.g., the storage folder item 461a, of the storage folder menu is displayed in a state in which the shape or color of the storage folder item 461a is varied, the user can stop the drag input to select the storage folder item 461a.

Figure 7:
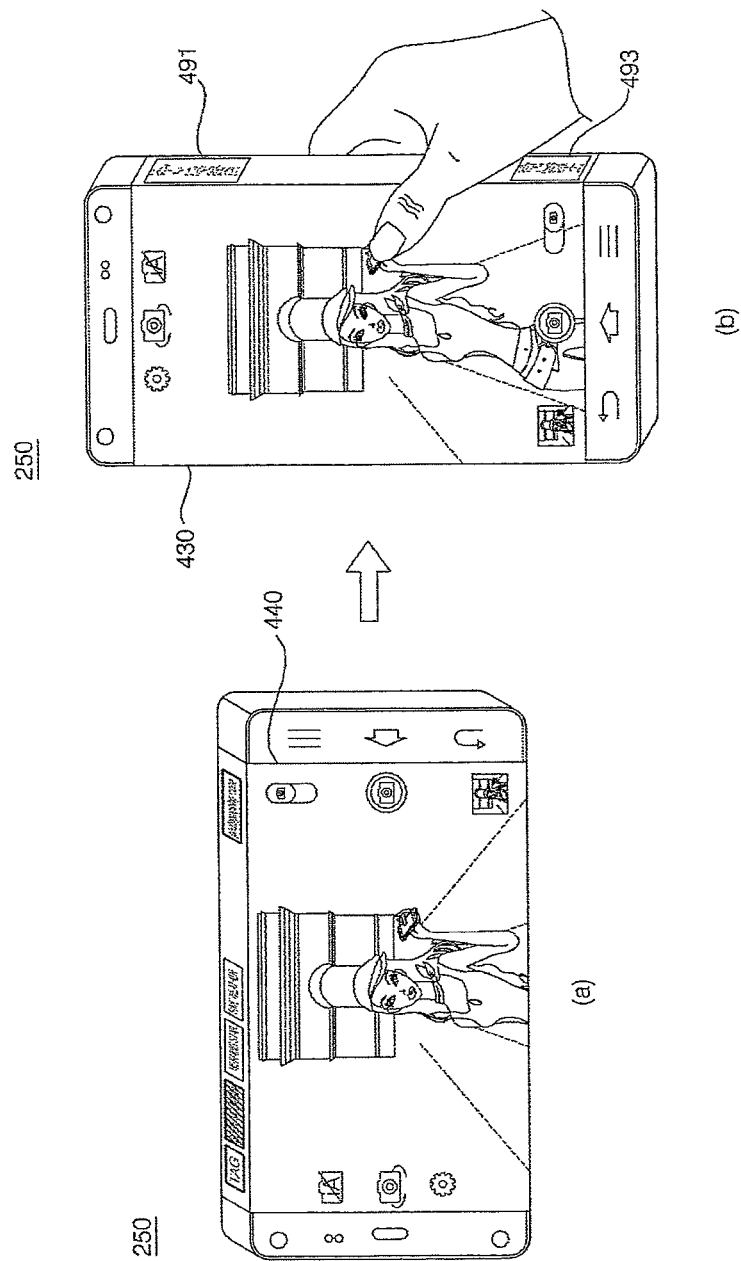

Referring to FIG. 7, the mobile terminal 250 decides a folder for storing an image which is being photographed and tag information of the image which is being photographed according to a user selection command received through the front display unit 251. Subsequently, when the terminal body is rotated from the horizontal direction to the vertical direction, the mobile terminal 250 rotates the photographing screen 440 in a direction opposite to the rotational direction of the terminal body, fits the rotated photographing screen to the vertical mode screen, and displays the fitted photographing screen on the front display unit 251.

Further, the mobile terminal 250 detects a user's grip area using a touch sensor provided at the side display unit 252a. Subsequently, the mobile terminal 250 can automatically display the storage folder 491 and tag information 493 selected by the user in the horizontal mode on an area other than the detected user's grip area. In the vertical mode, therefore, the mobile terminal 250 can provide corresponding information to the user through the area other than the user's grip area.

In addition, the mobile terminal 250 can enable the touch sensor provided at the side display unit 252a in the horizontal mode, whereas the mobile terminal 250 can disable the touch sensor provided at the side display unit 252a in the vertical mode. In the vertical mode, therefore, the mobile terminal 250 can prevent the occurrence of an incorrect touch operation due to the user's grip.

Figure 8:
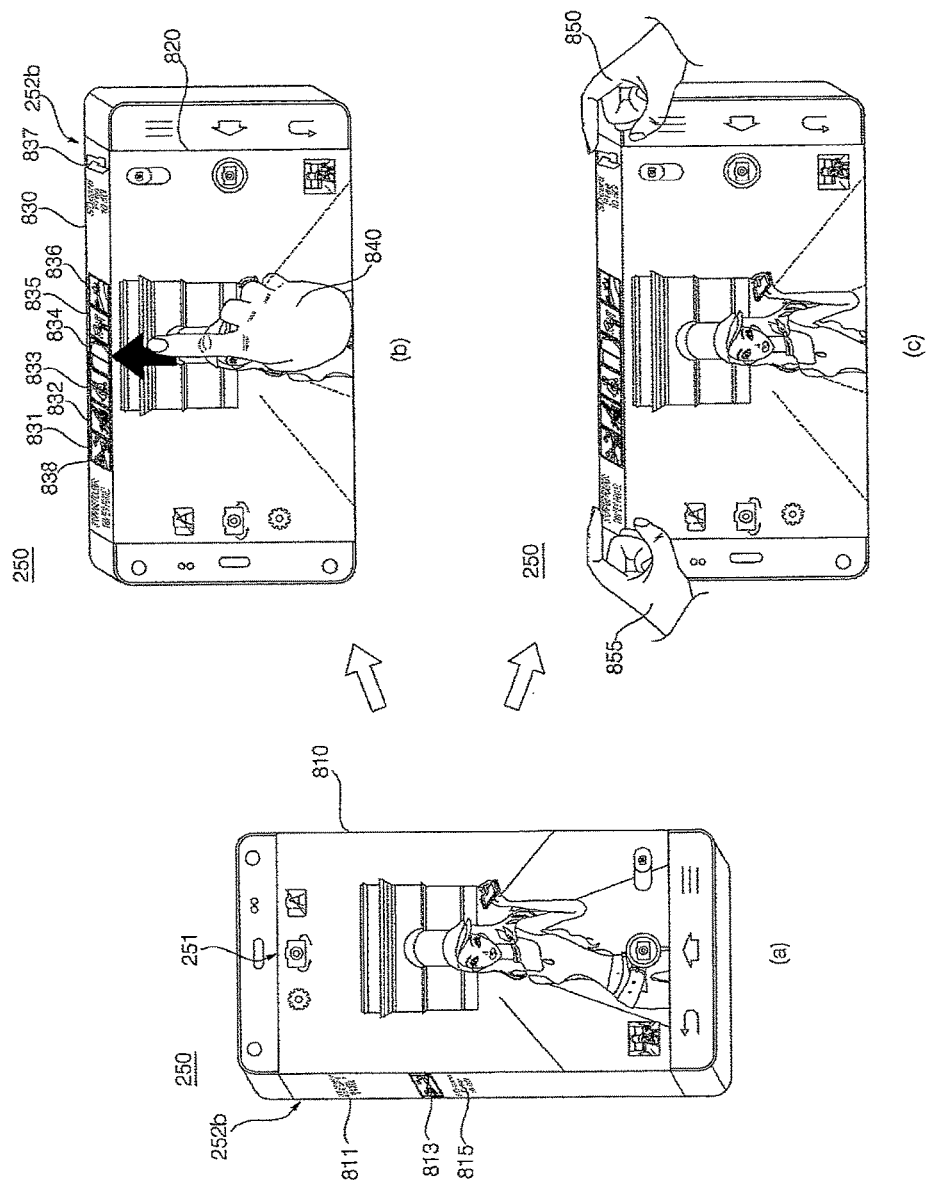
FIGS. 8 and 9 are reference views illustrating another example of a method for selecting a folder, in which an image which is being photographed will be stored, using a side display unit in the horizontal mode.
Figure 9:
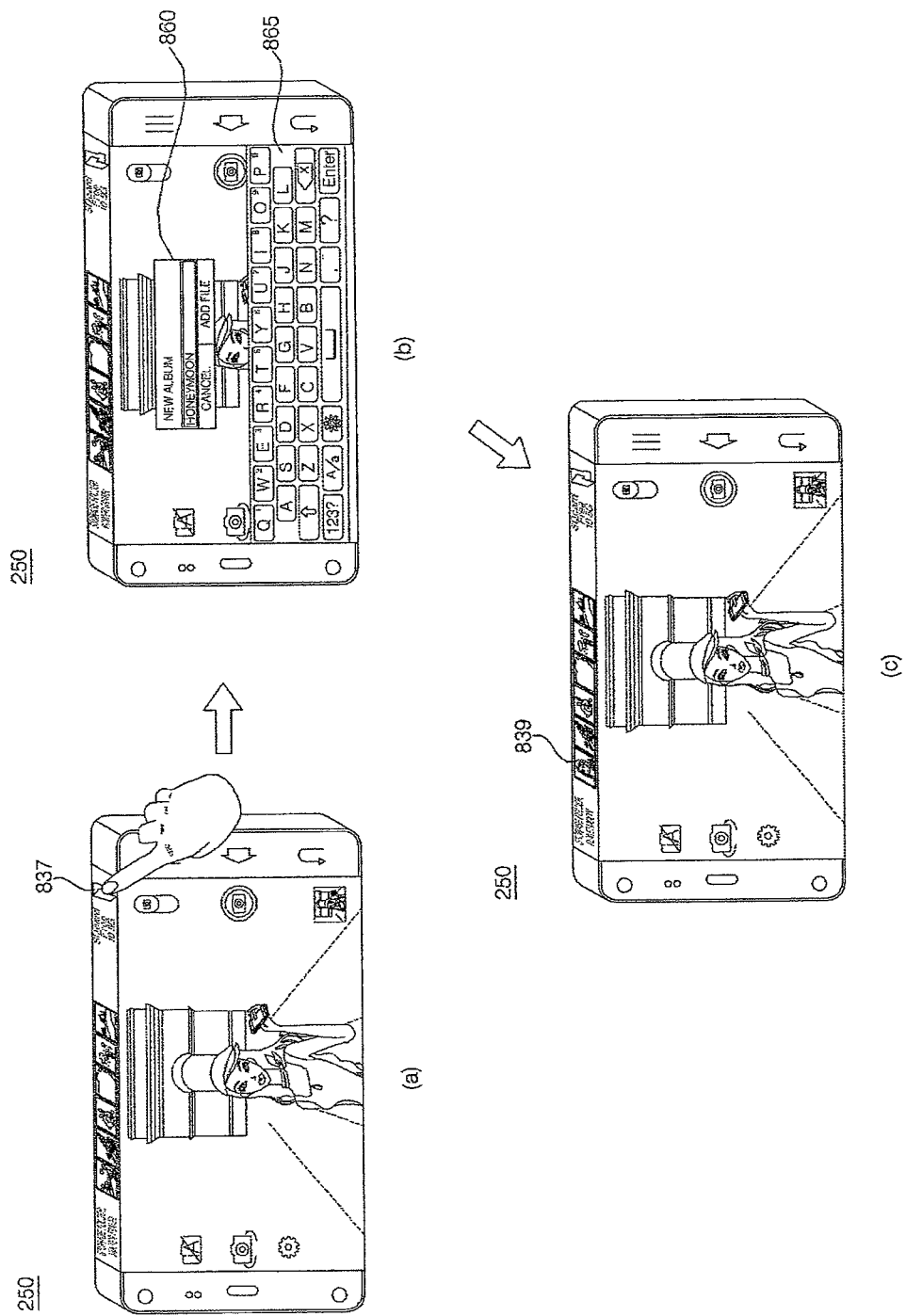

FIGS. 8 and 9 are reference views illustrating another example of a method for selecting a folder, in which an image which is being photographed will be stored, using the side display unit in the horizontal mode. Referring to FIG. 8, the mobile terminal 250 displays a home screen or an application screen on the front display unit 251 according to a user command, etc. When a camera icon is selected in a state in which the home screen or the application screen is displayed the front display unit 251, the mobile terminal 250 executes a camera application corresponding to the selected camera icon. When the camera application is executed, the mobile terminal 250 displays on the front display unit 251a photographing screen 810 including a preview image for previewing an image to be photographed by the camera 121 and a photography-related icon.

Further, the mobile terminal 250 can display on the side display unit 252b at least one selected from among the name of a folder (or an album) 811 set by default to store an image which is being photographed, a representative image 813 of the corresponding folder, and information 815 related to the corresponding folder. When the terminal body is rotated from the vertical direction to the horizontal direction, the mobile terminal 250 rotates the photographing screen 810 in a direction opposite to the rotational direction of the terminal body, fits the rotated photographing screen to the horizontal mode screen, and displays the fitted photographing screen on the front display unit 251.

In addition, the mobile terminal 250 displays on the side display unit 252b an auxiliary screen 830 including a folder list 831 to 836 for storing an image which is being photographed and a new folder icon 837 for creating a new album. Further, the storage folder 831 set by default may be displayed on the forefront of the folder list. In addition, a predetermined indicator 838 may be displayed. When the folder list is displayed, the mobile terminal 250 can select a folder for storing an image which is being photographed according to a predetermined user input.

For example, when a user input 840 of dragging the front display unit 251 in the upward direction or in the downward direction is received, as shown in FIG. 8(b), the mobile terminal 250 can sequentially display the storage folders 831 to 836 displayed on the side display unit 252b such that the storage folders 831 to 836 can be selected according to the user drag input 840. Further, the selected storage folder may be displayed differently from the other storage folders. When a desired one, e.g., the storage folder 834, of the storage folders 831 to 836, is selected, the user stops the drag input to select the storage folder 834.

In another embodiment, when a user input 850 of touching a right side area of the side display unit 252b is received, as shown in FIG. 8(c), the mobile terminal 250 can select the storage folders 831 to 836 displayed on the side display unit 252b one by one in the right direction. When a desired one, e.g., the storage folder 834, of the storage folders 831 to 836, is selected, the user stops the touch input to select the storage folder 834.

Further, when a user input 855 of touching a left side area of the side display unit 252b is received, the mobile terminal 250 can select the storage folders 831 to 836 displayed on the side display unit 252b one by one in the left direction. In the same manner, when a desired one, e.g., the storage folder 834, of the storage folders 831 to 836, is selected, the user stops the touch input to select the storage folder 834.

Referring to FIG. 9, when the new folder icon 837 displayed on the side display unit 252b is selected, the mobile terminal 250 displays on the front display unit 251a text input window 860 and a keypad window 865 for allowing the user to input the name of a new album. When 'honeymoon' is input as the name of a new album through the text input window 860, the mobile terminal 250 can create a storage folder 839 having the input name and display the created storage folder 839 on the leftmost side of the side display unit 252b. In addition, the mobile terminal 250 can designate the created storage folder 839 as a new storage folder.

Figure 10:
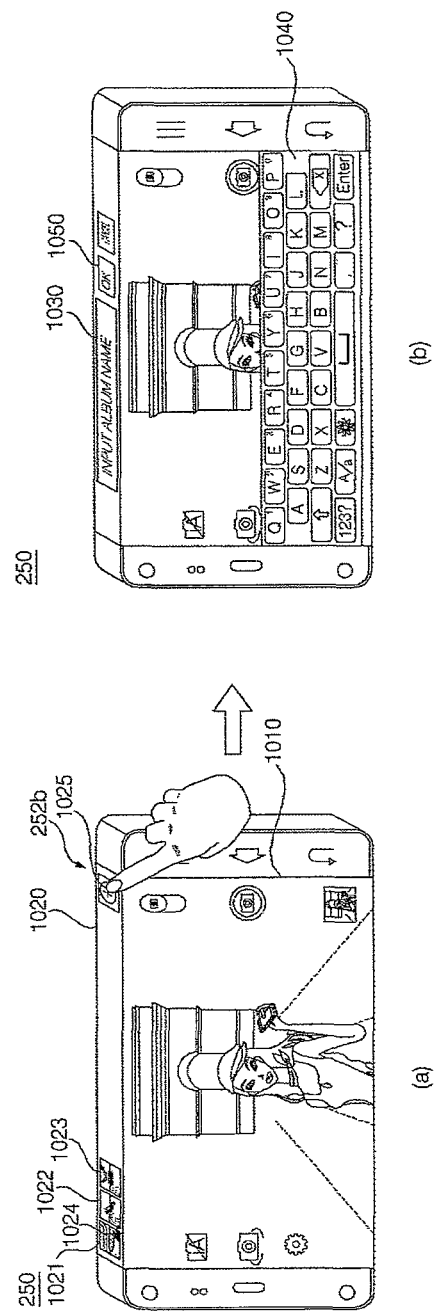
FIG. 10 is a reference view illustrating a further example of a method for selecting a folder, in which an image which is being photographed will be stored, using the side display unit in the horizontal mode.

FIG. 10 is a reference view illustrating a further example of a method for selecting a folder, in which an image which is being photographed will be stored, using the side display unit in the horizontal mode. Referring to FIG. 10, when the camera application is executed in the vertical mode, the mobile terminal 250 displays on the front display unit 251a photographing screen including a preview image for previewing an image to be photographed by the camera 121 and a photography-related icon. Further, the mobile terminal 250 can not provide information related to the photographing screen on the side display unit 252b unlike FIG. 8(a).

When the terminal body is rotated from the vertical direction to the horizontal direction, the mobile terminal 250 rotates the photographing screen in a direction opposite to the rotational direction of the terminal body, fits the rotated photographing screen to the horizontal mode screen, and displays the fitted photographing screen on the front display unit 251. In addition, the mobile terminal 250 displays on the side display unit 252b an auxiliary screen 1020 including a folder list 1021 to 1023 for storing an image which is being photographed and an 'add' icon 1025 for creating a new album. Further, the folder list 1021 set by default may be displayed on the forefront of the folder list. In addition, a predetermined indicator 1024 may be displayed.

When the folder list is displayed, the mobile terminal 250 can select a folder for storing an image which is being photographed according to the user input as shown in FIGS. 8(b) and 8(c). In addition, when the 'add' icon 1025 displayed on the side display unit 252b is selected, the mobile terminal 250 can display a text input window 1030 for allowing the user to input the name of a new album and display a keypad window 1040 on the front display unit 251.

When the new name of the new album is input through the text input window 1030 and the keypad window 1040 and then an 'OK' icon 1050 is selected, the mobile terminal 250 can create a folder having the new name and display the created folder on the leftmost side of the side display unit 252b. In addition, the mobile terminal 250 can designate the created folder as a new storage folder.

Figure 11:
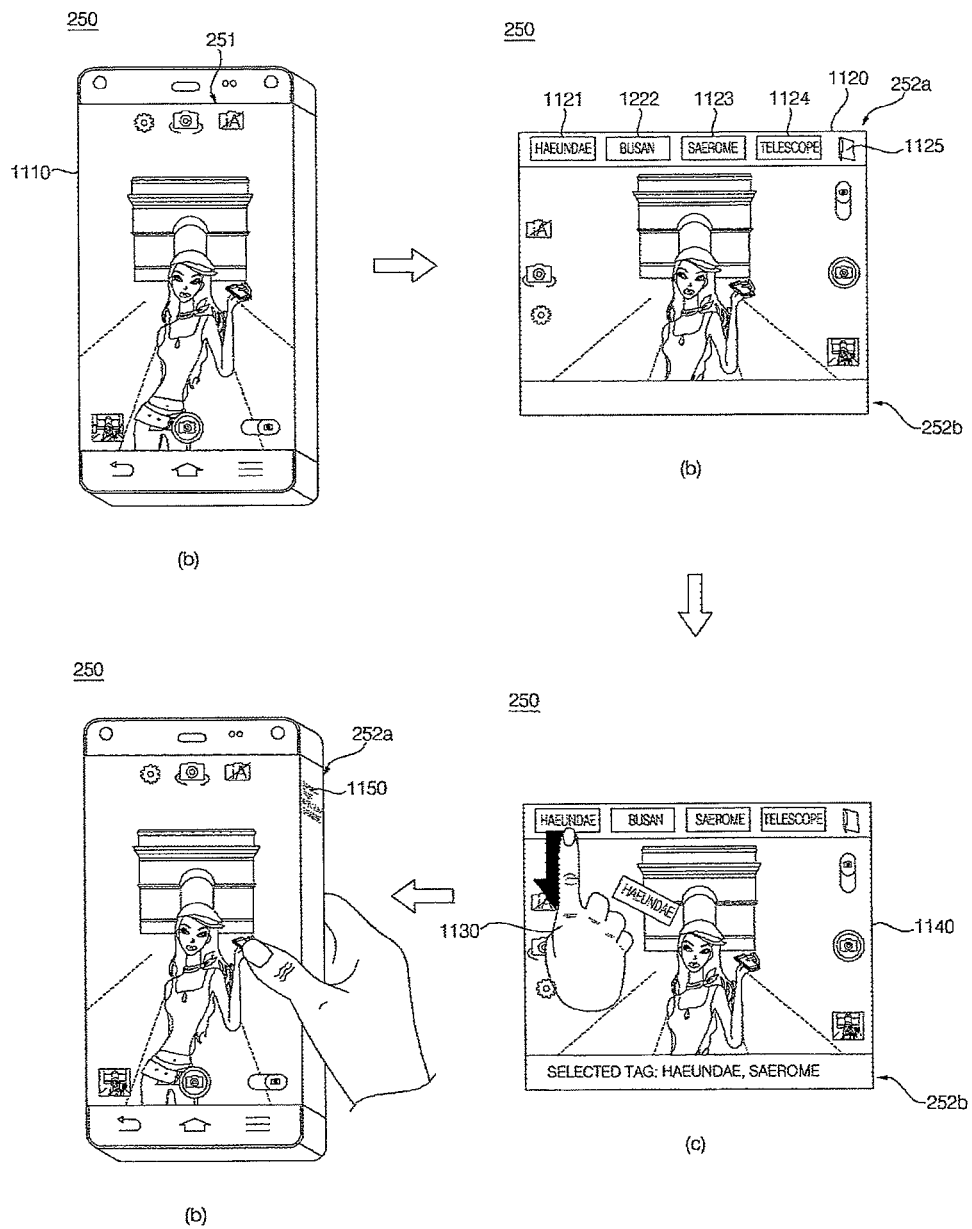
FIG. 11 is a reference view illustrating the operation of the mobile terminal for recommending a tag related to a preview image using the side display unit in the horizontal mode.

FIG. 11 is a reference view illustrating the operation of the mobile terminal for recommending a tag related to a preview image using the side display unit in the horizontal mode. Referring to FIG. 11, when the camera application is executed in the vertical mode, the mobile terminal 250 displays on the front display unit 251a photographing screen 1110 including a preview image for previewing an image to be photographed by the camera 121 and a photography-related icon.

When the terminal body is rotated from the vertical direction to the horizontal direction, the mobile terminal 250 rotates the photographing screen 1110 in a direction opposite to the rotational direction of the terminal body, fits the rotated photographing screen to the horizontal mode screen, and displays the fitted photographing screen on the front display unit 251.

In addition, the mobile terminal 250 displays on the first side display unit 252a an auxiliary screen 1120 including a recommended tag list 1121 to 1124 for an image which is being photographed and a new tag icon 1125 for creating a new tag. Further, the recommended tag list may be automatically created based on location information of the mobile terminal, current weather information, time information, object information in the preview image, character information, image file information similar to the preview image, etc.

When a user input 1130 of flicking a desired tag item 1121 toward the front display unit 251 is received in which the recommended tag list is displayed, the mobile terminal 250 can select the tag item 1121 and display the selected tag item on the second side display unit 252b. Further, the mobile terminal 250 can provide a screen effect in which the tag item 1121 disappears while being slowly absorbed into the preview image according to the user flicking input 1130. When it is necessary to add tag information which does not exist in the recommended tag list, the user of the mobile terminal 250 can select the new tag icon 1125 displayed on the right side of the first side display unit 252a to directly input new tag information.

Subsequently, when the terminal body is rotated from the horizontal direction to the vertical direction, the mobile terminal 250 rotates a photographing screen 1140 in a direction opposite to the rotational direction of the terminal body, fits the rotated photographing screen to the vertical mode screen, and displays the fitted photographing screen on the front display unit 251. In addition, the mobile terminal 250 detects a user's grip area using the touch sensor provided at the side display unit 252a. Subsequently, the mobile terminal 250 can automatically display tag information 1150 selected by the user in the horizontal mode on an area other than the detected user's grip area.

Figure 12:
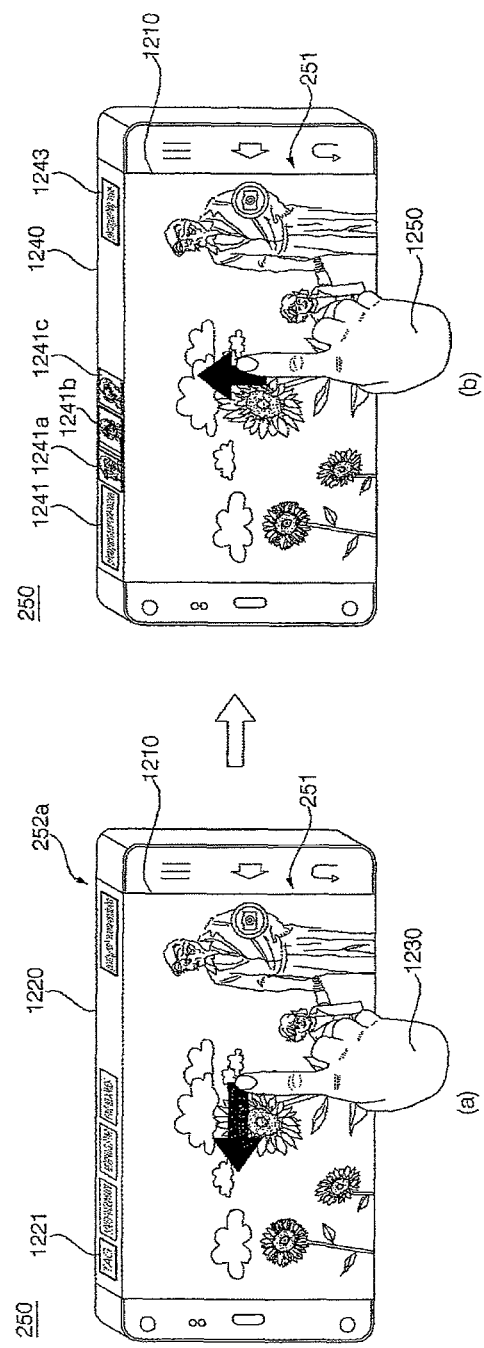
FIG. 12 is a reference view illustrating the operation of the mobile terminal for recommending a photograph related to the preview image using the side display unit in the horizontal mode.

FIG. 12 is a reference view illustrating the operation of the mobile terminal for recommending a photograph related to the preview image using the side display unit in the horizontal mode. Referring to FIG. 12, the mobile terminal 250 displays on the front display unit 251a photographing screen 1210 including a preview image for previewing an image to be photographed by the camera 121 and a photography-related icon in the horizontal mode.

In addition, the mobile terminal 250 displays on the side display unit 252a an auxiliary screen 1220 including information related to the photographing screen 1210 displayed on the front display unit 251. The auxiliary screen 1220 displayed on the side display unit 252a may include a tag setting menu 1221, which is one of the setting option menus related to a photographing function. When a user input 1230 of touching a portion of the front display unit 251 and then dragging the touched portion of the front display unit 251 in a left direction is received, the mobile terminal 250 can display on the side display unit 252a an auxiliary screen 1240 including a menu, i.e., a photograph recommendation menu 1241, next to the tag setting menu 1221.

The auxiliary screen 1240 displayed on the side display unit 252a may include a photograph recommendation menu 1241, a first image 1241a, a second image 1241b, and a third image 1241c, which are recommended images of the photograph recommendation menu 1241, and an indicator 1243 indicating a menu (i.e., a photographing mode setting menu) next to the photograph recommendation menu. The recommended image list 1241a to 1241c may be images related to location information of the mobile terminal, current weather information, time information, object information in the preview image, and character information, which are stored in a gallery or a web server.

When a user input 1250 of touching a portion of the front display unit 251 and then dragging the touched portion of the front display unit 251 in the upward direction or in the downward direction is received, the mobile terminal 250 can sequentially display the recommended images 1241a to 1241c displayed on the side display unit 252b such that the recommended images 1241a to 1241c can be selected according to the user drag input 1250. Further, the selected image may be displayed differently from the other images. When a desired one, e.g., the image 1241b, of the recommended images 1241a to 1241c, is selected, the user stops the drag input to select the image 1241b.

Figure 13:
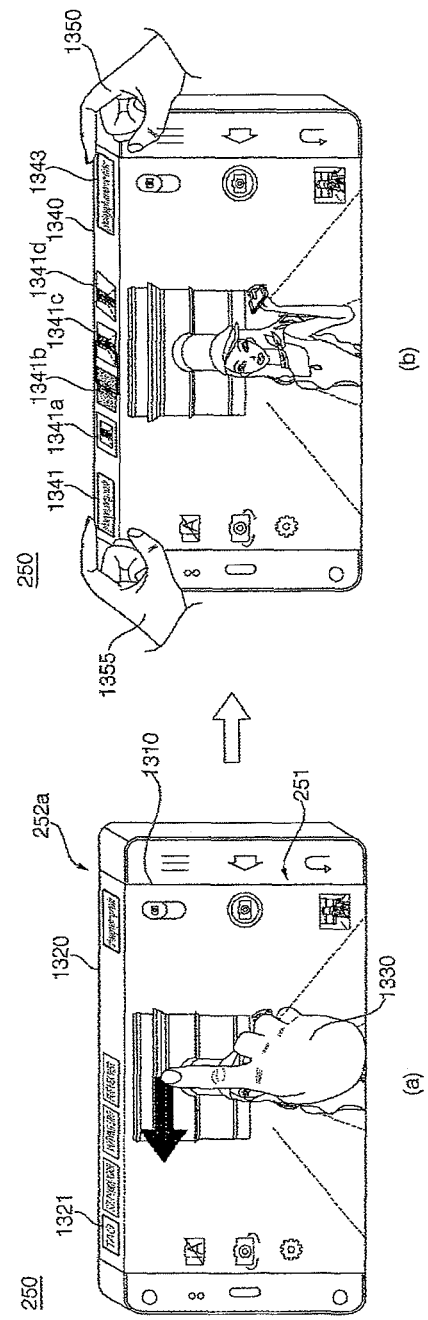
FIG. 13 is a reference view illustrating the operation of the mobile terminal for selecting a photographing mode using the side display unit in the horizontal mode.

FIG. 13 is a reference view illustrating the operation of the mobile terminal for selecting a photographing mode using the side display unit in the horizontal mode. Referring to FIG. 13, the mobile terminal 250 displays on the front display unit 251a photographing screen 1310 including a preview image for previewing an image to be photographed by the camera 121 and a photography-related icon in the horizontal mode.

In addition, the mobile terminal 250 displays on the side display unit 252a an auxiliary screen 1320 including information related to the photographing screen 1310 displayed on the front display unit 251. The auxiliary screen 1320 displayed on the side display unit 252a may include a tag setting menu 1321, which is one of the setting option menus related to a photographing function. When a user input 1330 of touching a portion of the front display unit 251 and then dragging the touched portion of the front display unit 251 in the left direction is received, the mobile terminal 250 displays on the side display unit 252a an auxiliary screen 1340 including a menu, i.e., a photographing mode menu 1341, next to the tag setting menu 1321.

The auxiliary screen 1340 displayed on the side display unit 252a may include a photographing mode menu 1341, a first photographing mode 1341a, a second photographing mode 1341b, a third photographing mode 1341c, and a fourth photographing mode 1341d, which are detailed items of the photographing mode menu 1341, and an indicator 1343 indicating a menu (i.e., a photograph recommendation menu) next to the photographing mode menu 1341. Each of the first to fourth photographing modes 1341a to 1341d may be any one selected from among an automatic mode, a panorama mode, a sport mode, a night mode, an eraser mode, an animation mode, a sound & shot mode, a tone mode, and a face mode.

In addition, each of the first to fourth photographing modes 1341a to 1341d may be displayed as text indicating the name of each photographing mode or a preview image list for a current photographing image per photographing mode. When a user input 1350 of touching a right side area of the side display unit 252a is received, the mobile terminal 250 can select the photographing modes 1341a to 1341d displayed on the side display unit 252a one by one in the right direction. When a desired one, e.g., the third photographing mode 1341c, of the photographing modes 1341a to 1341d, is selected, the user stops the touch input to select the third photographing mode 1341c.

In addition, when a user input 1355 of touching a left side area of the side display unit 252a is received, the mobile terminal 250 can select the photographing modes 1341a to 1341d displayed on the side display unit 252a one by one in the left direction. In the same manner, when a desired one, e.g., the third photographing mode 1341c, of the photographing modes 1341a to 1341d, is selected, the user stops the touch input to select the third photographing mode 1341c.

Figure 14:
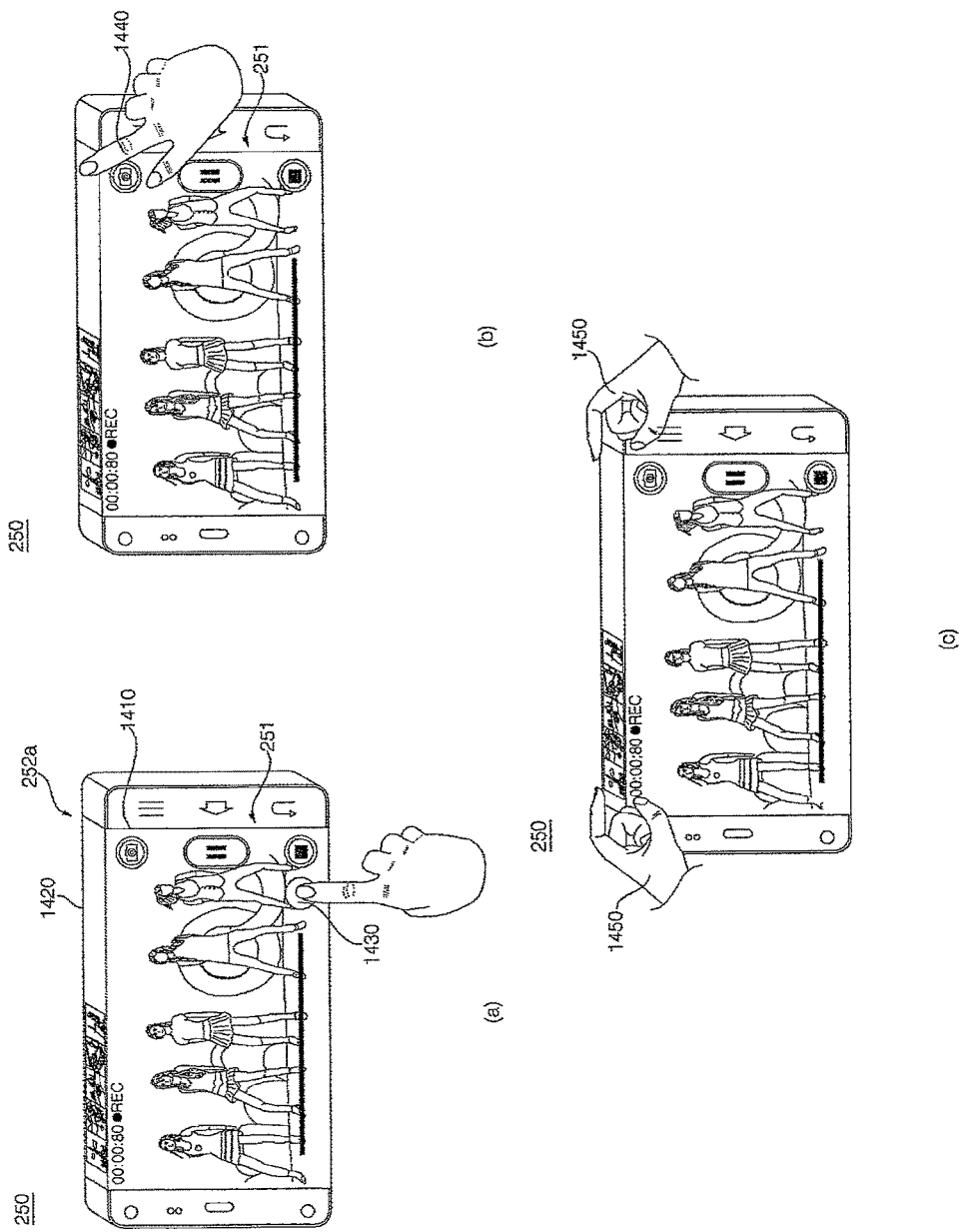
FIG. 14 is a reference view illustrating the operation of the mobile terminal for executing a bookmark function using the side display unit during video recording.

FIG. 14 is a reference view illustrating the operation of the mobile terminal for executing a bookmark function using the side display unit during video recording. Referring to FIG. 14, the mobile terminal 250 displays on the front display unit 251a photographing screen 1410 including a preview image for previewing an image to be photographed by the camera 121 and a video recording-related icon in the horizontal mode.

When a bookmark mode is set in this state, the mobile terminal 250 displays on the side display unit 252a an auxiliary screen 1420 on which images captured at a bookmarked time according to a user bookmark command are arranged. During video recording, therefore, the user of the mobile terminal 250 can execute a bookmark function in real time using the side display unit.

Further, the user bookmark command may be realized using various touch input methods. For example, when a bookmark button 1430 displayed on a portion of the front display unit 251 is selected, as shown in FIG. 14(a), the mobile terminal 250 can register a photographed image at the selection time as a bookmark and display a captured image at that time on the side display unit 252a.

In addition, when a multi-touch input 1440 of simultaneously or sequentially touching a point of the front display unit 251 and a point of the side display unit 252a is received, as shown in FIG. 14(b), the mobile terminal 250 can register a photographed image at the touch time as a bookmark and display a captured image at that time on the side display unit 252a. Furthermore, when a multi-touch input 1450 of simultaneously or sequentially touching left and right areas of the side display unit 252a is received, as shown in FIG. 14(c), the mobile terminal 250 can register a photographed image at the touch time as a bookmark and display a captured image at that time on the side display unit 252a.

Figure 15:
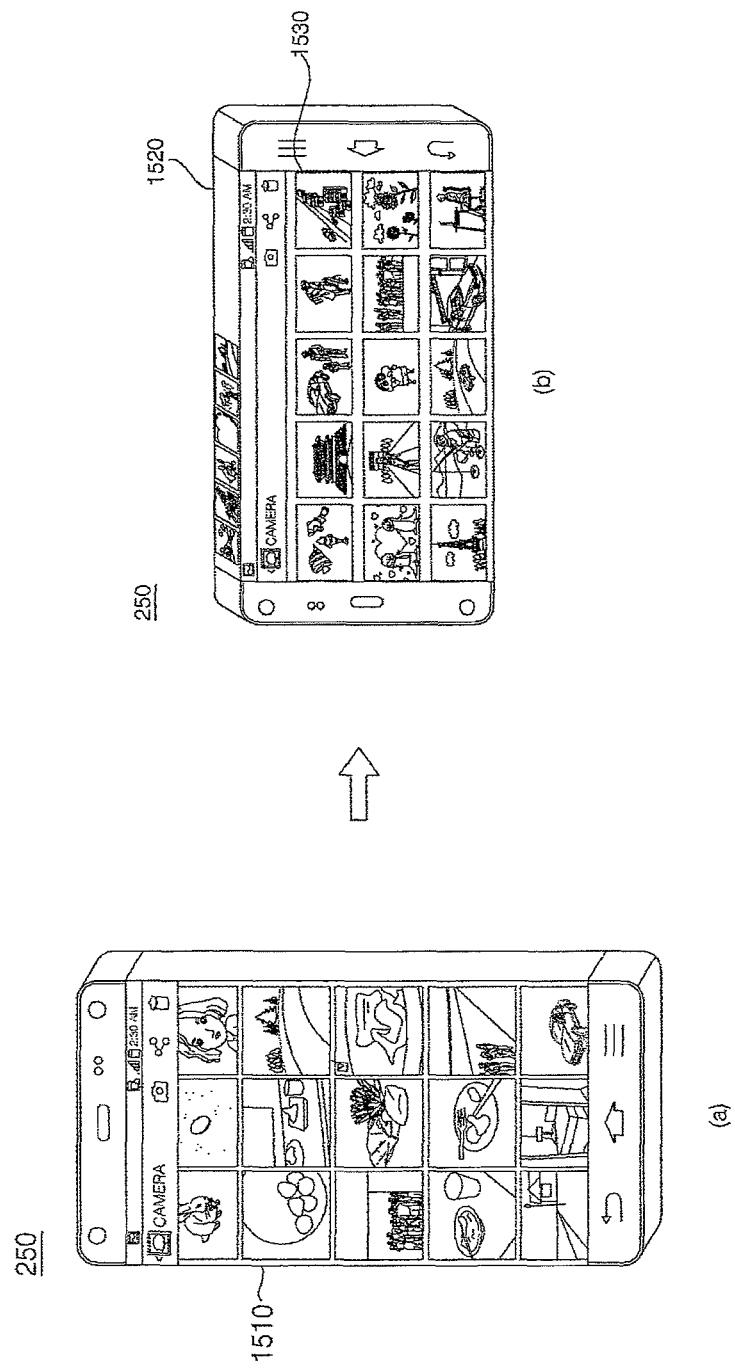
FIG. 15 is a reference view illustrating the operation of the mobile terminal for listing images that are frequently viewed using the side display unit in an image view mode.

FIG. 15 is a reference view illustrating the operation of the mobile terminal for listing images that are frequently viewed using the side display unit in an image view mode. Referring to FIG. 15, when a gallery application is executed, the mobile terminal 250 displays on the front display unit 251 an image list screen 1510 including a plurality of thumbnail images.

When the terminal body is rotated from the vertical direction to the horizontal direction, the mobile terminal 250 rotates the image list screen 1510 in a direction opposite to the rotational direction of the terminal body, fits the rotated image list screen to the horizontal mode screen, and displays the fitted image list screen on the front display unit 251. In addition, the mobile terminal 250 displays on the side display unit 252a an auxiliary screen 1520 including information related to the image list screen 1510 displayed on the front display unit 251. The auxiliary screen 1520 displayed on the side display unit 252a includes a list of albums or images on an image list screen 1530 which the user frequently views.

Figure 16:
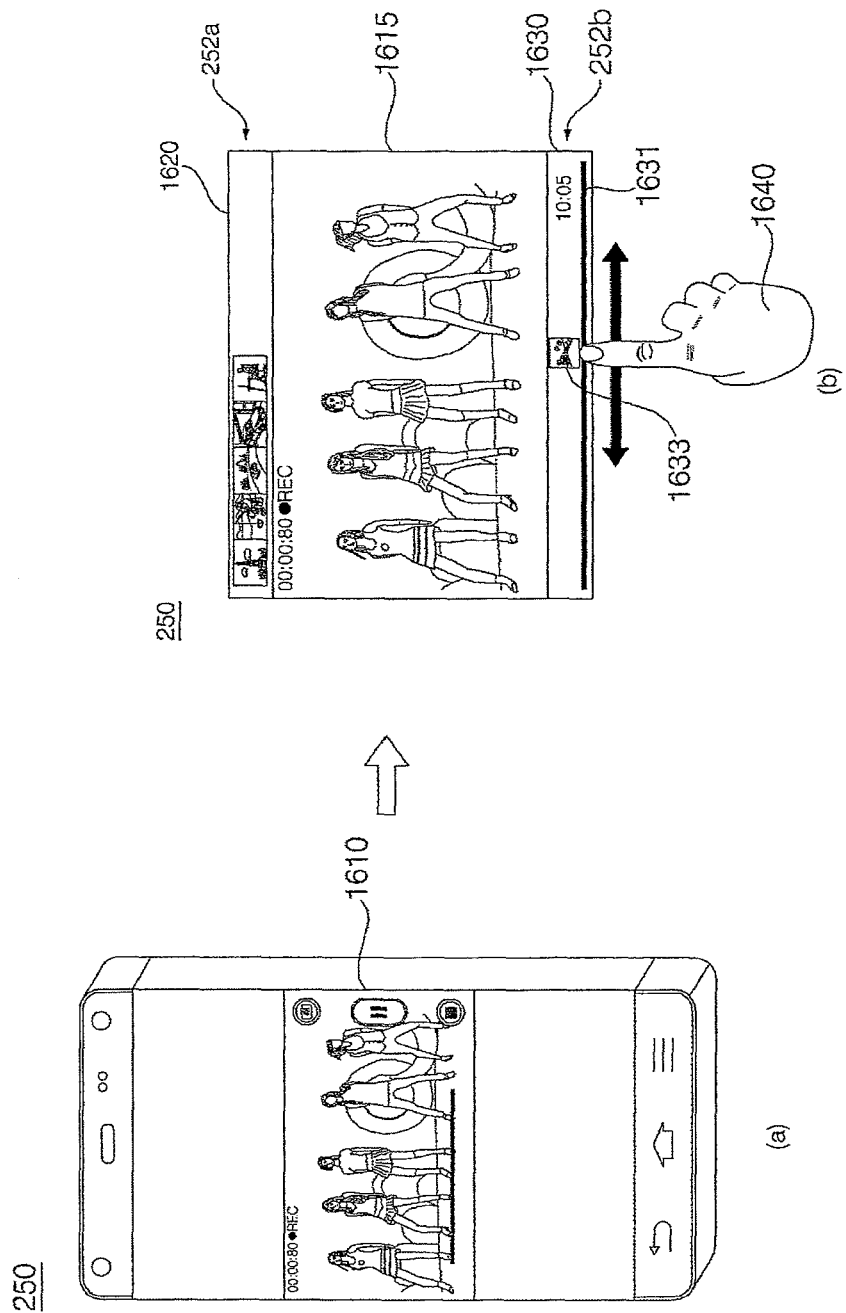
FIG. 16 is a reference view illustrating the operation of the mobile terminal for providing various kinds of information using the side display unit during video reproduction.

FIG. 16 is a reference view illustrating the operation of the mobile terminal for providing various kinds of information using the side display unit during video reproduction. Referring to FIG. 16, when a video application is executed, the mobile terminal 250 displays on the front display unit 251a video reproduction screen 1610 corresponding to a selected multimedia file.

When the terminal body is rotated from the vertical direction to the horizontal direction, the mobile terminal 250 rotates the video reproduction screen 1610 in a direction opposite to the rotational direction of the terminal body, fits the rotated video reproduction screen to the horizontal mode screen, and displays the fitted video reproduction screen on the front display unit 251. In addition, the mobile terminal 250 displays on the side display units 252a and 252b auxiliary screens 1620 and 1630 including information related to the video reproduction screen 1610 displayed on the front display unit 251. For example, the auxiliary screen 1620 displayed on the first side display unit 252a may include an image or a video file bookmarked during video reproduction or an indicator for indication per chapter.

In addition, the auxiliary screen 1630 displayed on the second side display unit 252b may include a progress bar 1631 indicating a progress state of a video file which is being reproduced and an operation control menu. When a user input 1640 of dragging in the left direction or the right direction through the progress bar 1631 is received, the mobile terminal 250 can move the reproduction time of a video screen 1615 displayed on the front display unit 251 forward or backward. In addition, a thumbnail image 1633 of the video file corresponding to a point at which the user input 1640 is located may be displayed on the second side display unit 252b.

Figure 17:
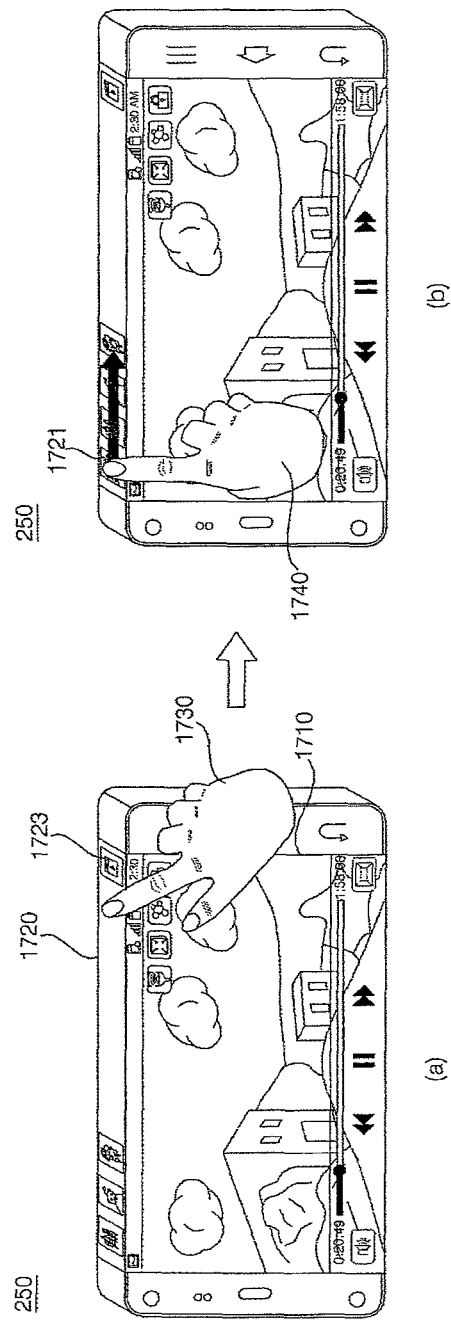
FIG. 17 is a reference view illustrating the operation of the mobile terminal for performing video editing using the side display unit during video reproduction.

FIG. 17 is a reference view illustrating the operation of the mobile terminal for performing video editing using the side display unit during video reproduction. Referring to FIG. 17, the mobile terminal 250 displays on the front display unit 251a video reproduction screen 1710 corresponding to a selected multimedia file in the horizontal mode. In addition, the mobile terminal 250 displays on the side display unit 252a an auxiliary screen 1720 including information related to the video reproduction screen 1710 displayed on the front display unit 251. The auxiliary screen 1720 displayed on the side display unit 252a may include a captured image and/or an edited video for video production and a video editor icon 1723.

When a multi-touch input 1730 of simultaneously or sequentially tapping a point of the front display unit 251 and a point of the side display unit 252a is received in a state in which the video reproduction screen 1710 is displayed on the front display unit 251, the mobile terminal 250 stores a captured image 1721 at the touch time, and displays the captured image 1721 on the side display unit 252a.

Further, when a multi-touch input of simultaneously or sequentially pressing and holding a point of the front display unit 251 and a point of the side display unit 252a is received, the mobile terminal 250 extracts and stores a video file reproduced during the press-hold time, and displays an image representing the stored video file on the side display unit 252a. Subsequently, when a gesture input 1740 of sliding a plurality of captured images and/or edited videos arranged on the side display unit 252a in the right direction is received, the mobile terminal 250 displays on the front display unit 251a video editing screen for performing video production based on the captured images and/or edited videos.

Figure 18A:
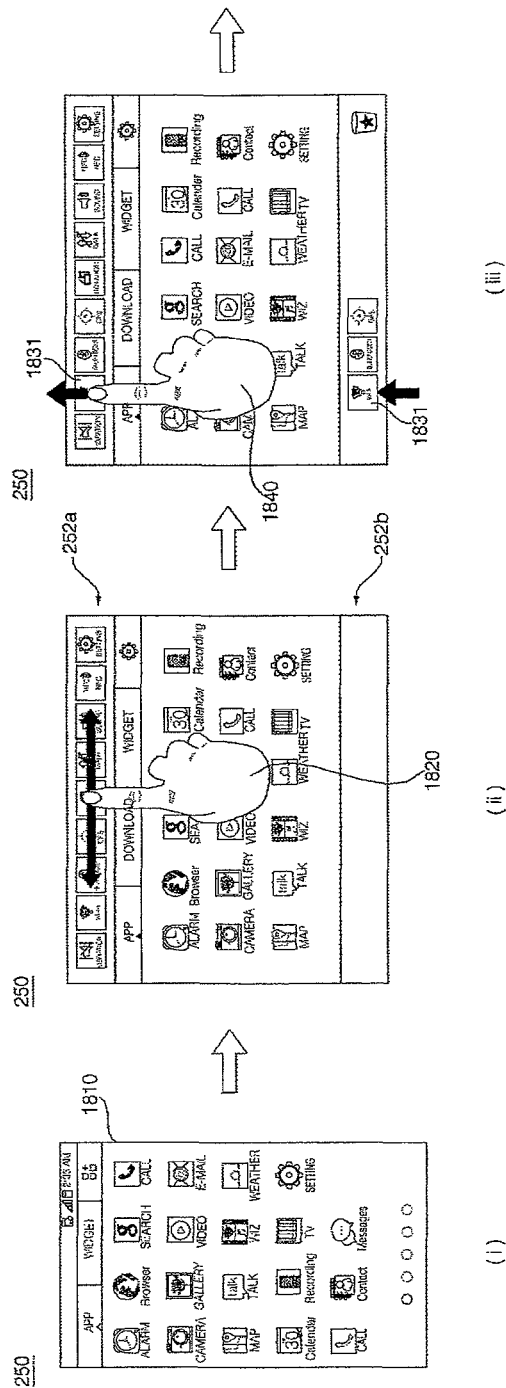
FIGS. 18a and 18b are reference views illustrating the operation of the mobile terminal for providing state icons indicating state information of the mobile terminal using the side display unit in the horizontal mode.
Figure 18B:
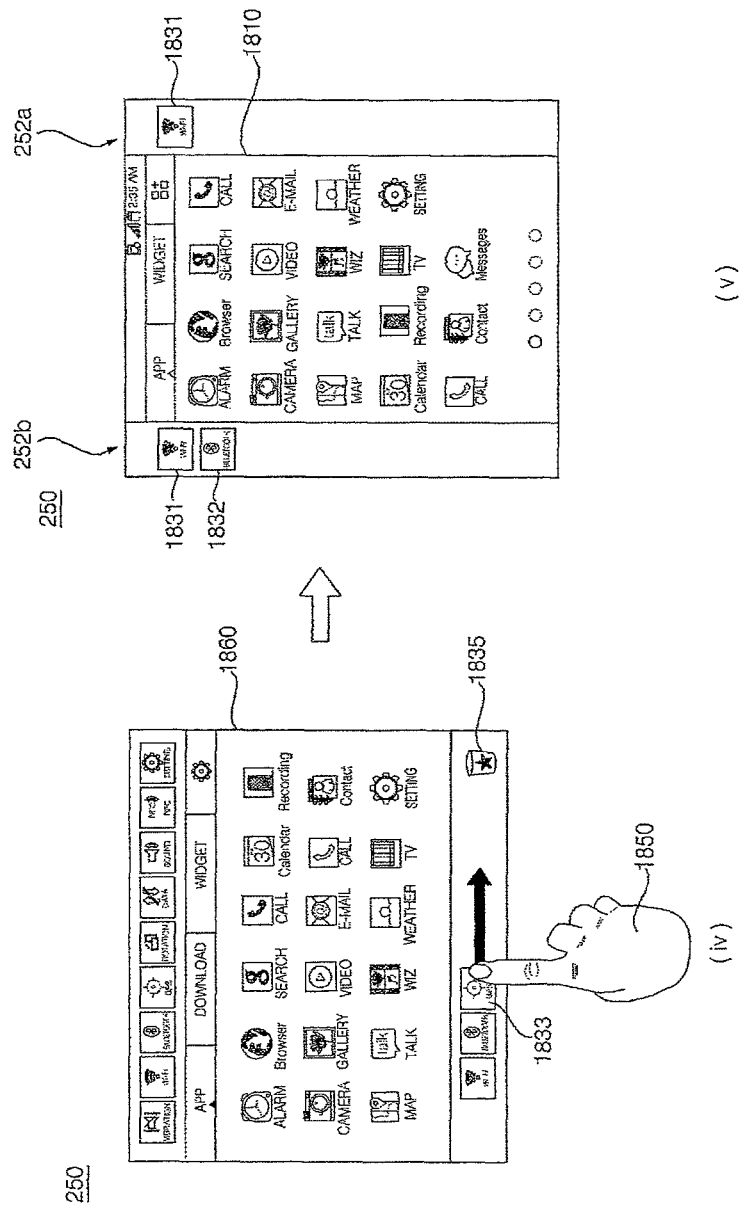

FIGS. 18a and 18b are reference views illustrating the operation of the mobile terminal for providing state icons indicating state information of the mobile terminal using the side display unit in the horizontal mode. Referring to FIG. 18a, the mobile terminal 250 displays an application screen 1810 on the front display unit 251 according to a user command, etc.

When the terminal body is rotated from the vertical direction to the horizontal direction in a state in which the application screen 1810 is displayed on the front display unit 251, the mobile terminal 250 rotates the application screen 1810 in a direction opposite to the rotational direction of the terminal body, fits the rotated application screen to the horizontal mode screen, and displays the fitted application screen on the front display unit 251.

In addition, the mobile terminal 250 displays on the first side display unit 252a state icons indicating information related to operation states of the mobile terminal. The state icons displayed on the first side display unit 252a include a Wi-Fi setting icon, a global positioning system (GPS) setting icon, a Bluetooth setting icon, a near field communication (NFC) setting icon, an airplane mode setting icon, a sound/vibration setting icon, and an automatic rotation icon. In addition, the state icons may be scrolled in the left or right direction according to a user flicking input 1820.

When any one of the state icons displayed on the first side display unit 252a is tapped, the mobile terminal 250 sets an operation corresponding to the tapped state icon. Further, when a user input 1840 of pressing and holding any one 1831 of the state icons displayed on the first side display unit 252a and flicking the press-hold state icon 1831 in the forward direction or the backward direction of the terminal body is received, as shown in FIG. 18a(iii), the mobile terminal 250 displays the flicked state icon 1831 on the second side display unit 252b. State icons displayed on the second side display unit 252b may be set as favorite items which are frequently used by the user.

In addition, when a user input 1850 of touching any one 1833 of the state icons displayed on the second side display unit 252b and then dragging the touched state icon 1833 toward a wastebasket icon 1835 is received, as shown in FIG. 18b(iv), the mobile terminal 250 deletes the dragged state icon 1833 from the screen.

Subsequently, when the terminal body is rotated from the horizontal direction to the vertical direction, the mobile terminal 250 rotates an application screen 180 in a direction opposite to the rotational direction of the terminal body, fits the rotated application screen to the vertical mode screen, and displays the fitted application screen on the front display unit 251. In addition, the mobile terminal 250 can display the state icon 1831 in an ON state on the first side display unit 252a and the favorite-registered state icons 1831 and 1832 on the second side display unit 252b in the vertical mode.

Figure 19:
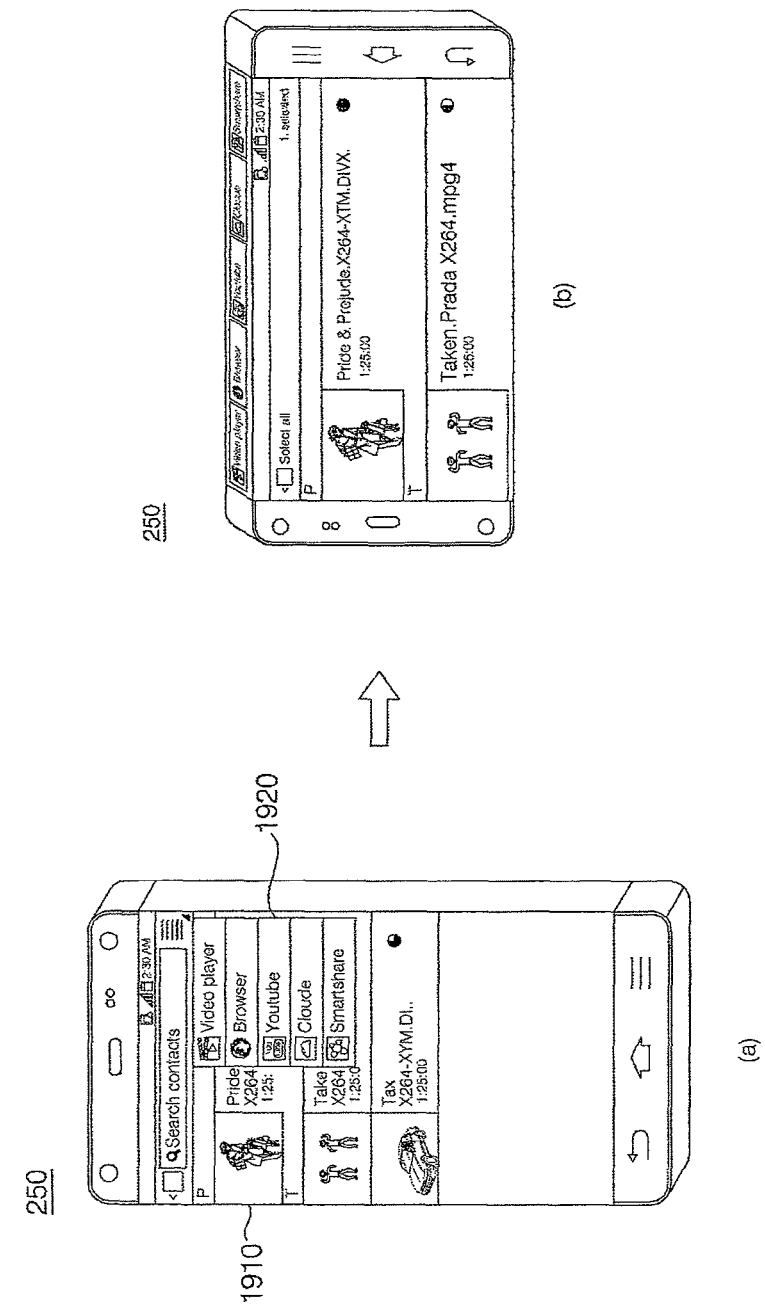
FIG. 19 is a reference view illustrating the operation of the mobile terminal for providing an option menu of a specific application using the side display unit in the horizontal mode.

FIG. 19 is a reference view illustrating the operation of the mobile terminal for providing an option menu of a specific application using the side display unit in the horizontal mode. Referring to FIG. 19, the mobile terminal 250 displays a specific application execution screen 1910 on the front display unit 251 according to a user command, etc. When a menu button is selected in a state in which the execution screen 1910 is displayed on the front display unit 251, the mobile terminal 250 displays an option menu 1920 of the corresponding application on a portion of the front display unit 251.

When the terminal body is rotated from the vertical direction to the horizontal direction in a state in which the execution screen 1910 and the option menu 1920 are displayed on the front display unit 251, the mobile terminal 250 rotates the execution screen 1910 in a direction opposite to the rotational direction of the terminal body, fits the rotated execution screen to the horizontal mode screen, and displays the fitted execution screen on the front display unit 251.

Further, the mobile terminal 250 moves items of the option menu 1920 to the side display unit 252a to display the items of the option menu 1920 on the side display unit 252a. Consequently, it is possible for the user to perform a desired operation while simultaneously viewing the execution screen and the option menu through the front and side display units.

According to the embodiment of the present invention as described above, the operation screen displayed on the front display unit in the horizontal mode includes the photographing or video recording screen, the image viewer screen, the video viewer screen, the application screen, or the specific application execution screen by way of example. However, those skilled in the art will appreciate that the technical idea of the present invention can be applied to various other operation screens.

In the above description, the operation of the mobile terminal for displaying on the side display unit the auxiliary screen related to the operation screen displayed on the front display unit in the horizontal mode was discussed. Hereinafter, a detailed description will be given of a mobile terminal that is capable of easily arranging a plurality of images stored in a gallery using a side display unit in accordance with a second embodiment of the present invention and a method for controlling the mobile terminal.

Figure 20:
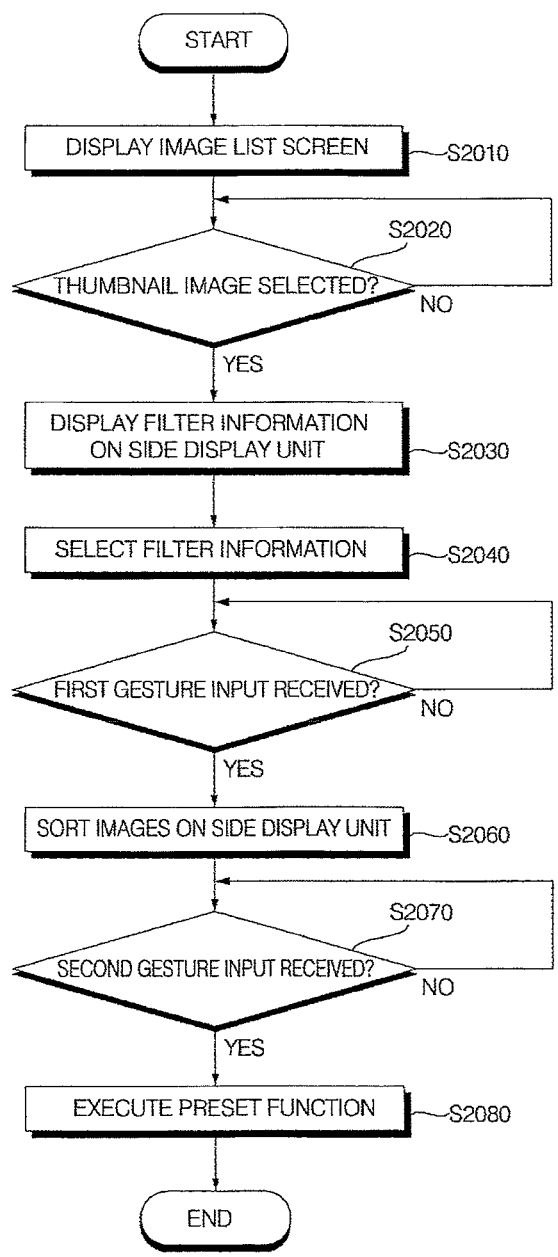
FIG. 20 is a flowchart illustrating a method for controlling a mobile terminal according to a second embodiment of the present invention.

FIG. 20 is a flowchart illustrating the operation of a mobile terminal according to a second embodiment of the present invention. Hereinafter, in this embodiment, the operation of a mobile terminal for sorting a plurality of images stored in a gallery using a single side display unit will be described. Referring to FIG. 20, the controller 180 displays an image list screen on the front display unit 251 according to a user command, etc. (S2010). The image list screen includes a plurality of thumbnail images corresponding to image files stored in the gallery or a sub folder thereof.

When a specific thumbnail image is selected in a state in which the image list screen is displayed on the front display unit 251 (S2020), the controller 180 displays filter information related to the selected thumbnail image on the single side display unit 252a (S2030). The filter information is a kind of category or attribute information for extracting images related to the selected thumbnail image, which is one of the thumbnail images arranged on the image list screen. Examples of the filter info' nation include date, place, character, tag, food, and weather. However, the present invention is not limited thereto. In addition, the filter information may be arbitrarily created by the user.

The controller 180 selects at least one from among a plurality of filter information items arranged on the single side display unit 252a according to a user selection command (S2040). Further, when two or more of the filter information items are selected by the user, the controller 180 extracts and sorts thumbnail images satisfying all of the selected two or more filter information items (i.e., filter conditions).

When a predetermined first gesture input is received in a state in which at least one of the filter information items is displayed on the side display unit 252a (S2050), the controller 180 extracts ones satisfying the selected filter conditions from among the thumbnail images arranged on the image list screen and displays the extracted thumbnail images on the side display unit 252a (S2060). The predetermined first gesture input may be a user input of inclining the mobile terminal 250 toward the side display unit 252a by a predetermined angle or more or a user input of shaking the mobile terminal 250 in the left and right directions for a predetermined number of times. However, the present invention is not limited thereto.

Subsequently, when a predetermined second gesture input is received through the side display unit 252a (S2070), the controller 180 can automatically insert the thumbnail images arranged on the side display unit 252a into a folder or interlock the thumbnail images with a specific application (S2080). The predetermined second gesture input may be a user input of touching a first thumbnail image arranged on the side display unit 252a and then dragging the touched first thumbnail image in the downward direction or a user input of touching a specific icon displayed on the side display unit 252a. However, the present invention is not limited thereto.

In the mobile terminal according to the second embodiment of the present invention as described in detail above, it is possible to sort thumbnail images arranged on the image list screen per category using one side display unit together with the front display unit and to automatically insert the sorted thumbnail images into a folder or to interlock the sorted thumbnail images with a specific application.

Hereinafter, the operation of the mobile terminal according to the second embodiment of the present invention will be described in detail with reference to FIGS. 21 to 29. In particular, FIGS. 21 and 22 are views illustrating the operation of the mobile terminal for providing filter information related to a thumbnail image selected from a gallery screen to the side display unit.

Figure 21:
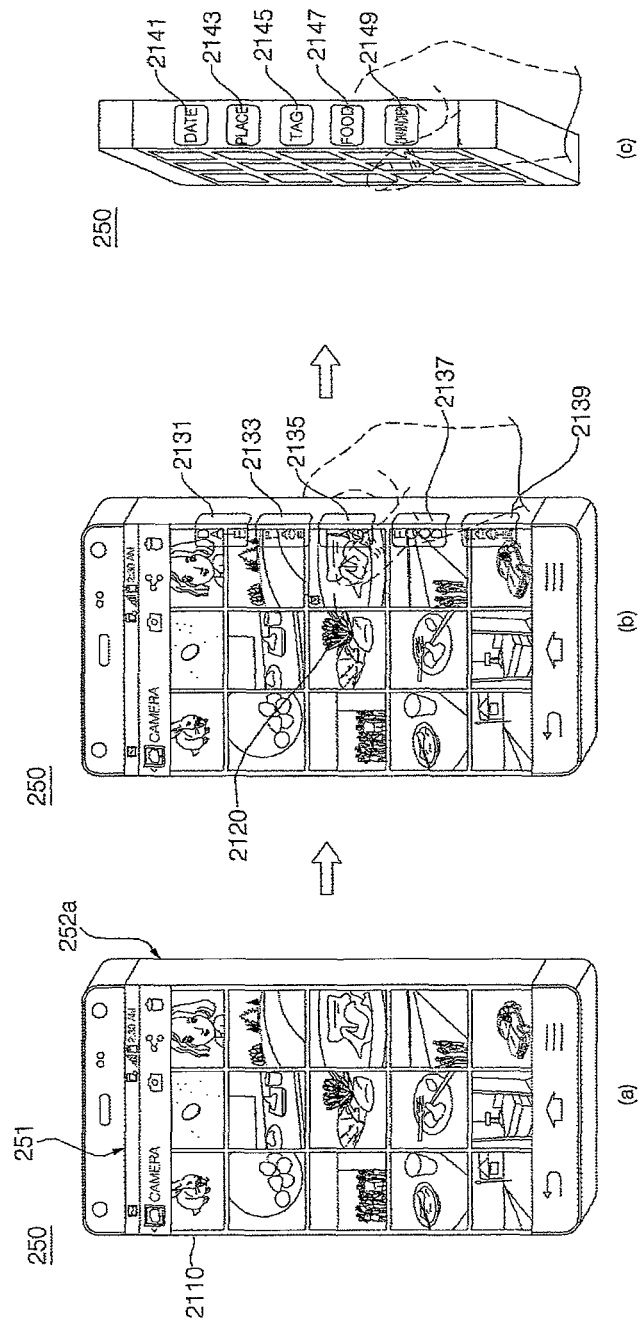
FIGS. 21 to 29 are reference views illustrating the operation of the mobile terminal according to the second embodiment of the present invention.

Referring to FIG. 21, the mobile terminal 250 displays an image list screen (or a gallery screen) 2110 on the front display unit 251 according to a user command, etc. When a specific thumbnail image 2120 is touched for a predetermined time in a state in which the image list screen 2110 is displayed on the front display unit 251, the mobile terminal 250 displays filter information items 2131, 2133, 2135, 2137, and 2139 related to the touched thumbnail image 2120 over a right boundary area of the front display unit 251 and a left boundary area of the side display unit 252a. That is, when the filter information is displayed, a predetermined folding effect is applied between the front display unit 251 and the side display unit 252a to guide the user to view the mobile terminal 250 while rotating the mobile terminal 250 from the front thereof in the side direction. The following description will be given on the assumption that the filter information items 2131, 2133, 2135, 2137, and 2139 displayed on the screen are date, place, tag, food, and characters, respectively.

When the terminal body is rotated such that the side display unit 252a can be located at the front of the user, as shown in FIG. 21(c), the mobile terminal 250 moves the filter information items 2131, 2133, 2135, 2137, and 2139 displayed between the front display unit 251 and the side display unit 252a to the side display unit 252a, and enlarges and displays the moved filter information items 2141, 2143, 2145, 2147, and 2149.

Figure 22:
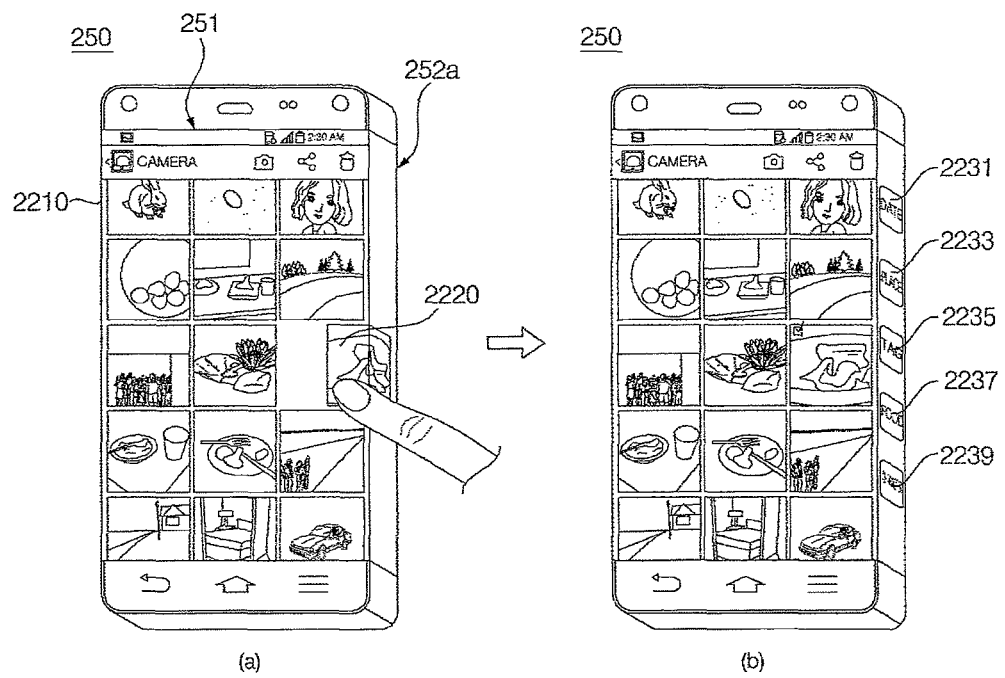

In another embodiment, referring to FIG. 22, the mobile terminal 250 displays an image list screen (or a gallery screen) 2210 on the front display unit 251 according to a user command, etc. When a user input of touching a specific thumbnail image 2220 and then dragging the touched thumbnail image 2220 toward the side display unit 252a is received in a state in which the image list screen 2210 is displayed on the front display unit 251, the mobile terminal 250 can display on the side display unit 252a filter information items 2231, 2233, 2235, 2237, and 2239 related to the dragged thumbnail image 2220.

Figure 23:
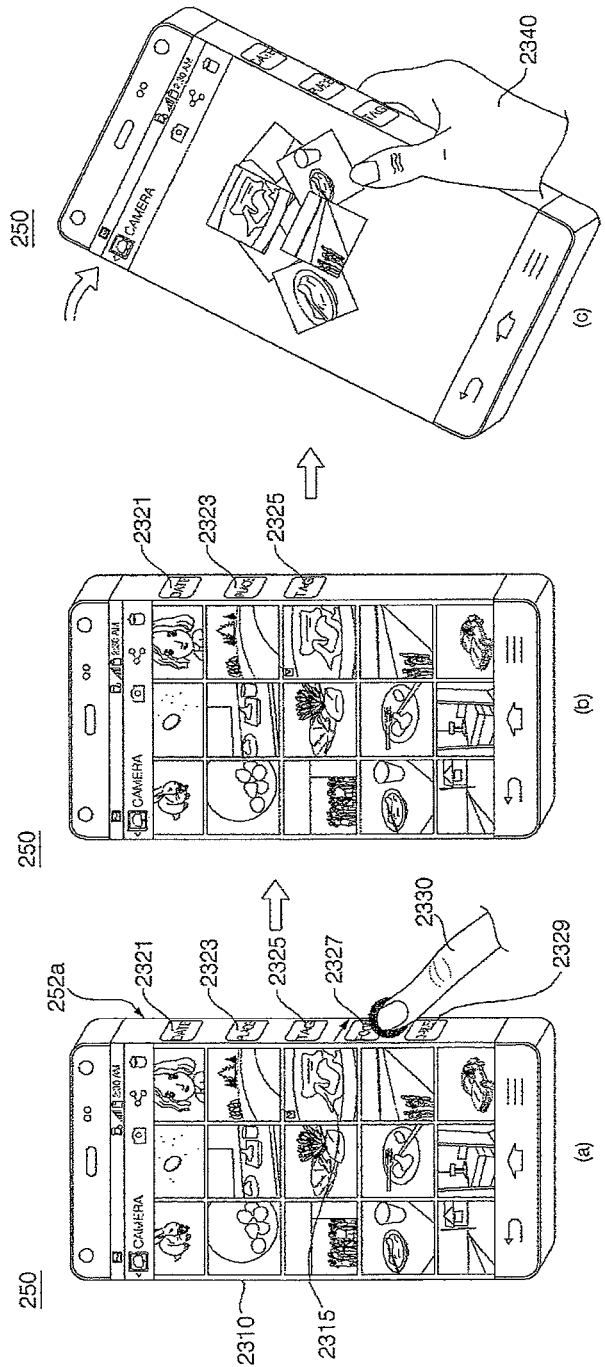
Figure 24:
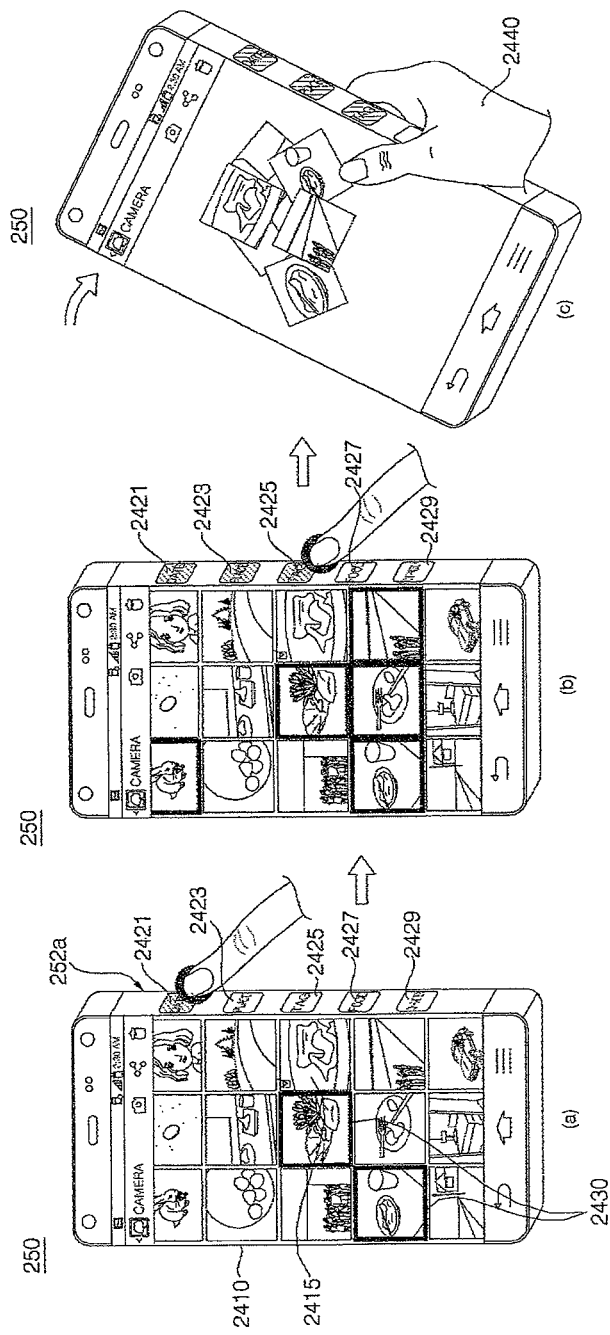

FIGS. 23 and 24 are views illustrating the operation of the mobile terminal for selecting a desired one from among the filter information items arranged on the side display unit and extracting thumbnail images satisfying a selected filter condition. Referring to FIG. 23, the mobile terminal 250 displays on the side display unit 252a filter information items 2321, 2323, 2325, 2327, and 2329 related to a thumbnail image 2315 selected from an image list screen 2310.

When a user input 2330 of touching the filter information item 2327 regarding 'food' and then flicking the touched filter information item 2327 in the outward direction of the side display unit 252a is received in a state in which the filter information items 2321, 2323, 2325, 2327, and 2329 are displayed on the side display unit 252a, the mobile terminal 250 can delete the filter information item 2327 from the side display unit 252a.

In the same manner, when a user input of touching the filter information item 2329 regarding 'character' and then flicking the touched filter information item 2329 in the outward direction of the side display unit 252a is received, the mobile terminal 250 can delete the filter information item 2329 from the side display unit 252a. The user of the mobile terminal 250 can have only desired ones 2321, 2323, and 2325 of the filter information items displayed on the side display unit 252a through the above deleting processes.

Subsequently, when a user input 2340 of inclining the terminal body toward the side display unit 252a by a predetermined angle or more is received in a state in which at least one selected filter information item is displayed on the side display unit 252a, the mobile terminal 250 extracts ones satisfying the selected filter condition from among the thumbnail images arranged on the image list screen 2310 and displays the extracted thumbnail images on the side display unit 252a. That is, the mobile terminal 250 arranges on the side display unit 252a thumbnail images coinciding with the selected thumbnail image 2315 in terms of a date condition, a place condition, and a tag condition. In addition, the mobile terminal 250 can also display the selected thumbnail image 2315 on the side display unit 252a.

Further, when the terminal body is inclined in one direction, as shown in FIG. 23(c), the mobile terminal 250 can provide a screen effect in which the extracted thumbnail images pour down in the direction in which the terminal body is inclined. In another embodiment, referring to FIG. 24, mobile terminal 250 displays on the side display unit 252a filter information items 2421, 2423, 2425, 2427, and 2429 related to a thumbnail image 2415 selected from an image list screen 2410.

When the filter information item 2421 regarding 'date' is selected in a state in which the filter information items 2421, 2423, 2425, 2427, and 2429 are displayed on the side display unit 252a, the mobile terminal 250 can vary the color or shape of the filter information item 2421 to inform the user that the filter information item 2421 has been selected. In addition, the mobile terminal 250 can display on the image list screen 2410 thumbnail images coinciding with the selected thumbnail image 2415 in terms of a date condition differently from the other thumbnail images. For example, as shown in FIG. 24(a), the mobile terminal 250 can display the thumbnail images satisfying the selected date condition such that a boundary 2430 of each of the thumbnail images is highlighted.

In the same manner, when the filter information items 2423 and 2425 regarding 'place' and 'tag' are sequentially selected, as shown in FIG. 24(b), the mobile terminal 250 can vary the color or shape of each of the filter information items 2423 and 2425 and display the thumbnail images satisfying the place and tag conditions such that a boundary of each of the thumbnail images is highlighted.

Subsequently, when a user input 2440 of inclining the terminal body toward the side display unit 252a by a predetermined angle or more is received, the mobile terminal 250 extracts ones satisfying the selected filter conditions from among the thumbnail images arranged on the image list screen 2410 and displays the extracted thumbnail images on the side display unit 252a. That is, the mobile terminal 250 arranges on the side display unit 252a thumbnail images coinciding with the selected thumbnail image 2415 in terms of a date condition, a place condition, and a tag condition. In addition, the mobile terminal 250 can also display the selected thumbnail image 2415 on the side display unit 252a.

Further, when the terminal body is inclined in one direction, as shown in FIG. 24(c), the mobile terminal 250 can provide a screen effect in which the extracted thumbnail images pour down in the direction in which the terminal body is inclined.

Figure 25:
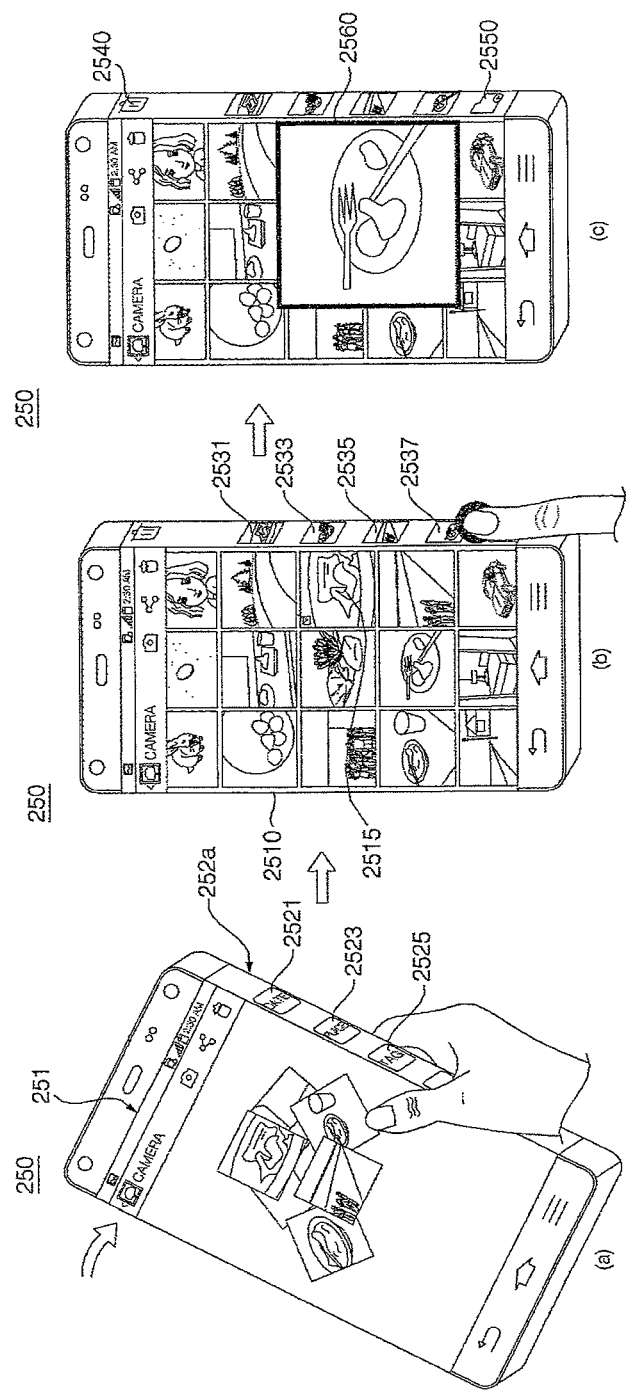

FIG. 25 is a view illustrating the operation of the mobile terminal for arranging on the side display unit thumbnail images extracted according to a selected filter condition when the terminal body is rotated. Referring to FIG. 25, when the terminal body is rotated in the left direction, the mobile terminal 250 extracts from a gallery screen 2510 thumbnail images 2533, 2535, and 2537 coinciding with a preselected thumbnail image 2515 in terms of a date condition 2521, a place condition 2523, and a tag condition 2525, and displays the extracted thumbnail images 2533, 2535, and 2537 on the side display unit 252a. Further, the mobile terminal 250 can also display the selected thumbnail image 2531 on the side display unit 252a.

In addition, the mobile terminal 250 can display on the side display unit 252a a delete icon 2540 for deleting at least one of the arranged thumbnail images 2531, 2533, 2535, and 2537 and a function setting icon 2550 for interlocking the thumbnail images with a specific application.

When any one 2537 of the thumbnail images arranged on the side display unit 252a is selected, as shown in FIG. 15(c), the mobile terminal 250 can display an enlarged image 2560 corresponding to the selected thumbnail image 2537 on a portion of the front display unit 251. Consequently, the user can enlarge the thumbnail images arranged on the side display unit 252a to easily recognize the respective thumbnail images.

Figure 26:
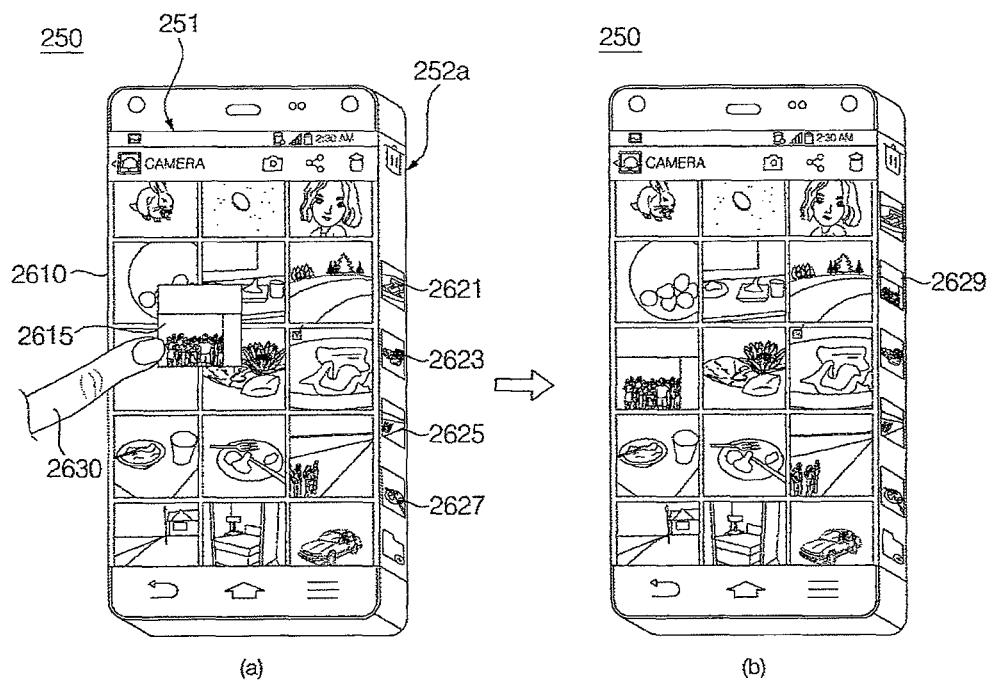

FIG. 26 is a view illustrating the operation of the mobile terminal for arbitrarily adding a thumbnail image which does not satisfy a preselected filter condition to the side display unit 252a. Referring to FIG. 26, the mobile terminal 250 displays an image list screen 2610 on the front display unit 251. In addition, the mobile terminal 250 displays on the side display unit 252a thumbnail images 2621, 2623, 2625, and 2627 sorted according to a preselected filter condition.

When a user input 2630 of touching any one 2615 of the thumbnail images which do not satisfy the preselected filter condition on the image list screen 2610 and then dragging the touched thumbnail image between the first and second thumbnail images 2621 and 2623 displayed on the side display unit 252a is received, the mobile terminal 250 can insert and display the dragged thumbnail image 2629 between the first and second thumbnail images 2621 and 2623. Consequently, the mobile terminal 250 can arbitrarily add other images to the side display unit 252a in addition to the image filtered by the user command.

Figure 27:
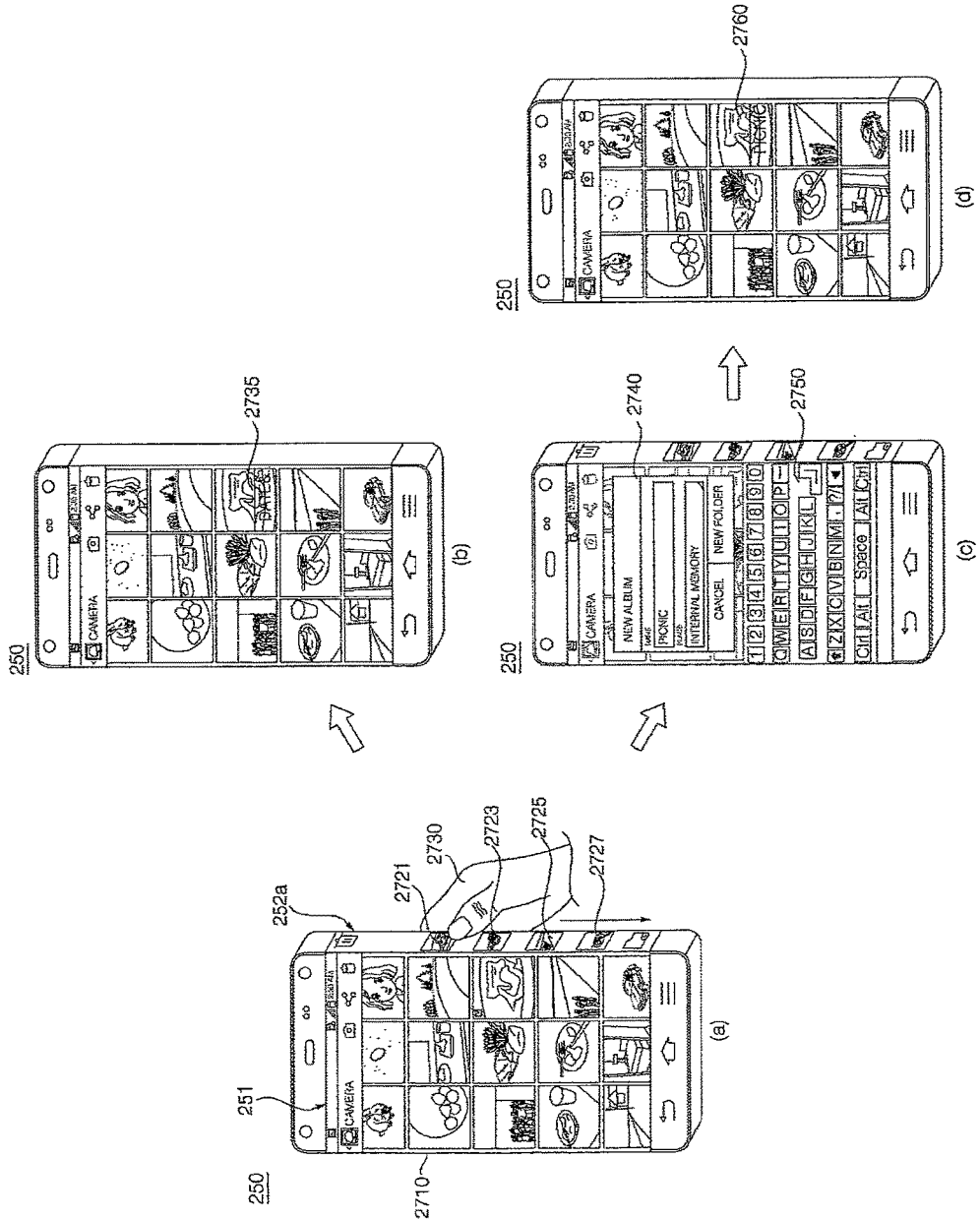

FIG. 27 is a view illustrating the operation of the mobile terminal for inserting thumbnail images arranged on the side display unit into a folder. Referring to FIG. 27, the mobile terminal 250 displays an image list screen 2710 on the front display unit 251. In addition, the mobile terminal 250 displays on the side display unit 252a thumbnail images 2721, 2723, 2725, and 2727 sorted according to a preselected filter condition.

Subsequently, when a user input 2730 of touching the first thumbnail image 2721 displayed on the side display unit 252a and then dragging the touched first thumbnail image in the downward direction is received, as shown in FIGS. 27(a) and 27(b), the mobile terminal 250 automatically creates a new folder 2735 and then moves the thumbnail images 2721, 2723, 2725, and 2727 arranged on the side display unit 252a to the automatically created folder. Further, the name of the new folder 2735 may be automatically created according to preselected filter information.

In another embodiment, when the user input 2730 of touching the first thumbnail image 2721 displayed on the side display unit 252a and then dragging the touched first thumbnail image in the downward direction is received, as shown in FIGS. 27(a) and 27(c), the mobile terminal 250 displays on the front display unit 251a text input window 2740 and a keypad window 2750 for allowing the user to input the name of the new folder.

When the name of the new folder is input through the text input window 2740, the mobile terminal 250 creates a folder 2760 having the input name and then moves the thumbnail images 2721, 2723, 2725, and 2727 arranged on the side display unit 252a to the new folder 2760. Subsequently, the mobile terminal 250 controls the thumbnail images and icons displayed on the side display unit 252a to disappear from the screen.

Figure 28:
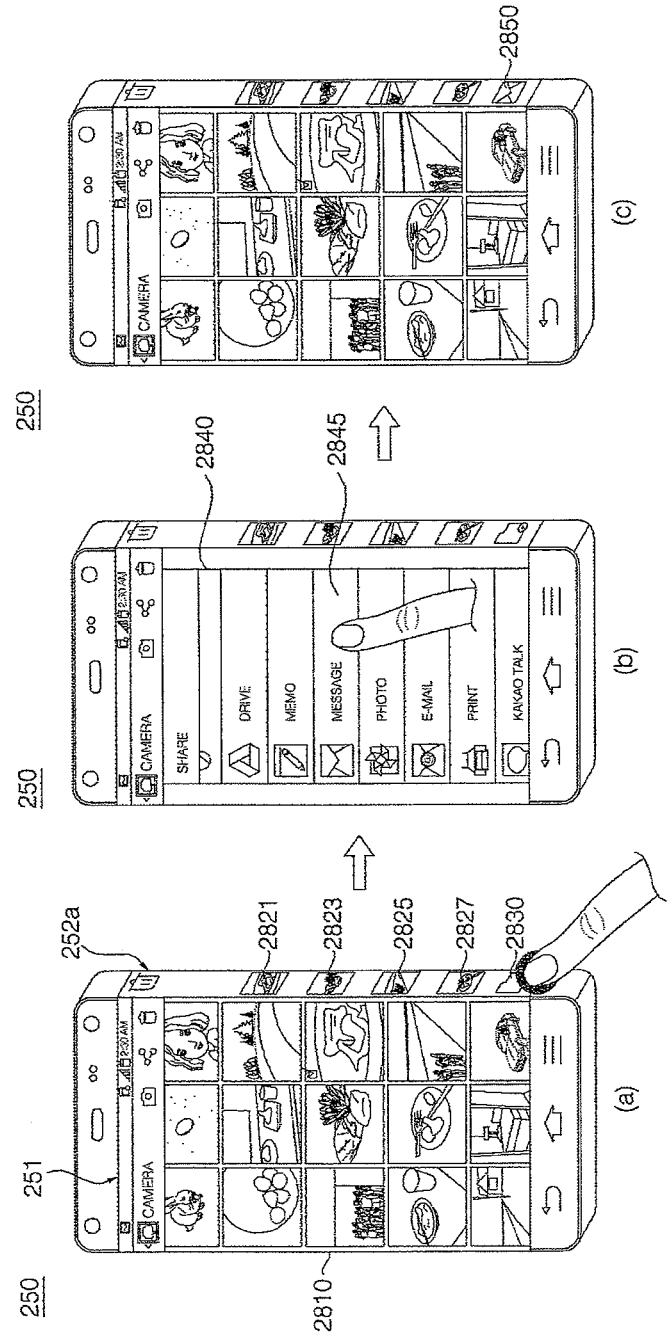
Figure 29:
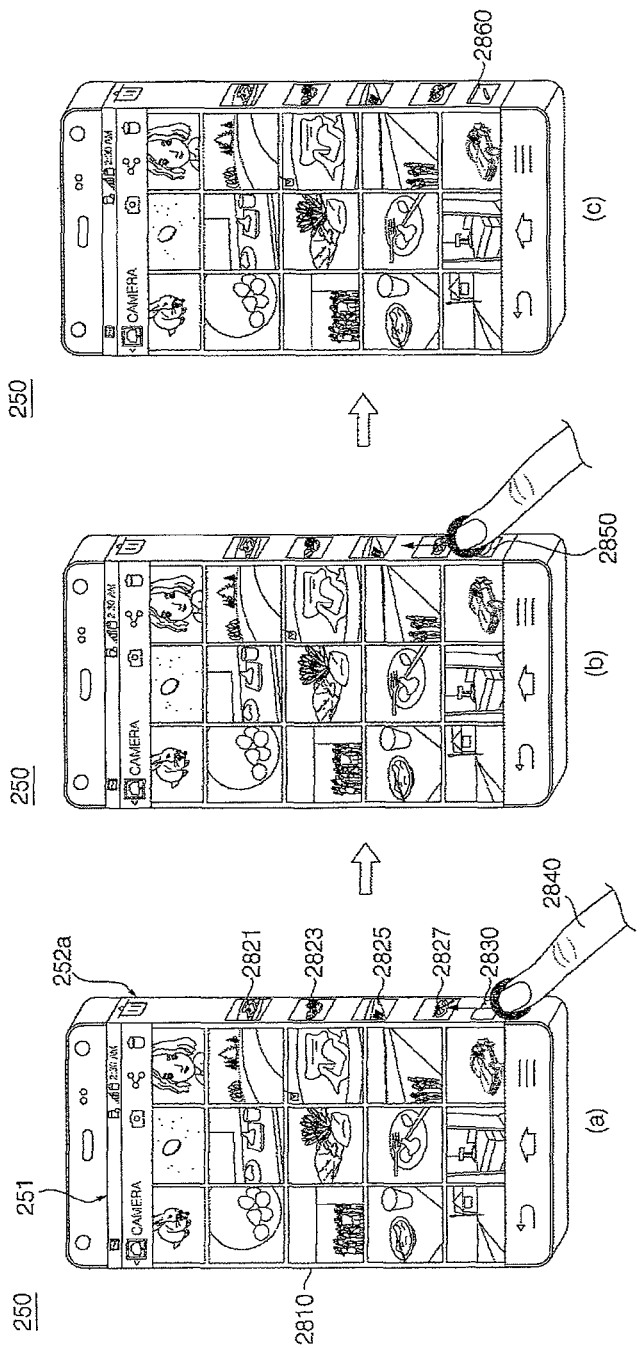

FIGS. 28 and 29 are views illustrating the operation of the mobile terminal for interlocking thumbnail images arranged on the side display unit with a specific application. Referring to FIG. 28, the mobile terminal 250 displays an image list screen 2810 on the front display unit 251. In addition, the mobile terminal 250 displays on the side display unit 252a thumbnail images 2821, 2823, 2825, and 2827 sorted according to a preselected filter condition.

The mobile terminal 250 can display a function setting icon 2830 for interlocking the sorted thumbnail images 2821, 2823, 2825, and 2827 with a specific application on the lower end of the side display unit 252a. When the function setting icon 2830 is selected, the mobile terminal 250 displays an application selection window 2840 on the front display unit 251. The application selection window 2840 includes a plurality of applications installed in the mobile terminal 250.

When a message menu 2845 is selected through application selection window 2840, the mobile terminal 250 decides an application to be interlocked with the thumbnail images 2821, 2823, 2825, and 2827 as a message application. In addition, as shown in FIG. 28(*c*), the mobile terminal 250 changes the shape of the function setting icon from a folder icon 2830 to a message icon 2850.

Subsequently, when a user input of sliding the side display unit 252*a* from top to bottom is received, the mobile terminal 250 can execute the message application to display a message editing screen on the front display unit 251 and to add the thumbnail images 2821, 2823, 2825, and 2827 to the message editing screen. In another embodiment, referring to FIG. 29, the mobile terminal 250 can display a function setting icon 2830 for interlocking the thumbnail images 2821, 2823, 2825, and 2827 with a specific application on the lower end of the side display unit 252*a*.

When a slide input 2840 of touching the function setting icon 2830 and then slowly dragging the touched function setting icon in the upward direction is received, the mobile terminal 250 sequentially displays icons 2850 and 2860 corresponding to applications that can be interlocked with the thumbnail images on a function setting icon area. Further, the speed of the slide input 2840 may be increased such that the application icons displayed on the function setting icon area can be more rapidly changed.

When an icon 2850 corresponding to a desired application appears on the function setting icon area 2830, the user of the mobile terminal 250 can stop the slide input 2840 to select the desired application. Further, when no function setting icon is selected unlike FIGS. 28 and 29, a function for automatically inserting the thumbnail images arranged on the side display unit 252*a* into a folder may be set by default.

In addition, when the user enters a gallery mode for adding images in a state in which a specific application is being executed, the mobile terminal 250 can display an application icon corresponding to the specific application on the function setting icon area. In the above description, the method of arranging images stored in the gallery using the side display unit 252*a* disposed at the right side of the terminal body was discussed with reference to FIGS. 21 to 29 by way of example. However, those skilled in the art will appreciate that the technical idea of the present invention can be equally applied to the side display unit 252*b* disposed at the left side of the terminal body.

Figure 30:
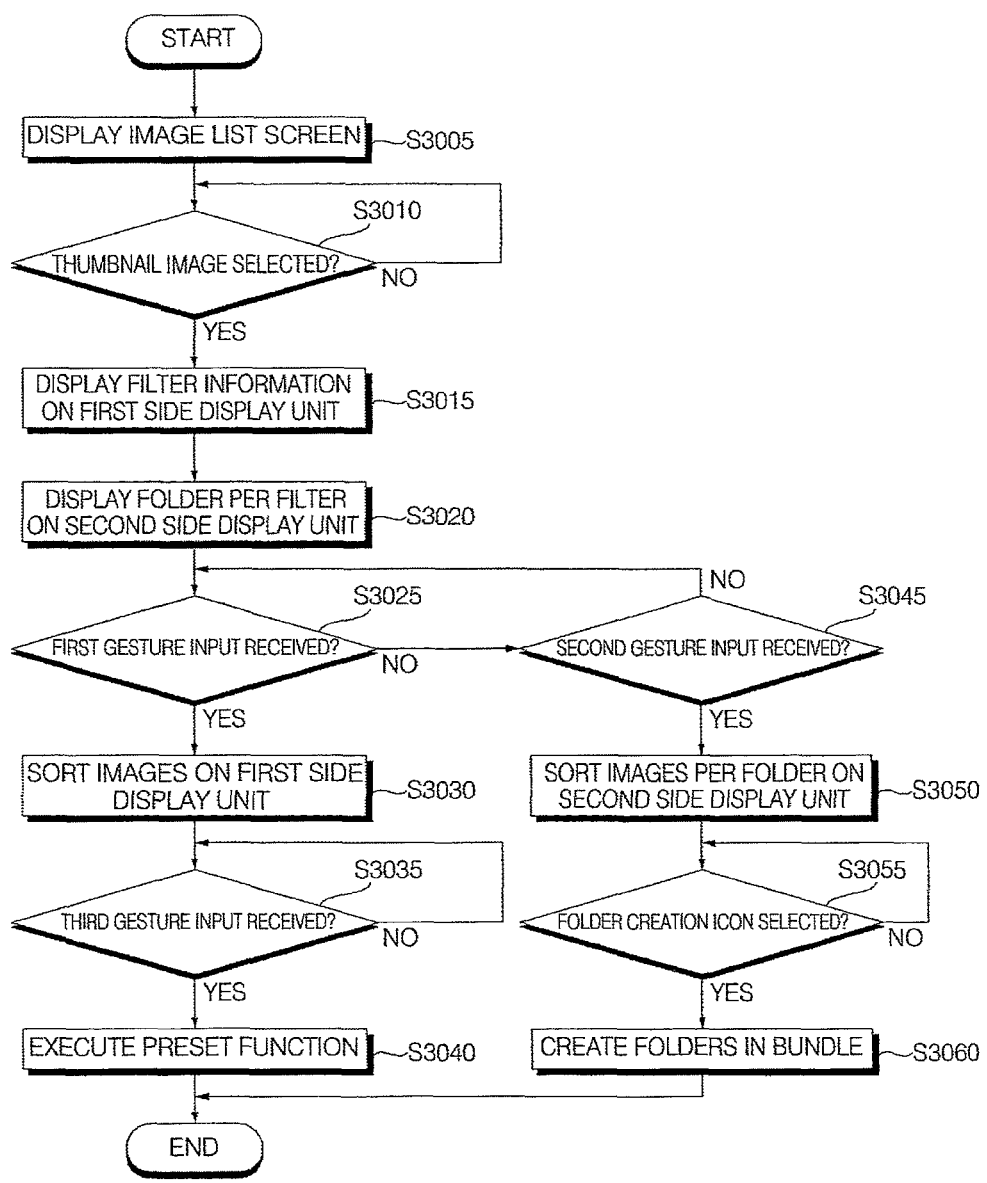
FIG. 30 is a flowchart illustrating a method for controlling a mobile terminal according to a third embodiment of the present invention.

FIG. 30 is a flowchart illustrating the operation of a mobile terminal according to a third embodiment of the present invention. Hereinafter, in this embodiment, the operation of a mobile terminal for arranging a plurality of images stored in a gallery using opposite side display units will be described. Referring to FIG. 30, the controller 180 displays an image list screen on the front display unit 251 according to a user command, etc. (S3005). The image list screen includes a plurality of thumbnail images corresponding to image files stored in the gallery or a sub folder thereof.

When a specific thumbnail image is selected in a state in which the image list screen is displayed on the front display unit 251 (S3010), the controller 180 displays filter information related to the selected thumbnail image on the first side display unit 252*a* (S3015). The filter information displayed on the first side display unit 252*a* may be selected by the user. In addition, the controller 180 displays folders corresponding to filter information related to the selected thumbnail image on the second side display unit 252*b* (S3020). The folders displayed on the second side display unit 252*b* are ones for automatically arranging thumbnail images corresponding to the filter information.

The controller 180 can select at least one from among a plurality of filter information items arranged on the first side display unit 252*a* according to a user selection command. In addition, controller 180 may select at least one from among a plurality of folders arranged on the second side display unit 252*b* according to a user selection command. When at least one filter information item and at least one folder are selected, the controller 180 can determine whether a gesture input of rotating the terminal body in a predetermined direction has been input (S3025 and S3045).

When it is determined at step S3025 that a predetermined first gesture input has been input, the controller 180 extracts ones satisfying the selected filter condition from among the thumbnail images arranged on the image list screen and displays the extracted thumbnail images on the side display unit 252*a* (S3030). The predetermined first gesture input may be a user input of inclining the terminal body toward the first side display unit 252*a* by a predetermined angle or more. However, the present invention is not limited thereto.

Subsequently, when a predetermined third gesture input is received through the first side display unit 252*a* (S3035), the controller 180 can folder the thumbnail images arranged on the first side display unit 252*a* or interlock the thumbnail images with a specific application (S3040). The predetermined third gesture input may be a user input of touching a first thumbnail image arranged on the first side display unit 252*a* and then dragging the touched first thumbnail image in the downward direction or a user input of touching a predetermined icon. However, the present invention is not limited thereto.

Further, when it is determined at step S3045 that a predetermined second gesture input has been input, the controller 180 automatically sorts the thumbnail images arranged on the image list screen per folder and displays the thumbnail images sorted per folder on the second side display unit 252*b*. The predetermined second gesture input may be a user input of inclining the terminal body toward the second side display unit 252*b* by a predetermined angle or more. However, the present invention is not limited thereto. Subsequently, when a folder creation icon displayed on the second side display unit 252*b* is selected (S3055), the mobile terminal 250 creates folders per filter in a bundle and stores the created folders in the gallery (S3060).

In the mobile terminal according to the third embodiment of the present invention as described in detail above, it is possible to easily sort thumbnail images arranged on the image list screen using opposite side display units and to automatically insert the sorted thumbnail images into a folder or to interlock the sorted thumbnail images with a specific application.

Hereinafter, the operation of the mobile terminal according to the third embodiment of the present invention will be described in detail with reference to FIGS. 31 to 39. In particular, FIG. 31 is a view illustrating the operation of the mobile terminal for providing filter information related to a thumbnail image selected from a gallery screen and folders corresponding to the filter information to the opposite side display units.

Figure 31:
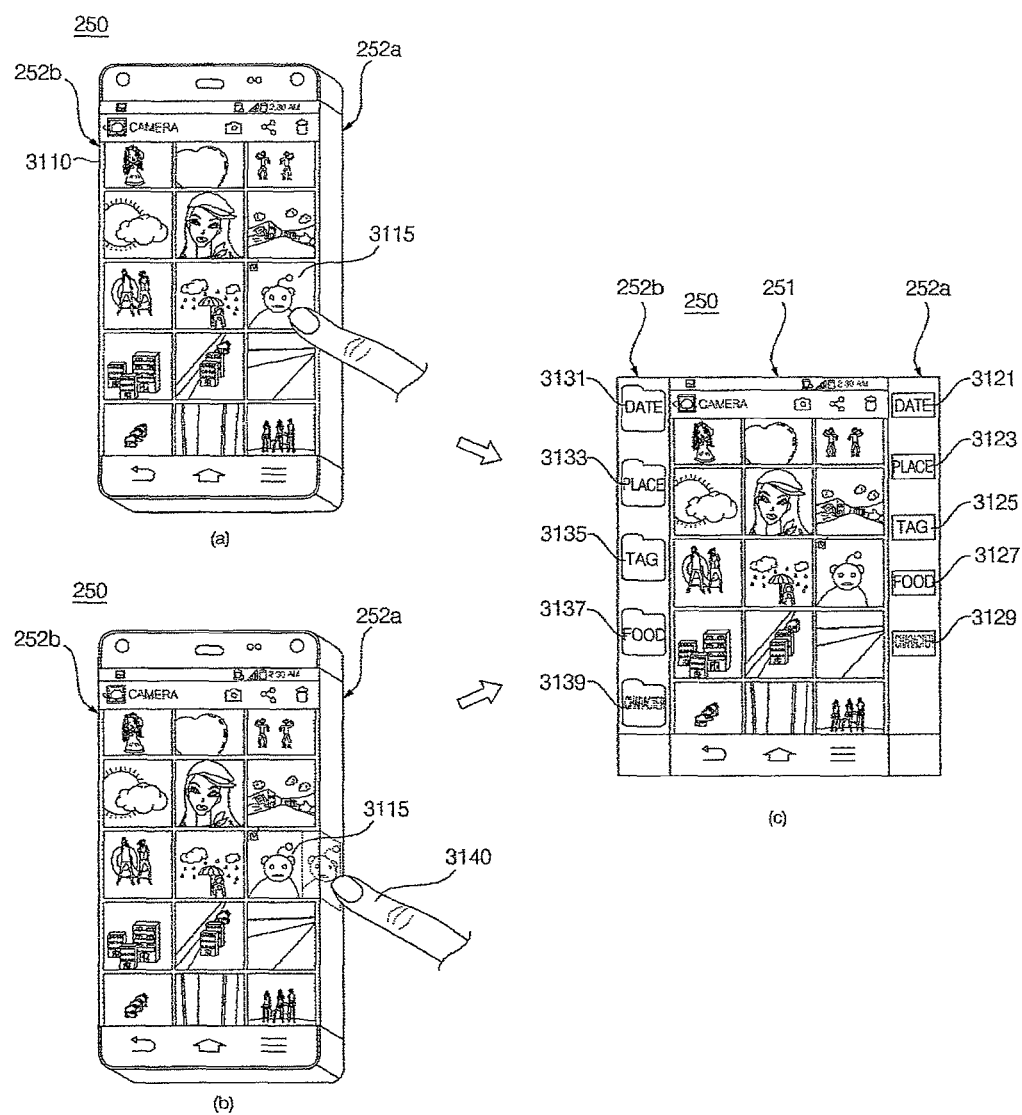
FIGS. 31 to 39 are reference views illustrating the operation of the mobile terminal according to the third embodiment of the present invention.

Referring to FIG. 31(*a*), the mobile terminal 250 displays an image list screen (or a gallery screen) 3110 on the front display unit 251 according to a user command, etc. When a specific thumbnail image 3115 is touched for a predetermined time in a state in which the image list screen 3110 is displayed on the front display unit 251, the mobile terminal 250 displays filter information items 3121, 3123, 3125, 3127, and 3129 related to the touched thumbnail image 3115 on the first side display unit 252a, and displays folders 3131, 3133, 3135, 3137, and 3139 corresponding to the filter information items on the second side display unit 252b.

In another embodiment, when a user input 3140 of touching the specific thumbnail image 3115 and then dragging the touched thumbnail image 3115 toward the first side display unit 252a or the second side display unit 252b is received, as shown in FIG. 31(b), the mobile terminal 250 can display the filter information items 3121, 3123, 3125, 3127, and 3129 related to the dragged thumbnail image 3115 on the first side display unit 252a, and display the folders 3131, 3133, 3135, 3137, and 3139 corresponding to the filter information items on the second side display unit 252b.

Figure 32:
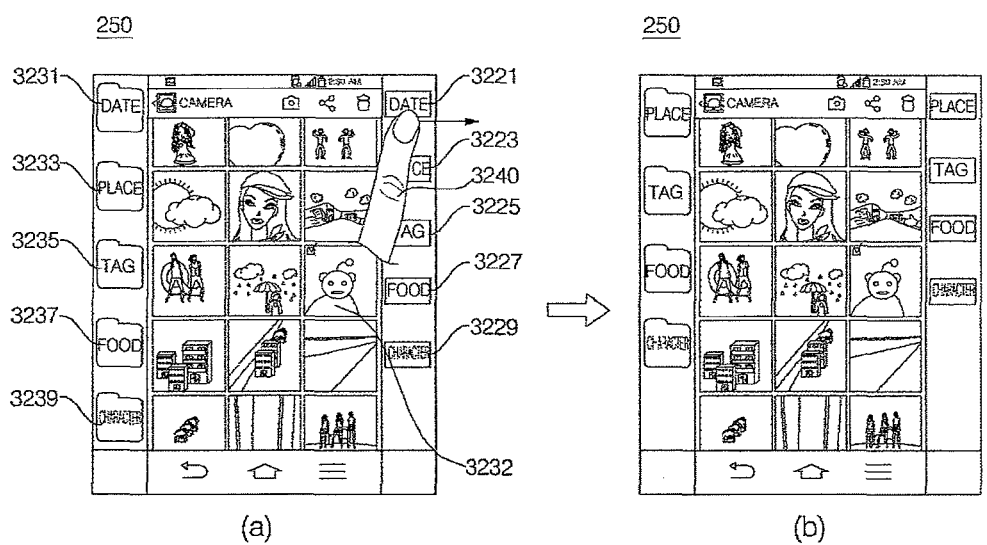

FIG. 32 is a view illustrating the operation of the mobile terminal for selecting filter information items and folders displayed on the opposite side display units. Referring to FIG. 32, the mobile terminal 250 displays filter information items 3221, 3223, 3225, 3227, and 3229 related to a preselected thumbnail image 3215 on the first side display unit 252a, and displays folders 3231, 3233, 3235, 3237, and 3239 corresponding to the filter information items on the second side display unit 252b.

When a user input 3240 of touching a date information item 3221 displayed on the first side display unit 252a and then flicking the touched date information item toward a boundary of the first side display unit 252a is received, the mobile terminal 250 can delete the date information item 3221 from the first side display unit 252a. Further, the same method may be applied to the folders displayed on the second side display unit 252b. The user of the mobile terminal 250 can select a desired one from among the items displayed on the first and second side display units 252a and 252b through the above deleting process.

Figure 33:
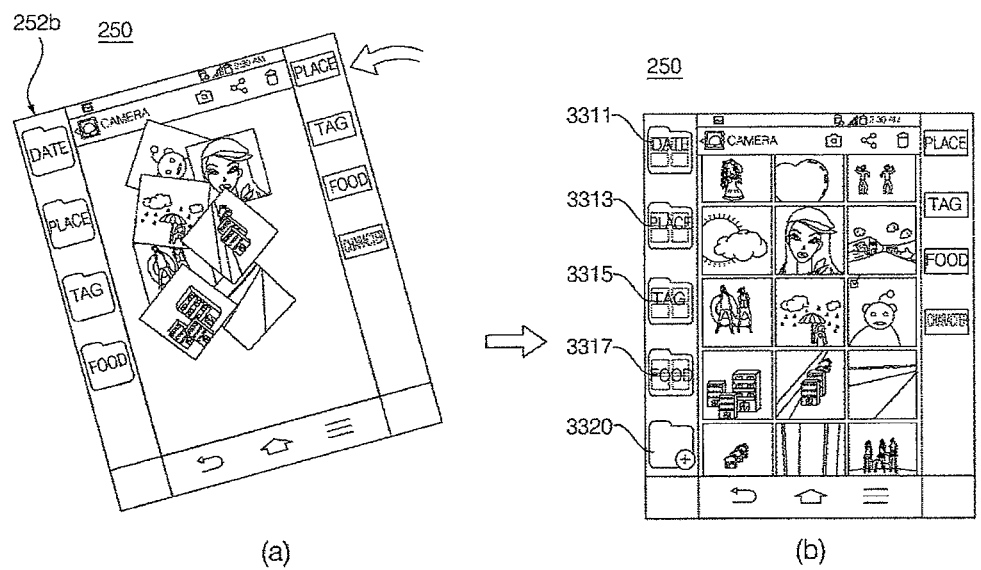

FIGS. 33 to 36 are views illustrating the operation of the mobile terminal for sorting images stored in a gallery per folder and then displayed the sorted images on the second side display unit when the terminal body is rotated in a second direction. Referring to FIG. 33, when the terminal body is rotated in the left direction, the mobile terminal 250 automatically sorts thumbnail images coinciding with a preselected thumbnail image in terms of a date condition, a place condition, a tag condition, and a food condition per folder and displays the sorted thumbnail images on the second side display unit 252b.

Further, when the terminal body is inclined in the left direction, the mobile terminal 250 can provide a screen effect in which the thumbnail images pour down in the direction in which the terminal body is inclined. In addition, the mobile terminal 250 can display a folder creation icon 3320 for creating automatically sorted folders 3311, 3313, 3315, and 3317 in a bundle on the lower end of the second side display unit 252b.

Figure 34:
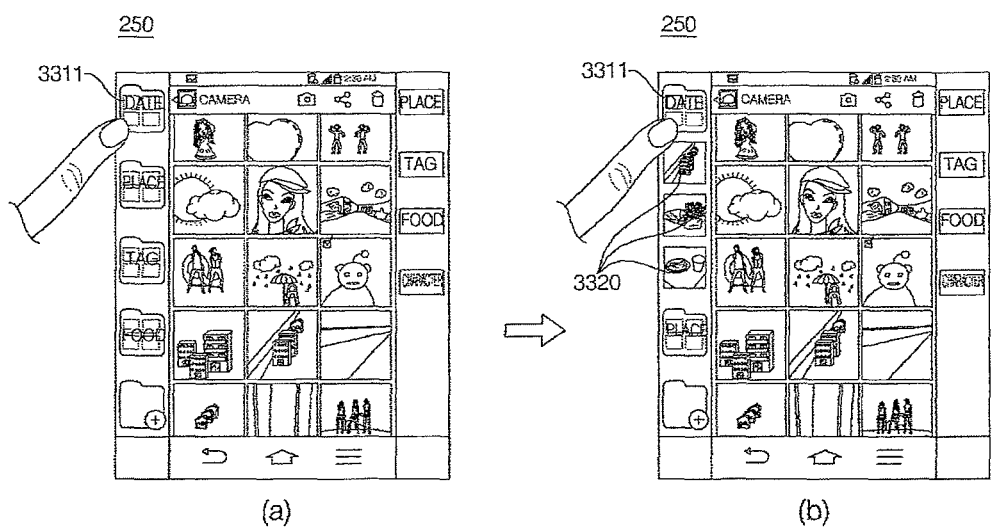

Referring to FIG. 34, when a date folder 3311, which is one of the folders displayed on the second side display unit 252b, is selected, the mobile terminal 250 arranges under the date folder 3311 the thumbnail images 3320 stored in the date folder 3311. When the date folder 3311 is reselected in this state, the mobile terminal 250 can control the arranged thumbnail images 3320 to disappear into the date folder 3311. Consequently, it is possible for the user of the mobile terminal to recognize the thumbnail images 3320 stored in the date folder 3311 one by one.

Figure 35:
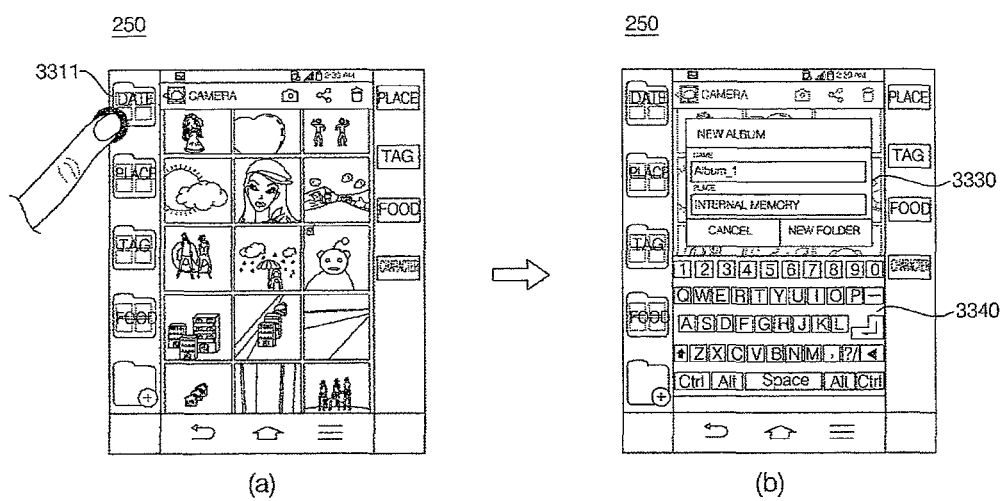

Referring to FIG. 35, when the date folder 3311, which is one of the folders displayed on the second side display unit 252b, is touched for a predetermined time, the mobile terminal 250 displays on the front display unit 251a text input window 3330 and a keypad window 3340 for allowing the user to change the name of the date folder 3311. When a new name is input through the text input window 3330, the mobile terminal 250 can change the name of the date folder 3311 into the new name.

Figure 36:
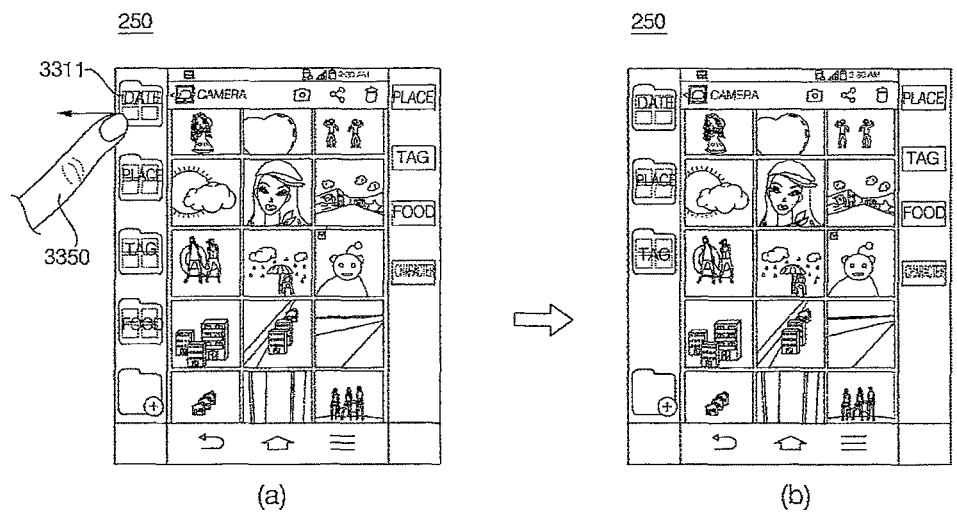

Referring to FIG. 36, when a user input 3350 of touching the date folder 3311, which is one of the folders displayed on the second side display unit 252b and then flicking the touched date folder toward a boundary of the second side display unit 252b is received, the mobile terminal 250 can delete the date folder 3311 from the second side display unit 252b.

Figure 37:
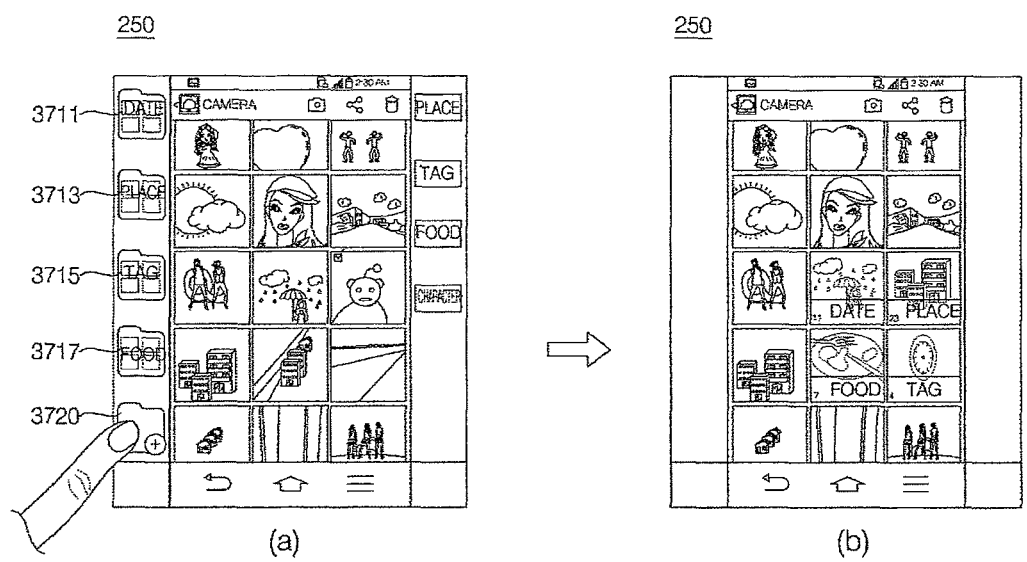

FIG. 37 is a view illustrating the operation of the mobile terminal for creating folders displayed on the second side display unit in a bundle. Referring to FIG. 37, when a folder creation icon 3720 displayed on the lower end of the second side display unit 252b is selected, the mobile terminal 250 creates folders 3711, 3713, 3715, and 3717 automatically sorted according to each filter condition in a bundle and stores the created folders in a gallery. Subsequently, the mobile terminal 250 controls information displayed on the first and second side display units 252a and 252b to disappear therefrom.

Figure 38:
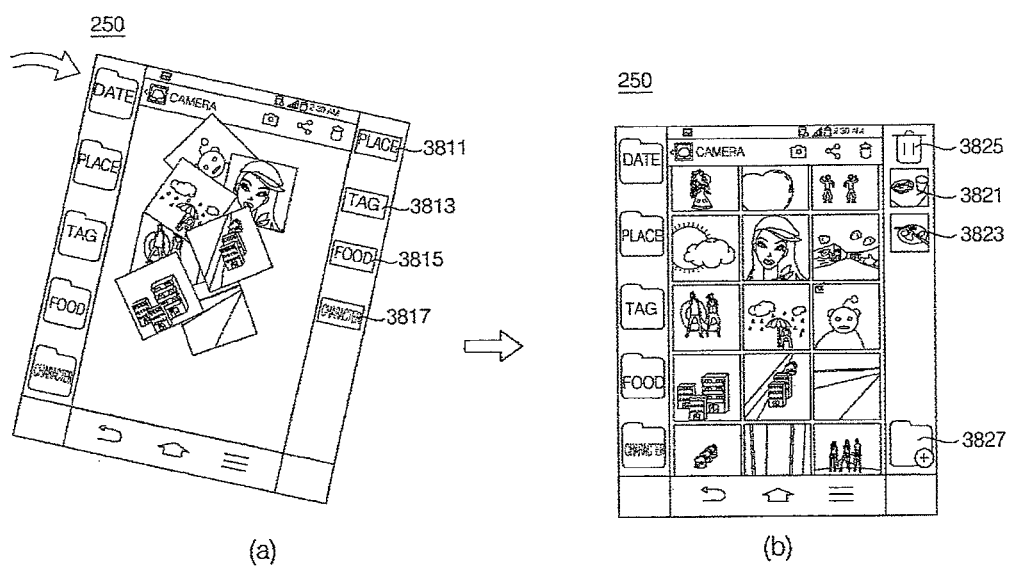
Figure 39:
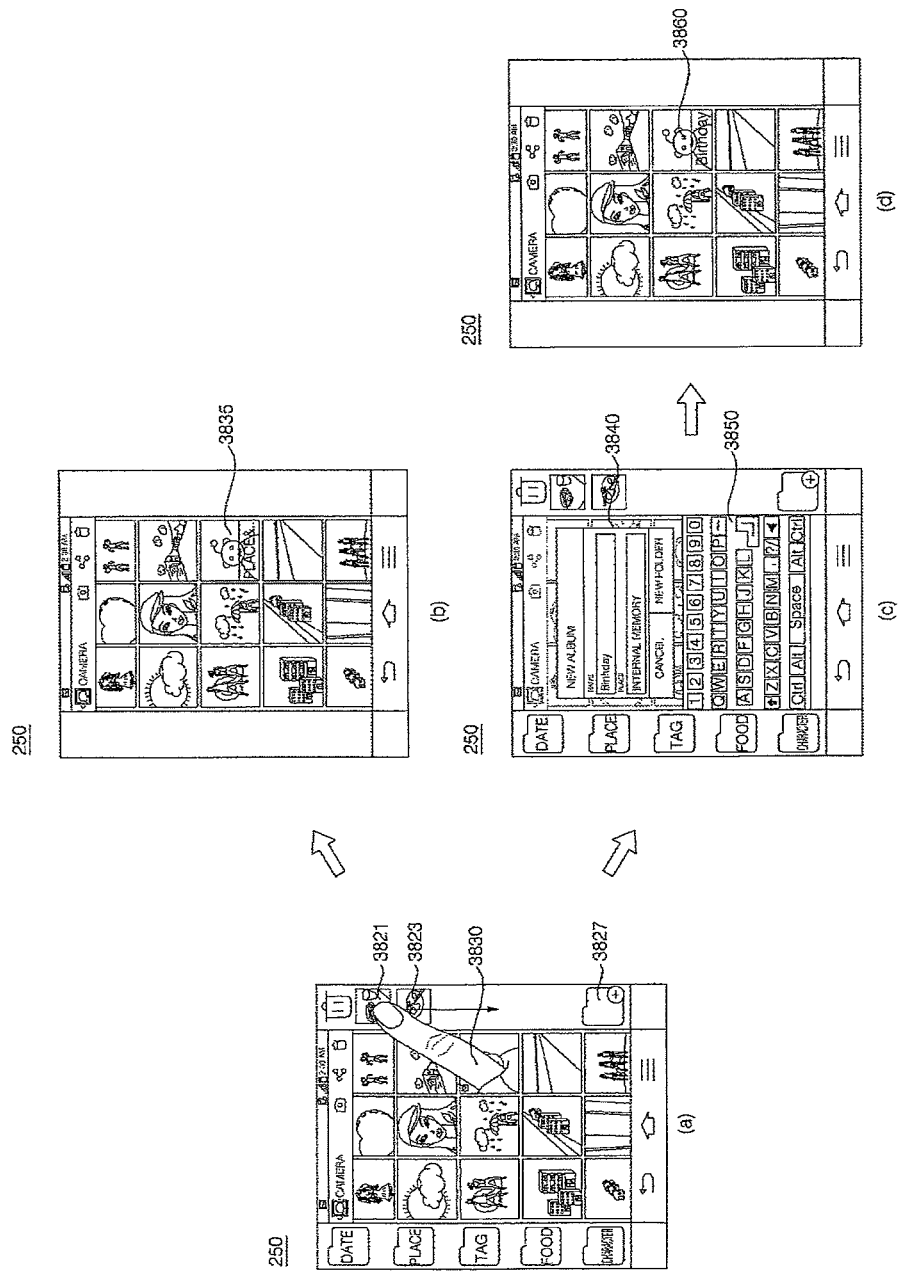

FIGS. 38 and 39 are views illustrating the operation of the mobile terminal for arranging thumbnail images extracted according to a selected filter condition on the first side display unit when the terminal body is rotated in a first direction. Referring to FIG. 38, when the terminal body is rotated in the right direction, the mobile terminal 250 extracts thumbnail images 3821 and 3823 coinciding with a preselected thumbnail image in term of a place condition 3811, a tag condition 3813, a food condition 3815, and a character condition 3817 from a gallery screen and displays the extracted thumbnail images on the first side display unit 252a.

Further, when the terminal body is inclined in the right direction, the mobile terminal 250 can provide a screen effect in which the thumbnail images pour down in the direction in which the terminal body is inclined. In addition, the mobile terminal 250 can display on the first side display unit 252a a delete icon 3825 for deleting at least one thumbnail image and a function setting icon 3827 for interlocking at least one thumbnail image with a specific application.

Referring to FIG. 39, the mobile terminal 250 displays on the first side display unit 252a thumbnail images 3821 and 3823 sorted according to a preselected filter condition. Subsequently, when a user input 3830 of touching the first thumbnail image 3821 displayed on the first side display unit 252a and then dragging the touched first thumbnail image in the downward direction is received, as shown in FIGS. 39(a) and 39(b), the mobile terminal 250 automatically creates a new folder 3835 and then moves the thumbnail images 3821 and 3823 arranged on the first side display unit 252a to the automatically created folder. Further, the name of the new folder 3835 may be automatically created according to preselected filter information.

In another embodiment, when the user input 3830 of touching the first thumbnail image 3821 displayed on the first side display unit 252a and then dragging the touched first thumbnail image in the downward direction is received, as shown in FIGS. 39(a) and 39(c), the mobile terminal 250 displays on the front display unit 251a text input window 3840 and a keypad window 3850 for allowing the user to input the name of the new folder.

When the name of the new folder is input through the text input window 3840, the mobile terminal 250 creates a folder

3860 having the input name and then moves the thumbnail images 3821 and 3823 arranged on the first side display unit 252*a* to the new folder 3860. Subsequently, the mobile terminal 250 controls information displayed on the first and second side display units 252*a* and 252*b* to disappear therefrom. Meanwhile, it is possible to select an application that can be interlocked with the arranged thumbnail images through the function setting icon 3827 displayed on the first side display unit 252*a*.

Figure 40:
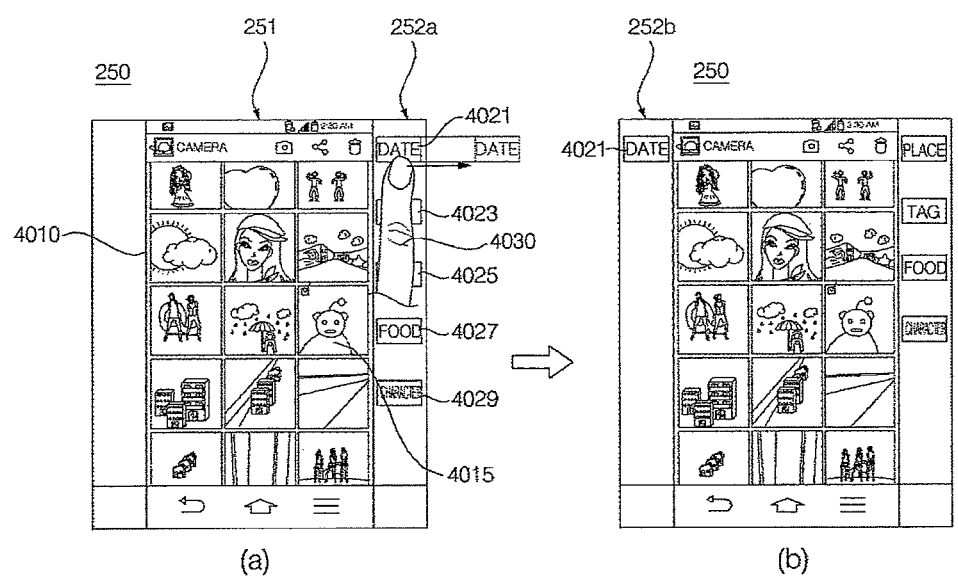
FIGS. 40 to 42 are reference views illustrating the operation of a mobile terminal according to a fourth embodiment of the present invention.
Figure 41:
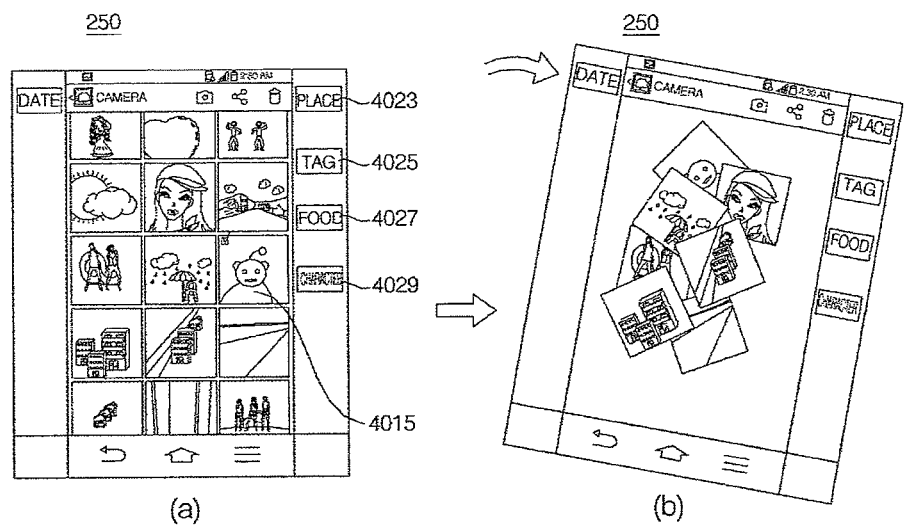
Figure 42:
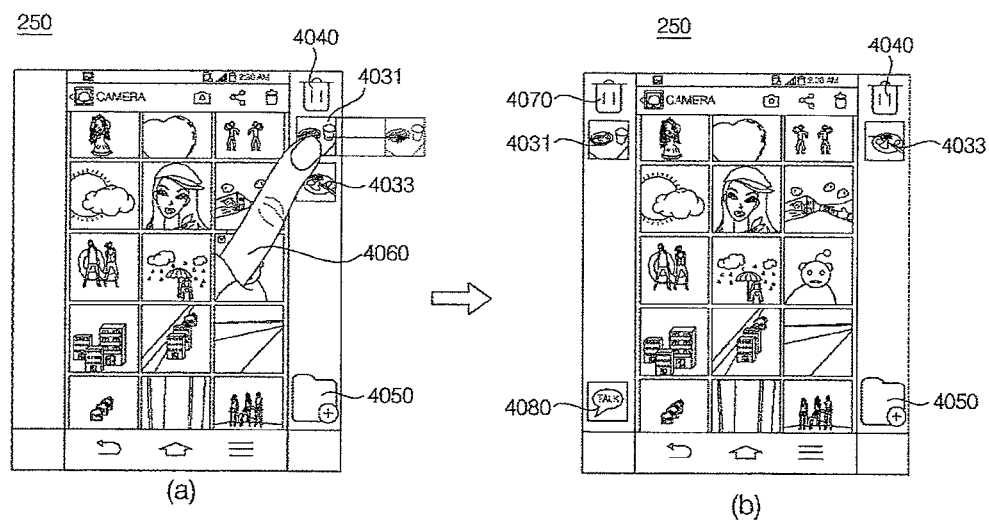

FIGS. 40 to 42 are reference views illustrating the operation of a mobile terminal according to a fourth embodiment of the present invention. Hereinafter, in this embodiment, the operation of a mobile terminal for sorting a plurality of images stored in a gallery using opposite side display units will be described. Referring to FIG. 40, the mobile terminal 250 displays an image list screen 4010 on the front display unit 251 according to a user command, etc.

When a specific thumbnail image 4015 is selected in a state in which the image list screen 4010 is displayed on the front display unit 251, the mobile terminal 250 displays filter information items 4021, 4023, 4025, 4027, and 4029 related to the selected thumbnail image 4015 on the first side display unit 252*a*. When a user input 4030 of touching the date information item 4021, which is one of the filter information items displayed on the first side display unit 252*a*, and then flicking the touched date infolination item toward a boundary of the first side display unit 252*a* is received, the mobile terminal 250 moves the date information item 4021 to the second side display unit 252*b* to display the date information item 4021 on the second side display unit 252*b*.

In the same manner, when a user input of touching the date information item 4021 displayed on the second side display unit 252*b* and then flicking the touched date information item toward a boundary of the second side display unit 252*b* is received, the mobile terminal 250 moves the date information item 4021 to the first side display unit 252*a* to display the date information item 4021 on the first side display unit 252*a*.

Referring to FIG. 41, when the terminal body is rotated in the right direction, the mobile terminal 250 extracts from an image list screen 4010 thumbnail images 4031 and 4033 coinciding with a preselected thumbnail image 4015 in terms of a place condition 4023, a tag condition 4025, a food condition 4027, and a character condition 4029, and displays the extracted thumbnail images 4031 and 4033 on the first side display unit 252*a*.

Further, when the terminal body is inclined in the right direction, the mobile terminal 250 can provide a screen effect in which the thumbnail images pour down in the direction in which the terminal body is inclined. In addition, the mobile terminal 250 can display on the first side display unit 252*a* a delete icon for deleting at least one thumbnail image and a function setting icon for interlocking at least one thumbnail image with a specific application.

Referring to FIG. 42, the mobile terminal 250 displays on the first side display unit 252*a* first and second thumbnail images 4031 and 4033 extracted according to a preselected filter condition, a delete icon 4040, and a function setting icon 4050. When a user input 4060 of touching the first thumbnail image 4031 displayed on the first side display unit 252*a* and then flicking the touched first thumbnail image toward a right boundary of the first side display unit 252*a* is received, the mobile terminal 250 moves the first thumbnail image 4031 to the second side display unit 252*b* to display the first thumbnail image 4031 on the second side display unit 252*b*. In addition, the mobile terminal 250 can display on the second side display unit 252*b* a delete icon 4070 for deleting the first thumbnail image 4031 and an application icon 4080 preset to interlock the first thumbnail image 4031 to a specific application.

Meanwhile, when a user input of touching the second thumbnail image 4033 displayed on the first side display unit 252*a* and then dragging the touched second thumbnail image in the downward direction is received, the mobile terminal 250 automatically creates a new folder and then moves the second thumbnail image 4033 to the automatically created folder. In addition, when a user input of touching the first thumbnail image 4031 displayed on the second side display unit 252*b* and then dragging the touched first thumbnail image in the downward direction is received, the mobile terminal 250 displays on the front display unit 250 an operation screen of an application corresponding to the application icon 4080. Subsequently, the mobile terminal 250 adds the first thumbnail image 4031 to the operation screen.

Figure 43:
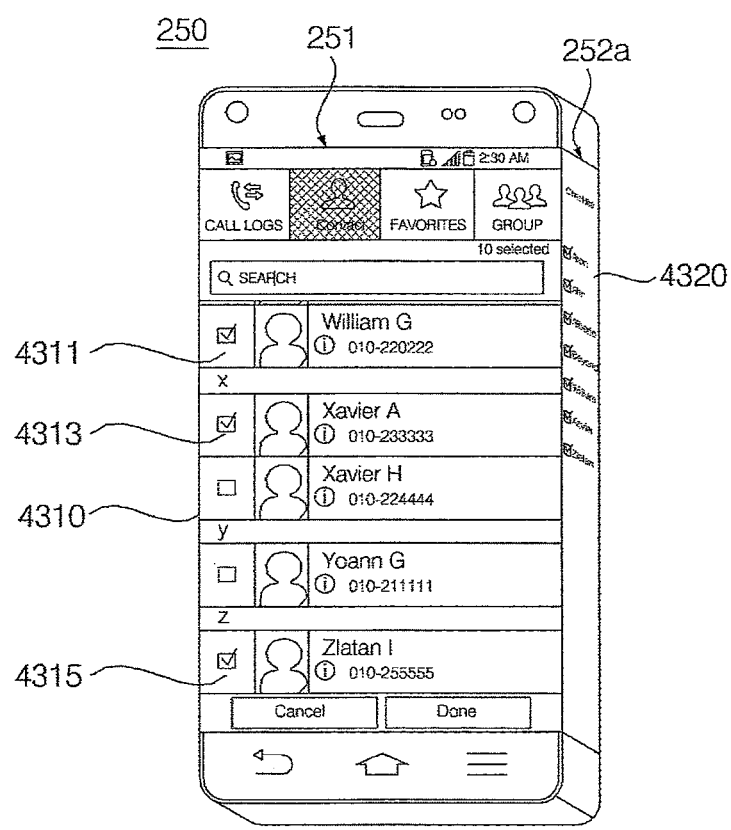

FIGS. 43 to 47 are reference views illustrating the operation of a mobile terminal according to a fifth embodiment of the present invention. Hereinafter, in this embodiment, the operation of a mobile terminal for sorting a plurality of items arranged on an address list screen using a single side display unit will be described. Referring to FIG. 43, the mobile terminal 250 displays an address list screen 4310 on the front display unit 251 according to a user command, etc.

When one or more address items 4311, 4313, and 4315 are selected in a state in which the address list screen 4310 is displayed on the front display unit 251, the mobile terminal 250 displays on the side display unit 252*a* a check list 4320 including the selected address items. When the checked address items on the front display unit 251 are released, the mobile terminal 250 deletes the released address items from the check list 4320 displayed on the side display unit 252*a*.

In addition, when the address items included in the check list 4320 are released, the mobile terminal 250 can control the released address items to appear from the check list 4320 and release checked states of the corresponding address items displayed on the front display unit 251.

Figure 44:
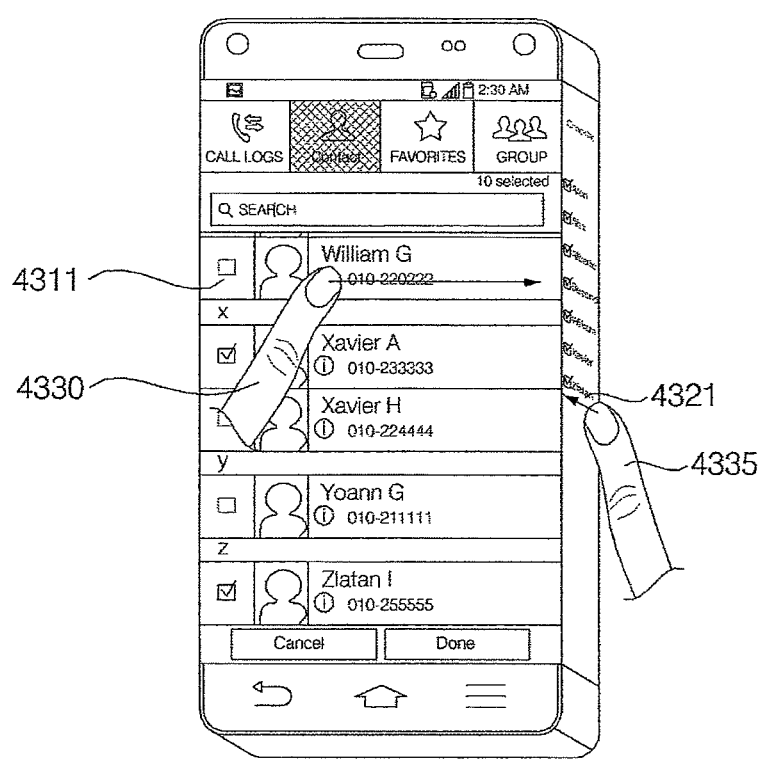

Referring to FIG. 44, when a user input 4330 of touching a first address item 4311 displayed on the front display unit 251 and then sliding the touched first address item toward the side display unit 252*a* is received, the mobile terminal 250 checks the first address item 4311 and displays the checked first address item 4311 on the side display unit 252*a*. In addition, when a user input 4335 of touching a second address item 4321 displayed on the side display unit 252*a* and then sliding the touched second address item toward the front display unit 251 is received, the mobile terminal 250 can control the second address item 4321 to disappear from the check list 4320 and release a checked state of the corresponding address item displayed on the front display unit 251.

Referring to FIG. 45(*a*), when the check list 4320 is displayed, the mobile terminal 250 can display on the side display unit 252*a* a delete icon 4340 for deleting at least one address item and a function setting icon 4350 for interlocking at least one address item with a specific application. In another embodiment, referring to FIG. 45(*b*), when the user enters an address mode for adding an addressee in a state in which a specific application is being executed, the mobile terminal 250 can display an application icon 4355 corresponding to the specific application on the function setting icon area.

Figure 46:
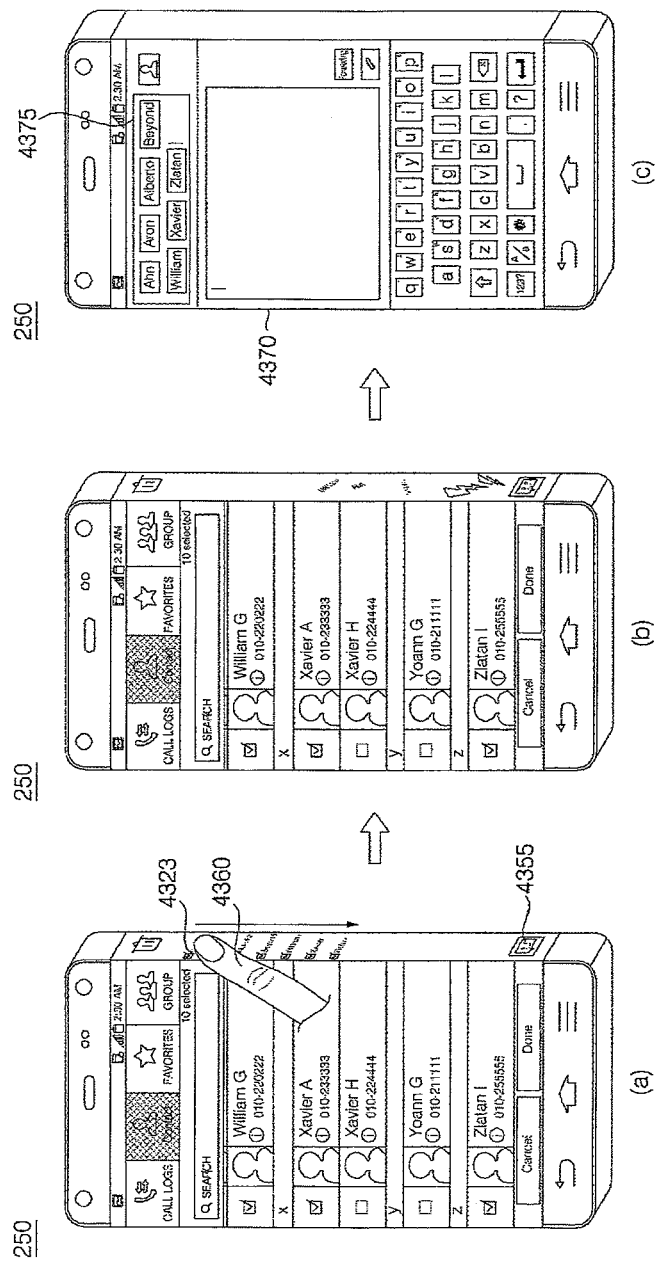

Referring to FIG. 46, when a user input 4360 of touching a first address item 4323 displayed on the side display unit 252*a* and then dragging the touched first address item in the downward direction is received, the mobile terminal 250 can provide a screen effect in which the address items included in the check list 4320 are sucked into the application icon 4355. Subsequently, the mobile terminal 250 can display a message editing screen 4370 corresponding to the application icon 4355 on the front display unit 251 and add all of the items included in the check list 4320 to an addressee area 4375 of the message editing screen 4370.

Figure 47:
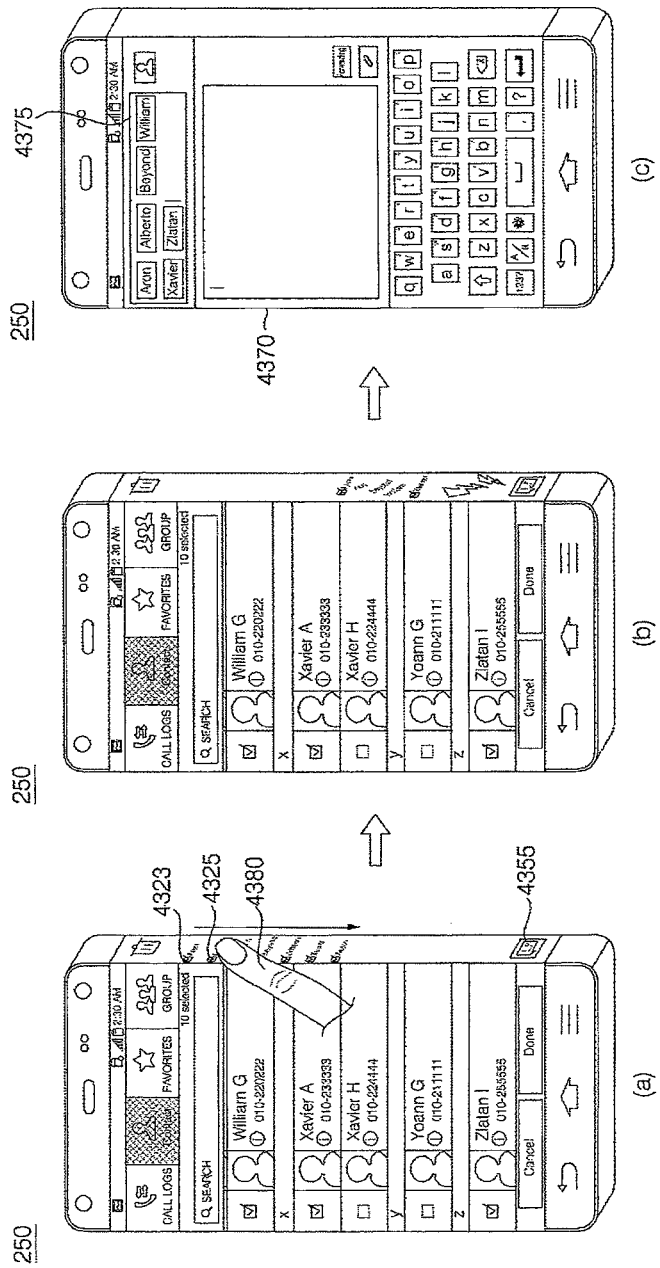

In addition, referring to FIG. 47, when a user input 4380 of touching a second address item 4325 displayed on the side display unit 252*a* and then dragging the touched second address item in the downward direction is received, the mobile terminal 250 can provide a screen effect in which all of the address items except the first address item 4323 are sucked into the application icon 4355. Subsequently, the mobile terminal 250 can display a message editing screen 4370 corresponding to the application icon 4355 on the front display unit 251 and add all of the items in the check list 4320 except the first address item 4323 to an addressee area 4375 of the message editing screen 4370.

In this embodiment as described above, the method of sorting a plurality of items arranged on the address list screen was described by way of example. However, the present invention is not limited thereto. Consequently, those skilled in the art will appreciate that the present invention can be equally or similarly applied to the various list screens, such as a call list screen, a message list screen, and an e-mail list screen.

Figure 48:
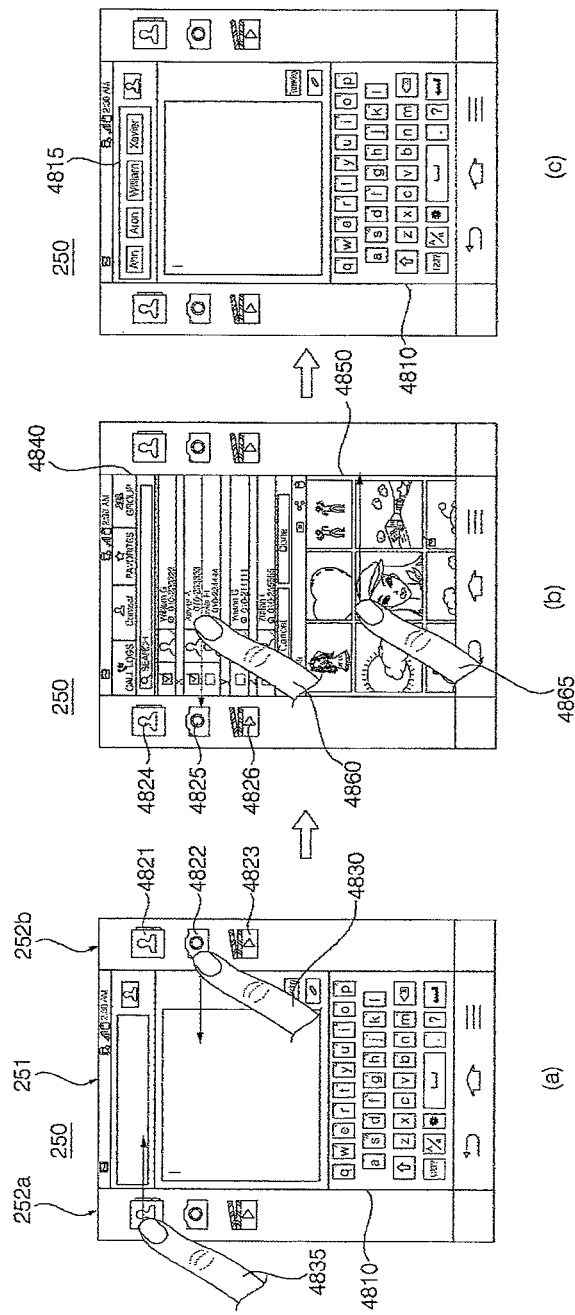
FIG. 48 is a reference view illustrating the operation of a mobile terminal according to a sixth embodiment of the present invention.

FIG. 48 is a reference view illustrating the operation of a mobile terminal according to a sixth embodiment of the present invention. Hereinafter, in this embodiment, the operation of a mobile terminal for simultaneously interlocking a plurality of applications using opposite side display units will be described. Referring to FIG. 48, the mobile terminal 250 displays an operation screen 4810 corresponding to a first application on the front display unit 251. The following description will be given on the assumption that the operation screen is a message editing screen.

When the message editing screen 4810 is displayed, the mobile terminal 250 displays an application icon list 4821, 4822, 4823, 4824, 4825, and 4826 that can be interlocked with a message application on the first and second side display units 252*a* and 252*b*. When a first user input 4830 of dragging a second application icon 4822 displayed on the first side display unit 252*a* toward the front display unit 251 and a second user input 4835 of dragging a fourth application icon 4824 displayed on the second side display unit 252*b* toward the front display unit 251 are simultaneously or sequentially received, the mobile terminal 250 can display a first operation screen 4840 corresponding to the fourth application icon 4824 on the upper end of the front display unit 251 and display a second operation screen 4850 corresponding to the second application icon 4822 on the lower end of the front display unit 251.

That is, the mobile terminal 250 can display the two operation screens 4840 and 4850 on the front display unit 251 through multi windows. The following description will be given on the assumption that the first operation screen 4840 is an address list screen and the second operation screen 4850 is an image list screen.

When desired items are selected from the address list screen 4840 and the image list screen 4850, and then third and fourth user inputs 4860 and 4865 opposite to the first and second user inputs 4830 and 4835 are received, the mobile terminal 250 displays the original message editing screen 4810 on the front display unit 251. In addition, the mobile terminal 250 can display the item selected from the address list screen 4840 on an addressee area 4815 of the message editing screen 4810, and add the image file selected from the image list screen 4850 to the message editing screen 4810.

Figure 49:
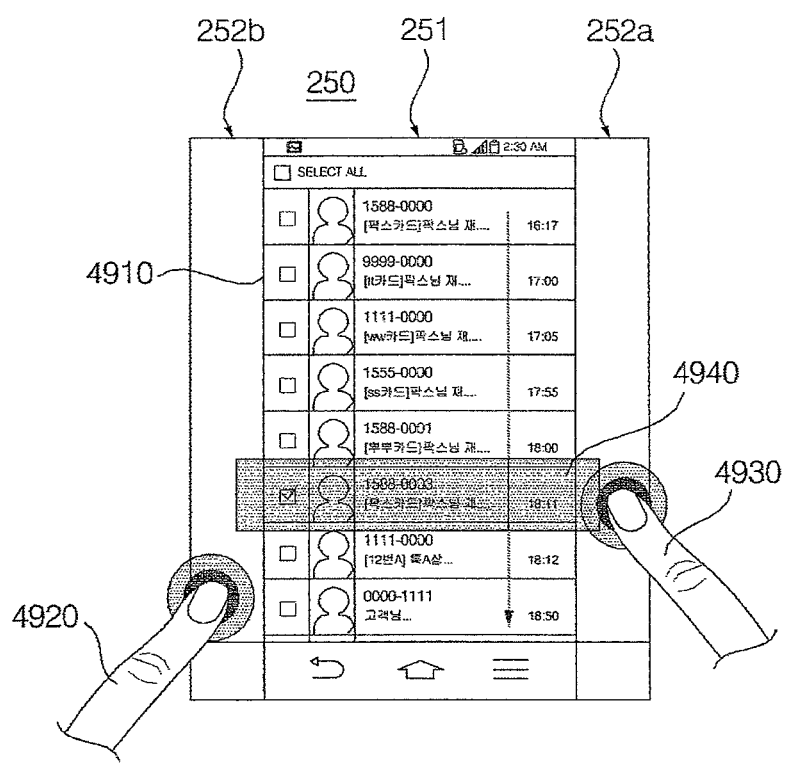
FIG. 49 is a reference view illustrating the operation of a mobile terminal according to a seventh embodiment of the present invention.

FIG. 49 is a reference view illustrating the operation of a mobile terminal according to a seventh embodiment of the present invention. Hereinafter, in this embodiment, the operation of a mobile terminal for selecting a desired item while scrolling a predetermined list screen using opposite side display units will be described.

Referring to FIG. 49, the mobile terminal 250 displays a predetermined list screen 4910 on the front display unit 251 according to a user command, etc. The following description will be given on the assumption that the list screen 4910 is a message list screen. When the message list screen 4910 is displayed, the mobile terminal 250 scrolls the message list screen 4910 in the downward direction during reception of a user input 4920 of touching the lower end of the second side display unit 252*b*.

When a user input 4930 of touching the first side display unit 252*a* on a transverse axis of a desired item 4940 during downward scrolling of the message list screen 4910, the mobile terminal 250 checks the item 4940 and moves the checked item 4940 to the first side display unit 252*a*. Further, when the message list screen 4910 is displayed, the mobile terminal 250 scrolls the message list screen 4910 in the upward direction during reception of a user input of touching the upper end of the second side display unit 252*b*. In the same manner, the mobile terminal 250 can select a desired item and move the selected item to the first side display unit 252*a*.

That is, it is possible to control the scrolling direction of the message list screen 4910 through the user input through the second side display unit 252*b* and to select one item from the message list screen 4910 through the user input through the first side display unit 252*a*.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely examples and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
    a touch screen comprising a first display area disposed at a front of a terminal body and a second display area disposed at a side of the terminal body;
    a camera; and
    a controller configured to:
    display a preview image of an image to be photographed by the camera on the first display area,
    when the entire terminal body is rotated from a first position to a second position in which the preview image is displayed on the first display area except the second display area, fit the preview image to a screen mode corresponding to the second position, display the fitted preview image on the first display area, and display, on the second display area, a first menu related to the preview image displayed on the first display area,
    display a second menu on the second display area in response to a first input on the touch screen, and
    select an item from the first menu in response to a second input on the touch screen.

2. The mobile terminal according to claim 1, wherein the touch screen is a flexible touch screen.

3. The mobile terminal according to claim 1, wherein the first input is a gesture input of dragging the first display area of the touch screen in a first direction.

4. The mobile terminal according to claim 1, wherein the first position is a vertical position such that a longitudinal direction of the terminal body is perpendicular to a ground and the second position is a horizontal position such that the longitudinal direction of the terminal body is parallel to the ground.

5. The mobile terminal according to claim 1, wherein, in response to the terminal body being rotated from the second position to the first position, the controller is configured to detect a user's grip area from the second display area of the touch screen.

6. The mobile terminal according to claim 5, wherein, in response to the terminal body being rotated from the second position to the first position, the controller is configured to automatically display the first menu on an area other than the detected grip area.

7. The mobile terminal according to claim 1, wherein, in response to the terminal body being rotated from the second position to the first position, the controller is configured to disable a touch sensor provided at the second display area.

8. The mobile terminal according to claim 1, wherein the first menu is an option setting menu related to a photographing function.

9. The mobile terminal according to claim 1, wherein the first input is a drag input in a first direction and the second input is a drag input in a second direction.

10. The mobile terminal according to claim 1, wherein the second input is a drag input to display items in a menu and stopping the drag input to select the displayed item.

11. A method of controlling a mobile terminal, the method comprising:
    displaying an preview image of an image to be photographed by a camera on a first display area of a touch screen disposed at a front of a terminal body;
    when the terminal body is rotated from a first position to a second position in which the preview image is displayed on the first display area except a second display area, fitting the preview image to a screen mode corresponding to the second position, displaying the fitted preview image on the first display area, and displaying, on the second display area of the touch screen disposed at a side of the terminal body, a first menu related to the preview image displayed on the first display area;
    displaying a second menu on the second display area in response to a first input on the touch screen; and
    selecting an item from the first menu in response to a second input on the touch screen.

12. The method according to claim 11, wherein the touch screen is a flexible touch screen.

13. The method according to claim 11, wherein the first input is a gesture input of dragging the first display area of the touch screen in a first direction.

14. The method according to claim 11, wherein the first position is a vertical position such that a longitudinal direction of the terminal body is perpendicular to a ground and the second position is a horizontal position such that the longitudinal direction of the terminal body is parallel to the ground.

15. The method according to claim 11, further comprising:
    detecting a user's grip area from the second display area of the touch screen, in response to the terminal body being rotated from the second position to the first position.

16. The method according to claim 15, further comprising:
    automatically displaying the first menu on an area other than the detected grip area, in response to the terminal body being rotated from the second position to the first position.

17. The method according to claim 11, further comprising:
    disabling a touch sensor provided at the second display area, in response to the terminal body being rotated from the second position to the first position.

18. The method according to claim 11, wherein the first menu on the second display area is an option setting menu related to a photographing function.

19. The method according to claim 11, wherein the first input is a drag input in a first direction and the second input is a drag input in a second direction.

20. The method according to claim 11, wherein the second input is a drag input to display items in a menu and stopping the drag input to select the displayed item.

* * * * *